US008600647B2

(12) United States Patent
Demura

(10) Patent No.: US 8,600,647 B2

(45) Date of Patent: Dec. 3, 2013

(54) AIR-FUEL RATIO CONTROL APPARATUS OF A MULTI-CYLINDER INTERNAL COMBUSTION ENGINE

(75) Inventor: Takayuki Demura, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 354 days.

(21) Appl. No.: 13/146,563

(22) PCT Filed: Jan. 30, 2009

(86) PCT No.: PCT/JP2009/052005

§ 371 (c)(1),
(2), (4) Date: Jul. 27, 2011

(87) PCT Pub. No.: WO2010/087029

PCT Pub. Date: Aug. 5, 2010

(65) Prior Publication Data

US 2012/0006307 A1 Jan. 12, 2012

(51) Int. Cl.

*B60T 7/12* (2006.01)
*G05D 1/00* (2006.01)
*G06F 7/00* (2006.01)
*G06F 17/00* (2006.01)

(52) U.S. Cl.

USPC ............................ 701/109; 701/114; 123/674

(58) Field of Classification Search

USPC .......... 123/672, 674, 480, 486; 701/103, 109, 701/114; 73/114.72, 114.73

See application file for complete search history.

(56) References Cited

U.S. PATENT DOCUMENTS

| | | | | |
|---|---|---|---|---|
| 6,401,703 | B1 * | 6/2002 | Mamiya et al. | 123/674 |
| 6,415,218 | B2 * | 7/2002 | Shimada et al. | 701/103 |
| 6,789,534 | B2 * | 9/2004 | Yasui et al. | 123/673 |
| 6,856,891 | B2 * | 2/2005 | Yasui | 701/109 |
| 7,162,359 | B2 * | 1/2007 | Yasui | 701/109 |
| 7,389,174 | B2 * | 6/2008 | Okazaki | 701/109 |
| 7,987,039 | B2 * | 7/2011 | Takagawa | 701/103 |
| 2003/0024514 | A1 * | 2/2003 | Kitamura et al. | 123/672 |
| 2004/0193358 | A1 * | 9/2004 | Yasui | 701/109 |

FOREIGN PATENT DOCUMENTS

| | | |
|---|---|---|
| JP | A-5-44559 | 2/1993 |
| JP | A-2002-364427 | 12/2002 |
| JP | A-2008-38707 | 2/2008 |
| JP | A-2008-261278 | 10/2008 |

OTHER PUBLICATIONS

International Search Report issued in International Application No. PCT/JP2009/052005 on Apr. 28, 2009 (with translation).

* cited by examiner

*Primary Examiner* — Willis R Wolfe, Jr.
*Assistant Examiner* — Anthony L Bacon
(74) *Attorney, Agent, or Firm* — Oliff & Berridge, PLC

(57) ABSTRACT

An air-fuel ratio control apparatus includes a catalytic converter disposed at a position downstream of an exhaust gas aggregated portion; a downstream air-fuel ratio sensor disposed in an exhaust passage at a position downstream of the catalytic converter; first feedback amount updating means for updating a first feedback amount to have an output value of the downstream air-fuel ratio sensor coincide with a target downstream-side air-fuel ratio based on the output value of the downstream air-fuel ratio sensor; and a learning means for updating a leaning value of the first feedback amount in such a manner that the leaning value brings in a steady-state component of the first feedback amount based on the first feedback amount.

18 Claims, 32 Drawing Sheets

AIR-FUEL RATIO CONTROL APPARATUS OF A MULTI-CYLINDER INTERNAL COMBUSTION ENGINE

TECHNICAL FIELD

The present invention relates to an air-fuel ratio control apparatus of a multi-cylinder internal combustion engine, for controlling an air-fuel ratio of a mixture supplied to the engine, based on an output value of an air-fuel ratio sensor disposed downstream of a catalytic converter (catalyst) provided (interposed) in an exhaust passage of the engine.

BACKGROUND ART

Conventionally, one of air-fuel ratio control apparatuses of the type comprises an upstream air-fuel ratio sensor, a catalytic converter, and a downstream air-fuel ratio sensor, disposed in this order from an upstream side to a downstream side in an exhaust passage of an engine, and is configured to perform a feedback control on an air-fuel ratio (hereinafter, simply referred to as "an air-fuel ratio of the engine") of a mixture supplied to the engine, based on an output value of the upstream air-fuel ratio sensor and an output value of the downstream air-fuel ratio sensor.

More specifically, the conventional air-fuel ratio control apparatus (the conventional apparatus) calculates a sub feedback amount (a first feedback amount) to have the output value of the downstream air-fuel ratio sensor coincide with (becomes equal to) a target downstream side value (for example, a value corresponding to the stoichiometric air-fuel ratio), by performing a proportional-integral processing on an error (difference) between the output value of the downstream air-fuel ratio sensor and the target downstream side value.

Further, the conventional apparatus calculates a main feedback amount to have the air-fuel ratio of the engine coincide with (becomes equal to) a target upstream air-fuel ratio (for example, the stoichiometric air-fuel ratio), based on the output value of the upstream air-fuel ratio sensor and the sub feedback amount. Thereafter, the conventional apparatus performs the feedback control on the air-fuel ratio of the engine (for example, a fuel injection amount) based on the calculated main feedback amount.

It should be noted that, in the present specification, performing a main feedback control means newly calculating (or updating) the main feedback amount, and using the main feedback amount for the control of the air-fuel ratio of the engine. Similarly, performing a sub feedback control means newly calculating (or updating) the sub feedback amount, and using the sub feedback amount for the control of the air-fuel ratio of the engine.

Meanwhile, when the sub feedback control has been performed for an adequately long time, the sub feedback amount converges on (comes close to) a certain value. The certain value is referred to as a convergence value. The convergence value indicates (or represents) a degree of a difference between an average of an air-fuel ratio of a gas flowing into the catalytic converter and the target downstream air-fuel ratio. In other words, the sub feedback amount converges on the convergence value that is affected by an error in measuring an air amount by an air-flow meter, an error in a fuel injection amount due to an injection property (characteristic) of a fuel injector, and an error in detecting the air-fuel ratio by the upstream air-fuel ratio sensor, and the like (hereinafter, these errors are referred to as "an intake-exhaust relating error".

Accordingly, for example, in a period before the downstream air-fuel ratio sensor is activated, or in a period from a timing at which the sub feedback control is started when the downstream air-fuel ratio sensor is activated to a timing at which the sub feedback amount reaches a value close to the convergence value, it is preferable that the air-fuel ratio of the engine be controlled using the convergence value of the sub feedback amount which was obtained in a previous operation of the engine.

In view of the above, the conventional apparatus performs a "learning (control)" in which a learning value is updated based on a "value according to the calculated sub feedback amount" while the sub feedback control is being performed. The "value according to the calculated sub feedback amount" is, for example, a "value according to a steady-state (stationary) component included in the sub feedback amount", such as an "integral term and/or a proportional term" which are/is a resultant value(s) of the proportional-integral processing.

The learning value is stored in a backup RAM (a stand-by RAM) included in the conventional apparatus, or in a nonvolatile memory such as an EEPROM. An electrical power is supplied to the backup RAM regardless of a position of an ignition key switch of a vehicle on which the engine is mounted. The backup RAM can retain (hold) "stored values (data)" as long as it is supplied with the electrical power from the battery. The conventional apparatus performs the control of the air-fuel ratio of the engine using the learning value.

According to the configuration described above, it is possible to compensate for an error (or a deviation) of the sub feedback amount from the convergence value by the learning value. That is, even when the sub feedback amount deviates from the convergence value before or immediately after the start of the sub feedback control, the deviation can be compensated by the learning value. As a result, the air-fuel ratio of the engine can be controlled in such a manner that it is always close to an appropriate value.

However, for example, when the electrical power supply "from the battery to the backup RAM" is stopped, such as when the battery is removed from the vehicle, and when the battery is completely discharged, the learning value stored in the backup RAM is lost (eliminated, broken). Further, the learning value stored in the backup RAM or the nonvolatile memory may be destroyed due to some electrical noise, or the like. In these cases, the learning value is set (returned) to an initial value (a default), and therefore, it is preferable to have the learning value come close to the convergence value in a short time (i.e., the learning be completed in a short time).

in view of the above, an air-fuel ratio control apparatus disclosed in Japanese Patent Application Laid-Open (kokai) No. Hei 5-44559 sets a changing/updating amount of the learning value (i.e., a changing speed of the learning value) to (at) a larger value after the learning value is set/returned to the initial value, or the like, to thereby have the learning value come closer to the convergence value in a short time (promptly). Accordingly, a period can be shortened in which "the air-fuel ratio of the engine deviates from the appropriate value due to an insufficient compensation for the intake-exhaust error, and thus, the emission becomes worse". It should be noted that this type of the "control for having the learning value come closer to the convergence value in a short time" is referred to as "an expedited (facilitated, accelerated) learning control".

SUMMARY OF THE INVENTION

However, in a period in which such an expedited learning control is being performed, when "a state in which the air-fuel ratio of the engine is disturbed/fluctuated transiently/temporarily" occurs, the sub feedback amount changes/varies to a value different from the convergence value temporarily due to the disturbance, and thus, the leaning value may deviate greatly from a value which the learning value is supposed to reach, because the changing speed is increased by the expedited learning control. Consequently, a period in which the air-fuel ratio of the engine deviates from the appropriate value may become longer, and the emission therefore may become worse.

As described later, the "state in which the air-fuel ratio of the engine is disturbed transiently" may occur, for example, in a case in which an evaporated fuel gas generated in a fuel tank is introduced in to an intake system to thereby be supplied to combustion chambers, and when a concentration of the evaporated fuel gas has varied rapidly from an expected concentration, or when the concentration of the evaporated fuel gas is higher than a predetermined concentration;

when an amount of an internal EGR gas (cylinder residual gas) (i.e., internal EGR amount) becomes excessively large;

when the internal EGR amount varies rapidly;

when an amount of an external EGR gas (exhaust recirculation gas) (i.e., external EGR amount) becomes excessively large;

when the external EGR amount varies rapidly;

when a concentration of alcohol contained in the fuel varies rapidly;

or the like.

The present invention is made to cope with the problem described above. One of objects of the present invention is to provide an air-fuel ratio control apparatus of a multi-cylinder internal combustion engine which can avoid an emission deterioration, by prohibiting the expedited learning control when the "state in which the air-fuel ratio of the engine is disturbed transiently" has occurred while the expedited learning control is being performed, in order to prevent the learning value from deviating from the appropriate value.

More specifically, the air-fuel ratio control apparatus of a multi-cylinder internal combustion engine according to the present invention is applied to the multi-cylinder internal combustion engine having a plurality of cylinders, and comprises a catalytic converter (e.g. a three-way catalyst), fuel injectors, a downstream air-fuel ratio sensor, first feedback amount updating/changing means, learning means, and air-fuel ratio control means.

The catalytic converter is disposed in an exhaust (gas) passage of the engine and at a position downstream of an "exhaust gas aggregated portion into which gases discharged from combustion chambers of at least two or more of a plurality of the cylinders merge/aggregate".

Each of the fuel injectors is a valve which injects a fuel to be included in a mixture (air-fuel mixture) supplied to each of the combustion chambers of the at least two or more of the cylinders.

The downstream air-fuel ratio sensor is a sensor, which is disposed in the exhaust passage and at a position downstream of the catalytic converter, and which outputs an output value according to an air-fuel ratio of a gas flowing at (through) the position at which the downstream air-fuel ratio sensor is disposed.

The first feedback amount updating means updates a "first feedback amount to have the output value of the downstream air-fuel ratio sensor coincide with a value corresponding to a target downstream-side air-fuel ratio" based on "the output value of the downstream air-fuel ratio sensor and the value corresponding to the target downstream-side air-fuel ratio", every time a predetermined first update timing arrives. For example, the first feedback amount updating means updates the first feedback amount based on a "first error" which is a difference between the "output value of the downstream air-fuel ratio sensor" and the "value corresponding to the target air-fuel ratio".

The learning means updates/changes a "learning value of the first feedback amount" in such a manner that the learning value brings in (or fetch in, deprives of) the steady-state component of the first feedback amount based on the first feedback amount, every time a predetermined second update timing arrives. To "bring in the steady-state component of the first feedback" means to "gradually approach (or come closer to) a value on which the first feedback amount converges under an assumption that the learning is not performed".

The air-fuel ratio control means controls an air-fuel ratio of the exhaust gas flowing into the catalytic converter by "controlling an amount of the fuel injected from the fuel injectors" based on at least one of the "first feedback amount" and the "learning value".

Further, the present air-fuel ratio control apparatus comprises expedited learning means, and prohibiting expedited learning means.

The expedited learning means infers/determines whether or not a state in which a difference (a second error) between the "learning value" and "a value on which the learning value is supposed to converge" is equal to or larger than a predetermined value. That is, the expedited learning means infers whether or not an insufficient learning state is occurring. Further, the expedited learning means performs/executes an expedited learning control to increase a changing speed of the learning value when it is inferred that the insufficient learning state is occurring as compared to when it is inferred that the insufficient learning state is not occurring.

The prohibiting expedited learning means infers/determines whether or not a "disturbance which varies/changes the air-fuel ratio of the mixture supplied to the combustion chambers of the at least two or more of the cylinders transiently" occurs. Further, the prohibiting expedited learning means prohibits the expedited learning control when it is inferred that the disturbance occurs.

According to the configuration described above, the expedited learning control is prohibited (including, terminated) when the disturbance which varies/changes the air-fuel ratio of the engine transiently is likely to occur, and therefore, it is possible to decrease a possibility that the learning value deviates from the appropriate value. Consequently, a period in which the emission becomes worse can be shortened.

It is preferable that the air-fuel ratio control means include:

an upstream air-fuel ratio sensor, which is disposed at the "aggregated exhaust gas portion" or "between the aggregated exhaust gas portion and the catalytic converter in the exhaust passage, and which outputs an output value according to an air-fuel ratio of a gas flowing at (through) a position at which the upstream air-fuel ratio sensor is disposed;

base fuel injection amount determining means for determining a base fuel injection amount to have the "air-fuel ratio of the mixture supplied to the combustion chambers of the at least two or more of the cylinders" coincide with a "target upstream-side air-fuel ratio which is an air-fuel ratio equal to the target downstream air-fuel ratio", based on an intake air amount of the engine and the target upstream-side air-fuel ratio;

second feedback amount updating means for updating/changing a "second feedback amount to correct the base fuel injection amount" based on the output value of the upstream air-fuel ratio sensor, the first feedback amount, and the learning value, in such a manner that the "air-fuel ratio of the mixture supplied to the combustion chambers of the at least two or more of the cylinders" coincides with the target upstream-side air-fuel ratio, every time a predetermined third update timing arrives; and fuel injection instruction means for instructing the fuel injectors to inject the fuel of a fuel injection amount obtained by "correcting the base fuel injection amount by (with) the second feedback amount".

According to the configuration described above, the fuel injection amount is corrected based on the output value of the upstream air-fuel ratio sensor, the first feedback amount, and the learning value. Accordingly, in the configuration, "an effect of the present invention which can avoid the emission deterioration" by "preventing in advance the learning value from deviating from the appropriate value by means of prohibiting the expedited learning control appropriately" is great.

The learning means may be configured so as to update the learning value in such a manner that the learning value "gradually comes close to (approach)" either the "first feedback amount" or the "steady-state component included in the first feedback amount".

In this case, the expedited learning means may be configured so as to instruct the first feedback amount updating means to increase a "changing speed of the first feedback amount" in such a manner that the changing speed of the first feedback amount "when it is inferred that the insufficient learning state is occurring is higher than that "when it is inferred that the insufficient learning state is not occurring".

According to the configuration described above, when it is inferred that the insufficient learning state is occurring, the changing speed of the first feedback amount is increased by the expedited learning means. Therefore, the first feedback amount approaches its convergence value more promptly (rapidly). Consequently, the changing speed of the learning value becomes eventually larger, since the learning value is updated in such a manner that the learning value "gradually comes close to" either the "first feedback amount" or the "steady-state component included in the first feedback amount". That is, the expedited learning control is realized.

Meanwhile, the expedited learning means may be configured so as to instruct the learning means to increase an approaching speed of the learning value toward the "first feedback amount" or the "steady-state component included in the first feedback amount" in such a manner the approaching speed when it is inferred that the insufficient learning state is occurring is higher than that when it is inferred that the insufficient learning state is not occurring.

According to the configuration described above, when it is inferred that the insufficient learning state is occurring, the "approaching speed of the learning value toward the first feedback amount" or the "approaching speed of the learning value toward the steady-state component included in the first feedback amount" is increased by the expedited learning means. That is, the expedited learning control is realized.

The air-fuel ratio control apparatus according to the present invention may comprise:

a fuel tank for storing fuel to be supplied to the fuel injectors;

a purge passage section connecting between the fuel tank and an intake passage of the engine to provide a "passage for allowing an evaporated fuel gas generated in the fuel tank to be introduced into the intake passage";

a purge control valve, which is disposed in the purge passage section, and which is configured in such a manner that its opening degree is changed in response to an instruction signal; and purge control means for providing to the purge control valve, the instruction signal to change the opening degree of the purge control valve according to an operating state of the engine.

That is, the air-fuel ratio control apparatus according to the present invention may comprise an evaporated fuel gas purge system.

In this case, the second feedback amount updating means may be configured so as to update, as an "evaporated fuel gas concentration learning value", a "value relating to a concentration of the evaporated fuel gas" based on "at least the output value of the upstream air-fuel ratio sensor" when the purge control valve is opened at a predetermined opening degree other than zero, and so as to update the second feedback amount further based on the evaporated fuel gas concentration learning value; and the prohibiting expedited learning means may be configured so as to infer that the "disturbance which varies the air-fuel ratio transiently" occurs, when the "number of updating times after a start of the engine" of the evaporated fuel gas concentration learning value is smaller than a "predetermined threshold of the number of updating times".

According to the configuration described above, when the evaporated fuel gas concentration learning value has not been updated sufficiently, that is, when an effect of the evaporated fuel gas on the air-fuel ratio of the engine is not compensated sufficiently by the second feedback amount, it is inferred that the "disturbance which varies the air-fuel ratio transiently due to the evaporated fuel gas purge" occurs. Accordingly, the expedited learning control is appropriately prohibited.

Further, in a case in which the air-fuel ratio control apparatus according to the present invention comprises the "evaporated fuel gas purge system", the prohibiting expedited learning means may be configured so as to obtain a value according to the concentration of the evaporated fuel gas (for example, the evaporated fuel gas concentration learning value, or an output value of an evaporated fuel gas concentration detecting sensor), and so as to infer that the disturbance which varies the air-fuel ratio transiently occurs when it is inferred based on the obtained value that the concentration of the evaporated fuel gas is higher than a predetermined concentration threshold.

When the concentration of the evaporated fuel gas is higher than the predetermined concentration threshold, the air-fuel ratio of the engine may vary transiently. This is because, for example, it is inferred that the high concentration evaporated fuel gas is not uniformly introduced into each of the cylinders, and therefore, a non-uniformity (imbalance) among air-fuel ratios of the cylinders occurs. Accordingly, the expedited learning control is appropriately prohibited by inferring that the "disturbance which varies the air-fuel ratio transiently due to the evaporated fuel gas" occurs when the concentration of the evaporated fuel gas is inferred to be higher than the predetermined concentration threshold, as described above.

Further, in a case in which the air-fuel ratio control apparatus according to the present invention comprises the "evaporated fuel gas purge system", the prohibiting expedited learning means may be configured so as to obtain a value according to the concentration of the evaporated fuel gas (for example, the evaporated fuel gas concentration learning value, or an output value of the evaporated fuel gas concentration detecting sensor), and so as to infer that the disturbance which varies the air-fuel ratio transiently occurs when it is inferred based on the obtained value that a changing speed of the concentration of the evaporated fuel gas is higher than a predetermined threshold of concentration changing speed.

When the changing speed of the concentration of the evaporated fuel gas is higher than the predetermined threshold of concentration changing speed, the air-fuel ratio of the engine may vary transiently. This is because, for example, it is inferred that a non-uniformity (imbalance) among air-fuel ratios of the cylinders occurs, since an amount of the evaporated fuel gas introduced into each of the cylinders is not uniform due to the high changing speed of the concentration of the evaporated fuel gas. Accordingly, the expedited learning control is appropriately prohibited by inferring that the "disturbance which varies the air-fuel ratio transiently due to the evaporated fuel gas" occurs when it is inferred that the changing speed of the concentration of the evaporated fuel gas is higher than the predetermined threshold of concentration changing speed, as described above.

Further, the air-fuel ratio control apparatus according to the present invention may comprise:

internal EGR gas amount control means (e.g., valve overlap period changing means described later) for controlling an "internal EGR amount (internal EGR gas amount)" in response to an operating state of the engine, the internal EGR amount being an amount of a "gas (cylinder residual gas), which is a burnt gas in each of the combustion chambers of the at least two or more of the cylinders, and which exists in each of the combustion chambers of each of the cylinders at a start timing of a compression stroke of each of the cylinders".

In this case, the prohibiting expedited learning means may be configured so as to infer that the disturbance which varies/changes the air-fuel ratio transiently occurs when it is inferred that a changing speed of the internal EGR amount is equal to or higher than a predetermined internal EGR amount changing speed threshold.

When the changing speed of the internal EGR amount is equal to or higher than the predetermined internal EGR amount changing speed threshold, the air-fuel ratio of the engine may vary transiently. This is because, for example, it is inferred that a non-uniformity (imbalance) among air-fuel ratios of the cylinders occurs, since the internal EGR amount of each of the cylinders is not uniform due to the high changing speed of the internal EGR amount. Alternatively, this is because it is inferred that an irregular combustion occurs since the internal EGR amount becomes excessively larger than an "expected internal EGR amount". Accordingly, the expedited learning control is appropriately prohibited by inferring that the "disturbance which varies the air-fuel ratio transiently due to the internal EGR" occurs when it is inferred that the changing speed of the internal EGR amount is equal to or higher than the predetermined internal EGR amount changing speed threshold, as described above.

Further, the air-fuel ratio control apparatus according to the present invention may comprise:

internal EGR amount changing means for changing a control parameter (e.g., valve overlap period described later, etc.) for varying an "internal EGR amount" in response to an instruction signal, the internal EGR amount being an amount of a "gas (cylinder residual gas), which is a burnt gas in each of the combustion chambers of the at least two or more of the cylinders, and which exists in each of the combustion chambers of each of the cylinders at a start timing of a compression stroke of each of the cylinders";

control parameter target value obtaining means for obtaining a target value of the "control parameter to change the internal EGR amount" in response to an operating state of the engine; and internal EGR amount control means for providing, to the internal EGR amount changing means, an instruction signal in such a manner that an actual value of the control parameter coincides with the target value of the control parameter; and wherein, the prohibiting expedited learning means may be configured so as to obtain an actual value of the control parameter to change the internal EGR amount, and so as to infer that the disturbance which varies the air-fuel ratio transiently occurs when it is inferred that the difference between the obtained actual value of the control parameter and the target value of the control parameter is equal to or larger than a predetermined control parameter difference threshold.

The control parameter to change the internal EGR amount is typically changed by an actuator having a mechanical structure/configuration, and therefore, the control parameter may overshoot with respect to the target value, for example. In such a case, the difference between the obtained actual value of the control parameter and the target value of the control parameter is equal to or larger than the predetermined control parameter difference threshold, and thus, the internal EGR amount becomes excessively large, and the changing speed of the internal EGR amount becomes high. Therefore, the air-fuel ratio of the engine may vary transiently. This is because, for example, it is inferred that a non-uniformity (imbalance) among air-fuel ratios of the cylinders occurs, since there is a big difference among the internal EGR amounts in the cylinders. Accordingly, the expedited learning control is appropriately prohibited by inferring that the "disturbance which varies the air-fuel ratio transiently due to the internal EGR" occurs when it is inferred that the difference between the obtained actual value of the control parameter and the target value of the control parameter is equal to or larger than the predetermined control parameter difference threshold, as described above.

Further, the air-fuel ratio control apparatus according to the present invention may comprise:

valve overlap period changing means for changing, in response to an operating state of the engine, a "valve overlap period in which both an intake valve and an exhaust valve are opened"; and wherein, the prohibiting expedited learning means may be configured so as to infer that the disturbance which varies the air-fuel ratio transiently occurs when it is inferred that a "changing speed of a duration (length) of the valve overlap period (i.e., a valve overlap amount)" is equal to or higher than a "predetermined valve overlap amount changing speed threshold".

The internal EGR amount varies depending on the "valve overlap amount (which is an amount represented by a width of crank angle corresponding to the valve overlap period, or the like)". Accordingly, when the changing speed of the valve overlap amount is equal to or larger than the valve overlap amount changing speed threshold, the air-fuel ratio of the engine may vary transiently. This is because, for example, it is inferred that a non-uniformity (imbalance) among air-fuel ratios of the cylinders occurs, since the internal EGR amount introduced into each of the cylinders is not uniform. Accordingly, the expedited learning control is appropriately prohibited by inferring that the "disturbance which varies the air-fuel ratio transiently due to the internal EGR" occurs when it is inferred that the changing speed of the valve overlap amount is equal to or higher than the valve overlap amount changing speed threshold, as described above.

Further, the air-fuel ratio control apparatus according to the present invention may comprise:

valve overlap period changing means for changing a "valve overlap period in which both an intake valve and an exhaust valve are opened" in such a manner that the valve overlap period coincides with a “target overlap period determined based on an operating state of the engine”; and wherein, the prohibiting expedited learning means may be configured so as to obtain an “actual value of the valve overlap amount which is a duration (length) of the valve overlap period”, and so as to infer that the disturbance which varies the air-fuel ratio transiently occurs when it is inferred that a difference (i.e., a valve overlap amount difference) between the “obtained value of the valve overlap amount” and a “target overlap amount which is a duration (length) of the target overlap period” is equal to or longer than a “predetermined valve overlap amount difference threshold”.

As described before, the internal EGR amount varies depending on the “valve overlap period”. The valve overlap period is changed/adjusted so as to coincide with the target overlap period which is determined based on the operating state of the engine. However, the valve overlap period is typically changed/adjusted by an actuator including a mechanical structure/configuration, and therefore, the “valve overlap amount which is the duration (length) of the valve overlap period” may overshoot with respect to the “target overlap amount which is the duration (length) of the target overlap period”, for example. In such a case, the air-fuel ratio of the engine may vary transiently. This is because, for example, there may be a big difference among the internal EGR amounts of the cylinders, since the internal EGR amount becomes excessively large and the changing speed of the internal EGR amount becomes high when such an overshoot occurs, and consequently, a non-uniformity (imbalance) among air-fuel ratios of the cylinders occurs. Accordingly, as described before, the expedited learning control is appropriately prohibited by inferring that the “disturbance which varies the air-fuel ratio transiently due to the internal EGR” occurs, when it is inferred that the difference between the “obtained actual value of the valve overlap amount” and the “target overlap amount which is the duration of the target overlap period” is equal to or longer than the “predetermined valve overlap amount difference threshold”.

Further, the air-fuel ratio control apparatus according to the present invention may comprise:

intake valve opening timing control means for changing, based on an operating state of the engine, an opening timing of an intake valve of each of the at least two or more of the cylinders; and wherein, the prohibiting expedited learning means may be configured so as to infer that the disturbance which varies the air-fuel ratio transiently occurs when it is inferred that a changing speed of the opening timing of the intake valve is equal to or higher than a “predetermined intake valve opening timing changing speed threshold”.

Typically, an intake valve opening timing and an exhaust valve closing timing are determined so as to provide the “valve overlap period”. Therefore, the internal EGR amount varies depending on the intake valve opening timing which is a “start timing of the valve overlap period” (e.g., the intake valve opening timing is represented/expressed by an intake valve opening timing advance angle which is an advance angle with respect to an intake top dead center as a reference).

Accordingly, when the changing speed of the opening timing of the intake valve is equal to or higher than the predetermined intake valve opening timing changing speed threshold, the air-fuel ratio of the engine may vary transiently. This is because, for example, a non-uniformity (imbalance) among air-fuel ratios of the cylinders occurs, since the internal EGR amount introduced into each of the cylinders is not uniform. Accordingly, as described above, the expedited learning control is appropriately prohibited by inferring that the “disturbance which varies the air-fuel ratio transiently due to the internal EGR” occurs when it is inferred that the changing speed of the opening timing of the intake valve is equal to or higher than the predetermined intake valve opening timing changing speed threshold.

Further, the air-fuel ratio control apparatus according to the present invention may comprise:

intake valve opening timing control means for changing an opening timing of an intake valve of each of the at least two or more of the cylinders” in such a manner that the opening timing of the intake valve coincides with a “target opening timing of the intake valve determined based on an operating state of the engine”; and wherein, the prohibiting expedited learning means may be configured so as to obtain an “actual opening timing of the intake valve”, and so as to infer that the disturbance which varies the air-fuel ratio transiently occurs when it is inferred that a difference between the “obtained actual opening timing of the intake valve” and the “target opening timing of the intake valve” becomes equal to or larger than a “predetermined intake valve opening timing difference threshold”.

As described before, the internal EGR amount varies depending on the intake valve opening timing which is the “start timing of the valve overlap period”. However, the intake valve opening timing is typically changed by the actuator including the mechanical structure, and thus, for example, the intake valve opening timing may overshoot with respect to the target opening timing.

In such a case, the difference between the “obtained actual opening timing of the intake valve” and the “target opening timing of the intake valve” becomes equal to or larger than the “predetermined intake valve opening timing difference threshold”, and therefore, the internal EGR amount becomes excessively large and the changing speed of the internal EGR amount becomes high. Consequently, the air-fuel ratio of the engine may vary transiently. This is because, for example, it is inferred that there is a big difference among the internal EGR amounts in the cylinders, and consequently, a non-uniformity (imbalance) among air-fuel ratios of the cylinders occurs. Accordingly, as described above, the expedited learning control is appropriately prohibited by inferring that the “disturbance which varies the air-fuel ratio transiently due to the internal EGR” occurs, when it is inferred that the difference between the “obtained actual opening timing of the intake valve” and the “target opening timing of the intake valve” becomes equal to or larger than the “predetermined intake valve opening timing difference threshold”.

Further, the air-fuel ratio control apparatus according to the present invention may comprise:

exhaust valve closing timing control means for changing, based on an operating state of the engine, a closing timing of an exhaust valve of each of the at least two or more of the cylinders; and wherein, the prohibiting expedited learning means may be configured so as to infer that the disturbance which varies the air-fuel ratio transiently occurs when it is inferred that a changing speed of the closing timing of the exhaust valve is equal to or higher than a “predetermined exhaust valve closing timing changing speed threshold”.

As described above, the intake valve opening timing and the exhaust valve closing timing are typically determined so as to provide the “valve overlap period”. Therefore, the internal EGR amount varies depending on the exhaust valve closing timing which is an “end timing of the valve overlap period” (e.g., the exhaust valve closing timing is represented/ expressed by an exhaust valve closing timing retard angle which is a retard angle with respect to the intake top dead center as the reference).

Accordingly, when the changing speed of the closing timing of the exhaust valve is equal to or higher than the predetermined exhaust valve closing timing changing speed threshold, the air-fuel ratio of the engine may vary transiently. This is because, for example, a non-uniformity (imbalance) among air-fuel ratios of the cylinders occurs, since the internal EGR amount introduced into each of the cylinders is not uniform. Accordingly, as described above, the expedited learning control is appropriately prohibited by inferring that the "disturbance which varies the air-fuel ratio transiently due to the internal EGR" occurs when it is inferred that the changing speed of the closing timing of the exhaust valve is equal to or higher than the predetermined exhaust valve closing timing changing speed threshold.

Further, the air-fuel ratio control apparatus according to the present invention may comprise:

exhaust valve closing timing control means for changing a closing timing of an exhaust valve of each of the at least two or more of the cylinders" in such a manner that the closing timing of the exhaust valve coincides with a "target closing timing of the exhaust valve determined based on an operating state of the engine"; and wherein, the prohibiting expedited learning means may be configured so as to obtain an actual closing timing of the exhaust valve, and so as to infer that the disturbance which varies the air-fuel ratio transiently occurs when it is inferred that a difference between the obtained actual closing timing of the exhaust valve and the target closing timing of the exhaust valve becomes equal to or larger than a predetermined exhaust valve closing timing difference threshold.

As described before, the internal EGR amount varies depending on the exhaust valve closing timing which is the "end timing of the valve overlap period". However, the exhaust valve closing timing is typically changed by the actuator including the mechanical structure, and thus, for example, the exhaust valve closing timing may overshoot with respect to the target closing timing.

In such a case, the difference between the "obtained actual closing timing of the exhaust valve" and the "target closing timing of the exhaust valve" becomes equal to or larger than the "predetermined exhaust valve closing timing difference threshold", and therefore, the internal EGR amount becomes excessively large and the changing speed of the internal EGR amount becomes high. Consequently, the air-fuel ratio of the engine may vary transiently. This is because, for example, it is inferred that there is a big difference among the internal EGR amounts in the cylinders, and consequently, a non-uniformity (imbalance) among air-fuel ratios of the cylinders occurs. Accordingly, as described above, the expedited learning control is appropriately prohibited by inferring that the "disturbance which varies the air-fuel ratio transiently due to the internal EGR" occurs, when it is inferred that the difference between the "obtained actual closing timing of the exhaust valve" and the "target closing timing of the exhaust valve" becomes equal to or larger than the "predetermined exhaust valve closing timing difference threshold".

Further, the air-fuel ratio control apparatus according to the present invention may comprise:

an exhaust gas recirculation pipe connecting between a "portion upstream of the catalytic converter in the exhaust passage of the engine" and the "intake passage of the engine";

an EGR valve, which is disposed in the exhaust gas recirculation pipe, and which is configured in such a manner that its opening degree is changed in response to an instruction signal; and external EGR amount control means for changing an "an amount of an external EGR (exhaust gas recirculation amount) introduced into the intake passage through flowing in the exhaust gas recirculation pipe" by providing, to the EGR valve, the instruction signal to change the opening degree of the EGR valve according to an operating state of the engine.

That is, the air-fuel ratio control apparatus according to the present invention may comprise an external EGR system (exhaust gas recirculation system).

In this case, the prohibiting expedited learning means may be configured so as to infer that the disturbance which varies the air-fuel ratio transiently occurs when it is inferred that a changing speed of the external EGR amount is equal to or higher than a predetermined external EGR amount changing speed threshold.

When the changing speed of the external EGR amount is equal to or higher than the predetermined external EGR amount changing speed threshold, the air-fuel ratio of the engine may vary transiently. This is because, for example, it is inferred that a non-uniformity (imbalance) among air-fuel ratios of the cylinders occurs, since the external EGR amount of each of the cylinders is not uniform due to the high changing speed of the external EGR amount. Alternatively, this is because it is inferred that the external EGR amount becomes excessively larger than an "expected external EGR amount". Accordingly, the expedited learning control is appropriately prohibited by inferring that the "disturbance which varies the air-fuel ratio transiently due to the external EGR" occurs when it is inferred that the changing speed of the external EGR amount is equal to or higher than the predetermined external EGR amount changing speed threshold, as described above.

Further, in the case in which the air-fuel ratio control apparatus according to the present invention comprises the external EGR system, the prohibiting expedited learning means may be configured so as to obtain an actual opening degree of the EGR valve, and so as to infer that the disturbance which varies the air-fuel ratio transiently occurs when it is inferred that a difference between the obtained actual opening degree of the EGR valve and an opening degree of the EGR valve determined based on the instruction signal provided to the EGR valve becomes equal to or larger than a predetermined EGR valve opening degree difference threshold.

The external EGR amount is changed by the opening degree of the EGR valve, and therefore, when the EGR valve comprises, for example, a DC motor, a switching valve, or the like, the opening degree of the EGR valve may overshoot with respect to its target value. In such a case, the difference between the "obtained actual opening degree of the EGR valve" and the "opening degree of the EGR valve determined based on the instruction signal provided to the EGR valve" becomes equal to or larger than the "predetermined EGR valve opening degree difference threshold".

In such a case, the external EGR amount becomes excessively large and the changing speed of the external EGR amount becomes high. Therefore, the air-fuel ratio of the engine may vary transiently. This is because, for example, it is inferred that a non-uniformity (imbalance) among air-fuel ratios of the cylinders occurs, since there is a big difference among the external EGR amounts in the cylinders. Accordingly, the expedited learning control is appropriately prohibited by inferring that the "disturbance which varies the air-fuel ratio transiently due to the external EGR" occurs when it is inferred that the difference between the "obtained actual opening degree of the EGR valve" and the "opening degree of the EGR valve determined based on the instruction signal provided to the EGR valve" becomes equal to or larger than "the predetermined EGR valve opening degree difference threshold".

Meanwhile, it is preferable that the expedited learning means be configured so as to infer that the insufficient learning state is occurring when a changing/updating speed of the learning value is equal to or larger than a predetermined learning value changing speed threshold.

This is because the changing/updating speed of the learning value is equal to or larger than the predetermined learning value changing speed threshold in the insufficient learning state.

Further, in a case in which the air-fuel ratio control apparatus according to the present invention comprises the upstream air-fuel ratio sensor, the upstream air-fuel ratio sensor may comprise a diffusion resistance layer with which the exhaust gas which has not passed through the catalytic converter contacts, and an air-fuel ratio detecting element which outputs the output value.

In this case, the present air-fuel ratio control apparatus may comprise:

parameter for imbalance determination obtaining means for obtaining, based on the learning value, a parameter for imbalance determination which increases as a difference between "an amount of hydrogen included in the exhaust gas which has not passed through the catalytic converter" and "an amount of hydrogen included in the exhaust gas which has passed through the catalytic converter" becomes larger; and air-fuel ratio imbalance determining means among cylinders for determining that there is a non-uniformity among "individual cylinder air-fuel ratios of mixtures, each being supplied to each of the at least two or more of the cylinders", when the obtained parameter for imbalance determination is equal to or larger than an abnormality determination threshold.

As described later, even when a true average of an air-fuel ratio of a mixture supplied to the entire engine (the at least two or more of the cylinders) is coincided with, for example, the stoichiometric air-fuel ratio by a feedback control, a total amount SH1 of hydrogen included in the exhaust gas when the air-fuel ratio imbalance among cylinders is occurring is prominently larger than a total amount SH2 of hydrogen included in the exhaust gas when the air-fuel ratio imbalance among cylinders is not occurring. Hydrogen can move (diffuse) in the diffusion resistance layer more quickly than the other unburnt substances (HC, CO), and therefore, the upstream air-fuel ratio sensor outputs an output value corresponding to an air-fuel ratio richer than an actual air-fuel ratio, when an amount of hydrogen is great. Consequently, the true average of the air-fuel ratio of the mixture supplied to the entire engine is controlled so as to be an air-fuel ratio leaner than the stoichiometric air-fuel ratio, owing to the feedback control (control based on the second feedback amount) based on the output value of the upstream air-fuel ratio sensor.

Meanwhile, the exhaust gas which has passed through the catalytic converter reaches the downstream air-fuel ratio sensor. The hydrogen included in the exhaust gas is purified (oxidized) in the catalytic converter together with the other unburnt substances (HC, CO). Accordingly, the output value of the downstream air-fuel ratio sensor becomes a value corresponding to the true air-fuel ratio of the mixture supplied to the entire engine. Therefore, the first feedback amount updated/changed so as to have the output value of the downstream air-fuel ratio sensor coincide with a value corresponding to the target downstream-side air-fuel ratio (e.g., the stoichiometric), and its learning value, become values which compensate for an excessive correction toward leaner air-fuel ratio caused by the feedback control based on the output value of the upstream air-fuel ratio sensor. It is therefore possible to obtain, based on the learning value, the parameter for imbalance determination which increases as the difference between "the amount of hydrogen included in the exhaust gas after passing through the catalytic converter" and "the amount of hydrogen included in the exhaust gas before passing through the catalytic converter" becomes larger.

In addition, according to the present invention, the learning value can come close to the appropriate value promptly and unerroneously, and the parameter for imbalance determination therefore also becomes an accurate value.

Further, it can be determined that the non-uniformity among "individual cylinder air-fuel ratios of mixtures, each being supplied to each of the at least two or more of the cylinders" is occurring, when the obtained parameter for imbalance determination is equal to or larger than the abnormality determination threshold.

More specifically, the parameter for imbalance determination obtaining means may be configured so as to obtain the parameter for imbalance determination in such a manner that the parameter for imbalance determination increases as the learning value increases. Consequently, the air-fuel ratio control apparatus including a "practical air-fuel ratio imbalance among cylinders determining apparatus" can be provided.

DESCRIPTION OF THE BEST EMBODIMENT TO CARRY OUT THE INVENTION

Each of embodiments of an air-fuel ratio control apparatus of a multi-cylinder engine according to the present invention will next be described with reference to the drawings. The air-fuel ratio control apparatus is also a fuel injection amount control apparatus for controlling a fuel injection amount in order to control the air-fuel ratio of the engine.

First Embodiment

<Structure>

Figure 1:
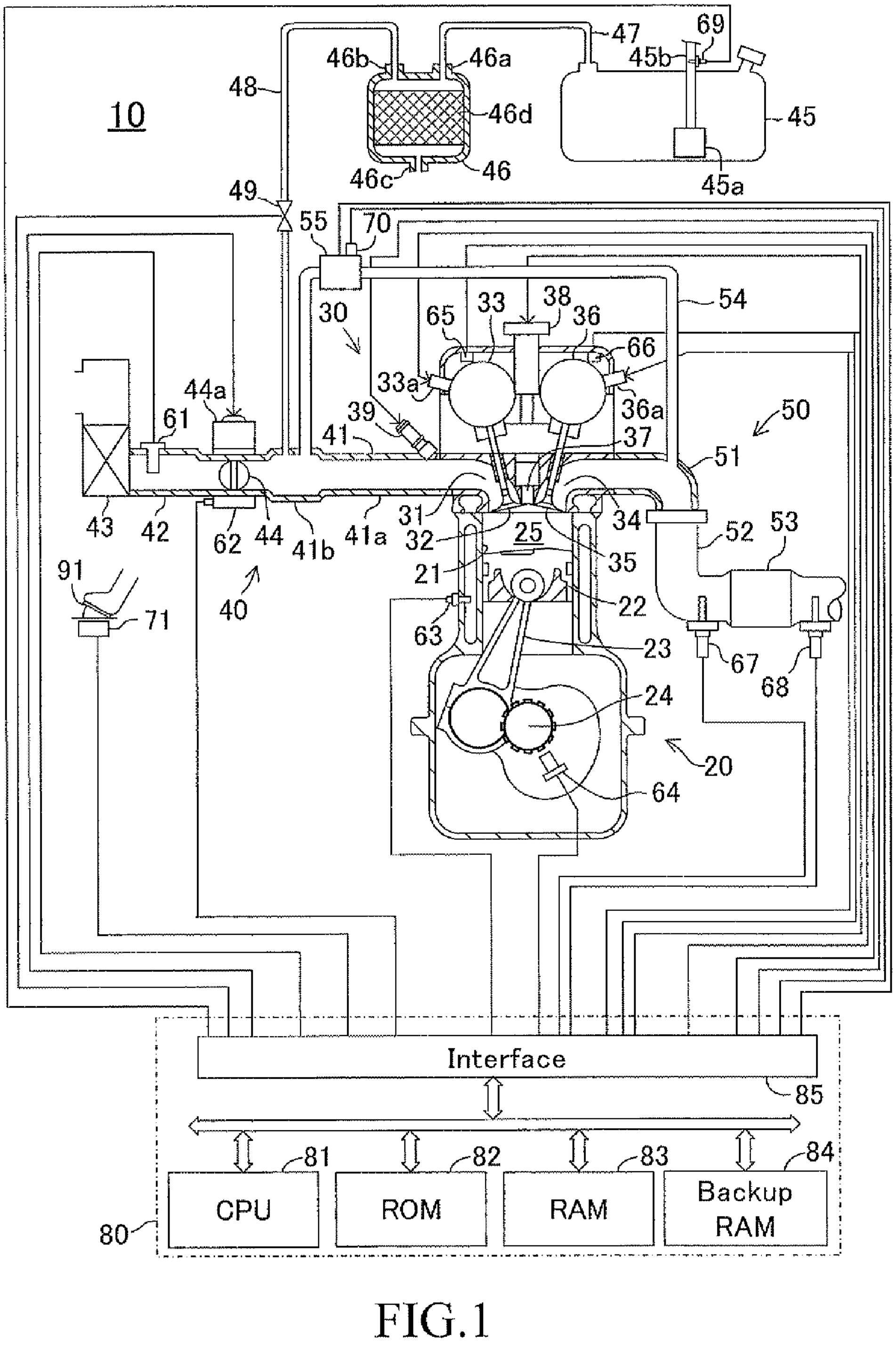
FIG. 1 is a schematic view of an internal combustion engine to which an air-fuel ratio control apparatus according to embodiments of the present invention is applied.

FIG. 1 shows a schematic configuration of a system in which an air-fuel ratio control apparatus of a multi-cylinder internal combustion engine according to a first embodiment (hereinafter, referred to as a "first control apparatus") is applied to a 4 cycle, spark-ignition, multi-cylinder (4 cylinder) internal combustion engine 10. FIG. 1 shows a section of a specific cylinder only, but other cylinders also have similar configurations.

The internal combustion engine 10 includes a cylinder block section 20 including a cylinder block, a cylinder block lower-case, an oil pan, and so on; a cylinder head section 30 fixed on the cylinder block section 20; an intake system 40 for supplying a gasoline mixture to the cylinder block section 20; and an exhaust system 50 for discharging an exhaust gas from the cylinder block section 20 to the exterior of the engine.

The cylinder block section 20 includes cylinders 21, pistons 22, connecting rods 23, and a crankshaft 24. The piston 22 reciprocates within the cylinder 21, and the reciprocating motion of the piston 22 is transmitted to the crankshaft 24 via the connecting rod 23, thereby rotating the crankshaft 24. The wall surface of the cylinder 21, the top surface of the piston 22, and the bottom surface of a cylinder head section 30 form a combustion chamber 25.

The cylinder head section 30 includes intake ports 31, each communicating with the combustion chamber 25; intake valves 32 for opening and closing the intake ports 31; a variable intake timing control unit 33 including an intake cam shaft to drive the intake valves 32 for continuously change the phase angle of the intake cam shaft; an actuator **33*a* of the variable intake timing control unit 33; exhaust ports 34, each communicating with the combustion chamber 25; exhaust valves 35 for opening and closing the exhaust ports 34; a variable exhaust timing control unit 36 including an exhaust cam shaft to drive the exhaust valves 35 for continuously change the phase angle of the exhaust cam shaft; an actuator 36*a* of the variable exhaust timing control unit 36; spark plugs 37; igniters 38, each including an ignition coil for generating a high voltage to be applied to the spark plug 37; and fuel injectors (fuel injection means, fuel supply means) 39 each of which injects a fuel into the intake port 31**.

Figure 2:
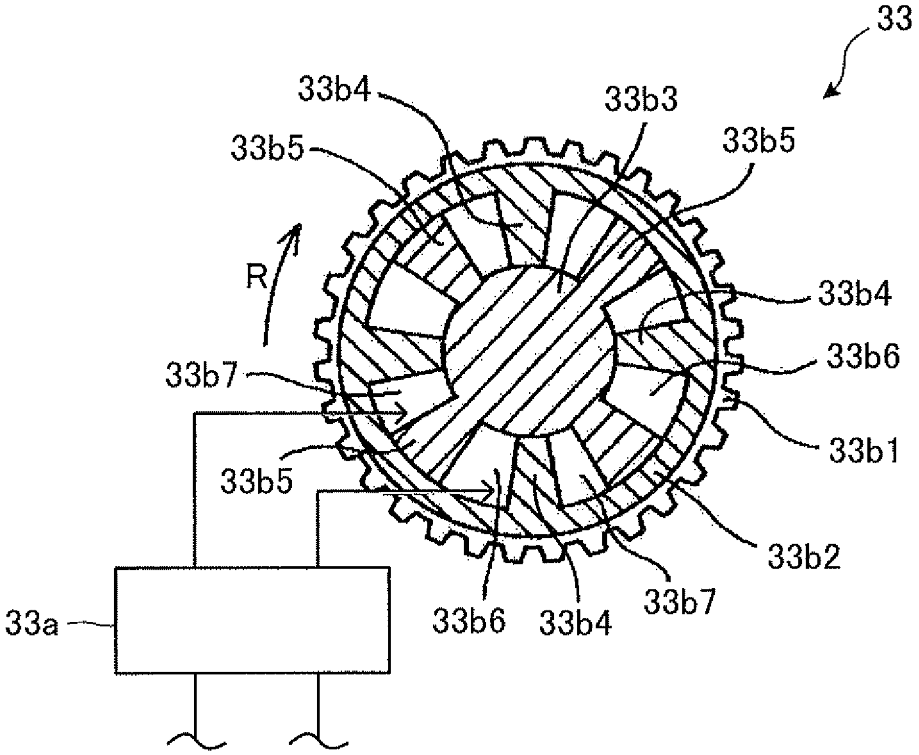
FIG. 2 is a schematic sectional view of a variable intake timing control unit shown in FIG. 1.

The variable intake timing control unit 33 (variable valve timing mechanism) is a well-known unit disclosed, for example, in Japanese Patent Application Laid-Open (kokai) No. 2007-303423, and so on. Hereinafter, the variable intake timing control unit 33 will next be described briefly with reference to FIG. 2 showing a schematic sectional view of the variable intake timing control unit 33.

The variable intake timing control unit 33 comprises a timing pulley **33*b*1, a cylindrical housing 33*b*2, a rotating shaft 33*b*3, a plurality of intervening walls 33*b*4, and a plurality of vanes 33*b*5**.

The timing pulley **33*b*1 is rotated, in a direction shown by an arrow R, by the crank shaft 24 of the engine 10 through an unillustrated timing belt. The cylindrical housing 33*b*2 rotates integrally with the timing pulley 33*b*1. The rotating shaft 33*b*3 rotates integrally with the intake cam shaft, and rotates relatively to the cylindrical housing 33*b*2. The intervening wall 33*b*4 extends from an inner circumferential surface of the cylindrical housing 33*b*2 to an outer circumferential surface of the rotating shaft 33*b*3. The vane 33*b*5** extends from the outer circumferential surface of the rotating shaft 33*b*3 to the inner circumferential surface of the cylindrical housing 33*b*2, at a position between two intervening walls 33*b*4 adjacent to each other. This structure provides an oil pressure chamber for advance 33*b*6 and an oil pressure chamber for retard 33*b*7 at both side of each vane 33*b*5. When an operating oil is supplied to one of the oil pressure chamber for advance 33*b*6 and the oil pressure chamber for retard 33*b*7, an operating oil is discharged from the other one of chambers.

A control of supply and discharge of the operating oil to and from the oil pressure chamber for advance 33*b*6 and the oil pressure chamber for retard 33*b*7 is performed by the actuator 33*a* shown in FIG. 1 including an operating oil supply control valve, and an unillustrated oil pump. The actuator 33*a* is an electromagnetically-driven type, and performs the control of supply and discharge of the operating oil in response to an instruction signal (drive signal). That is, in order to advance the phase of the cam of the intake cam shaft, the actuator 33*a* supplies the operating oil to the oil pressure chamber for advance 33*b*6, and discharges the operating oil from the oil pressure chamber for retard 33*b*7. At this time, the rotating shaft 33*b*3 is rotated in the direction shown by the arrow R relative to the cylindrical housing 33*b*2. In contrast, in order to retard the phase of the cam of the intake cam shaft, the actuator 33*a* supplies the operating oil to the oil pressure chamber for retard 33*b*7, and discharges the operating oil from the oil pressure chamber for advance 33*b*6. At this time, the rotating shaft 33*b*3 is rotated in a reverse direction shown by the arrow R relative to the cylindrical housing 33*b*2.

Further, when the supply and discharge of the operating oil to and from the oil pressure chamber for advance 33*b*6 and the oil pressure chamber for retard 33*b*7 are stopped, the rotation of the rotating shaft 33*b* relative to the cylindrical housing 33*b*2 is stopped, and the rotating shaft 33*b*3 is maintained at a position when the supply and discharge of the operating oil are stopped. In this way, the variable intake timing control unit 33 can advance and retard the phase of the cam of the intake cam shaft by a desired amount.

According to the variable intake timing control unit 33, a length of a period in which the intake valve 32 is opened (valve opening crank angle width) is determined by a profile of the cam of the intake cam shaft, and is therefore constant. That is, when the opening timing INO of the intake valve is advanced or retarded by a certain degree by the variable intake timing control unit 33, the closing timing INC of the intake valve is also advanced or retarded by the same certain degree.

It should be noted that the variable intake timing control unit 33 described above may be replaced by an "electrical variable intake timing control unit" disclosed in, for example, Japanese Patent Application Laid-Open (kokai) No. 2000-150397, and so on. The electrical variable intake timing control unit comprises an electromagnetic coil and a plurality of gears. The unit changes relative rotational positions of the plurality of gears by a magnetic force generated by the electromagnetic coil in response to an instruction signal (drive signal), and thereby can advance and retard the phase of the cam of the intake cam shaft by a desired amount.

The variable exhaust timing control unit 36 is fixed on an end of the exhaust cam shaft. The variable exhaust timing control unit 36 has a configuration similar to that of the variable intake timing control unit 33. In addition, the variable intake timing control unit 33 and the variable exhaust timing control unit 36 can control the opening-and-closing timings of the intake valve 32 and the exhaust valve 35 independently from each other. It should be noted that the variable exhaust timing control unit 36 may be replaced by an "electrical variable exhaust timing control unit", similarly.

According to the variable exhaust timing control unit 36, a length of a period in which the exhaust valve 35 is opened (valve opening crank angle width) is determined by a profile of the cam of the exhaust cam shaft, and is therefore constant. That is, when the closing timing EXC of the exhaust valve is advanced or retarded by a certain degree by the variable exhaust timing control unit 36, the opening timing EXO of the exhaust valve is also advanced or retarded by the same certain degree.

Referring back to FIG. 1, each of the fuel injectors 39 is provided for each of the combustion chambers 25 of each of the cylinders one by one. Each of the fuel injectors 39 is fixed at each of the intake ports 31. Each of the fuel injectors 39 is configured so as to inject, in response to an injection instruction signal, "a fuel of an instructed injection amount included in the injection instruction signal" into the corresponding intake port 31, when the fuel injector 39 is normal. In this way, each of the plurality of the cylinders comprises the fuel injector 39 for supplying the fuel independently from the other cylinders.

The intake system 40 includes an intake manifold 41, an intake pipe 42, an air filter 43, and a throttle valve 44. The intake manifold 41 includes a plurality of branch portions 41*a*, and a surge tank 41*b*. An end of each of a plurality of the branch portions 41*a* is connected to each of the intake ports 31. The other end of each of a plurality of the branch portions 41*a* is connected to the surge tank 41*b*. An end of the intake pipe 42 is connected to the surge tank 41*b*. The air filter 43 is disposed at the other end of the intake pipe 42. The throttle valve 44 is provided in the intake pipe 42, and is configured so as to adjust/vary an opening sectional area of an intake passage. The throttle valve 44 is configured so as to be rotatably driven by the throttle valve actuator 44*a* including a DC motor.

Further, the internal combustion engine 10 includes a fuel tank 45 for storing liquid gasoline fuel; a canister 46 which is capable of adsorbing an evaporated fuel (gas) generated in the fuel tank 45; a vapor collection pipe 47 for introducing a gas containing the evaporated fuel into the canister 46 from the fuel tank 45; a purge passage pipe 48 for introducing, as an "evaporated fuel gas", an evaporated fuel which is desorbed from the canister 46 into the surge tank 41*b*; and a purge control valve 49 disposed in the purge passage pipe 48. The fuel stored in the fuel tank 45 is supplied to the fuel injectors 39 through a fuel pump 45*a*, a fuel supply pipe 45*b*, and so on. The vapor collection pipe 47 and the purge passage pipe 48 form (constitute) a purge passage (purge passage section).

The purge control valve 49 is configured so as to vary a cross-sectional area of a passage formed by the purge passage pipe 48 by adjusting an opening degree (opening period) of the valve 49 based on a drive signal representing a duty ratio DPG which is an instruction signal. The purge control valve 49 fully/completely closes the purge passage pipe 48 when the duty ratio DPG is "0". That is, the purge control valve 49 is configured in such a manner that it is disposed in the purge passage, and its opening degree is varied in response to the instruction signal.

The canister 46 is a well-known charcoal canister. The canister 46 includes a housing which has a tank port 46*a* connected to the vapor collection pipe 47, a purge port 46*b* connected to the purge passage pipe 48, and an atmosphere port 46*c* exposed to atmosphere. The canister 46 accommodates, in the housing, adsorbents 46*d* for adsorbing the evaporated fuel. The canister 46 adsorbs and stores the evaporated fuel generated in the fuel tank 45 while (or during a period for which) the purge control valve 49 is completely closed. The canister 46 discharges the adsorbed/stored evaporated fuel, as the evaporated fuel gas, into the surge tank 41*b* (i.e., into the intake passage at a position downstream of the throttle valve 44) through the purge passage pipe 48 while (or during a period for which) the purge control valve 49 is opened. This allows the evaporated fuel gas to be supplied to the combustion chambers 25. That is, by opening the purge control valve 49, an evaporated fuel gas purge (or an evapo-purge for short) is carried out.

The exhaust system 50 includes an exhaust manifold 51 including a plurality of branch portions having ends each of which communicates with each of the exhaust ports 34 of each of the cylinders; an exhaust pipe 52 communicating with an aggregated portion (an exhaust gas aggregated portion of the exhaust manifold 51) into which the other ends of the plurality branch portions of the exhaust manifold 51 merge (aggregate); an upstream-side catalytic converter (catalyst) 53 disposed in the exhaust pipe 52; and an unillustrated downstream-side catalytic converter (catalyst) disposed in the exhaust pipe 52 at a position downstream of the upstream-side catalytic converter 53. The exhaust ports 34, the exhaust manifold 51, and the exhaust pipe 52 form (constitute) an exhaust passage. In this way, the upstream-side catalytic converter 53 is disposed in the exhaust passage at a "position downstream of the exhaust gas aggregated portion into which exhaust gases discharged from all of the combustion chambers 25 (or at least two or more of the combustion chambers) merge/aggregate".

Each of the upstream-side catalytic converter 53 and the downstream-side catalytic converter is so-called a three-way catalytic unit (exhaust gas purifying catalyst) which supports active components formed of noble (precious) metals such as Platinum. Each catalytic converter has a function for oxidizing unburnt substances (HC, CO, and so on) and reducing nitrogen oxide (NOx) simultaneously, when an air-fuel ratio of a gas flowing into the catalytic converter is equal to the stoichiometric. This function is referred to as a catalytic function. Further, each catalytic converter has an oxygen storage function for storing oxygen. The oxygen storage function allows the catalytic converter to purify unburnt substances and nitrogen oxide, even when the air-fuel ratio deviates from the stoichiometric air-fuel ratio. The oxygen storage function is given by ceria ($CeO_2$) supported in the catalytic converter.

Further, the engine 10 includes an exhaust gas recirculation system. The exhaust gas recirculation system includes exhaust gas recirculation pipe 54 forming an external EGR passage, and an EGR valve 55.

One end of the exhaust gas recirculation pipe 54 is connected to the aggregated portion of the exhaust manifold 51. The other end of the exhaust gas recirculation pipe 54 is connected to the surge tank 41*b*.

The EGR valve 55 is disposed in the exhaust gas recirculation pipe 54. The EGR valve 55 includes a DC motor as a drive source. The EGR valve 55 changes valve opening (degree) in response to a duty ratio DEGR which is an instruction signal to the DC motor, to thereby vary a cross-sectional area of the exhaust gas recirculation pipe 54. The EGR valve 55 fully/completely closes the exhaust gas recirculation pipe 54 when the duty ratio DEGR is "0". That is, the EGR valve 55 is configured in such a manner that it is disposed in the external EGR passage, and its opening degree is varied in response to the instruction signal so as to control an amount of exhaust gas recirculation (hereinafter, referred to as an "external EGR amount").

The system includes a hot-wire air flowmeter 61, a throttle position sensor 62; a water temperature sensor 63; a crank position sensor 64, an intake cam position sensor 65, an exhaust cam position sensor 66, an upstream air-fuel ratio sensor 67, a downstream air-fuel ratio sensor 68, an alcohol concentration sensor 69, an EGR valve opening degree sensor (EGR valve lift sensor) 70, and an accelerator opening sensor 71.

The air flowmeter 61 outputs a signal indicative of a mass flow rate Ga of an intake air flowing through the intake pipe 42.

The throttle position sensor 62 detects an opening degree (throttle valve opening angle) of the throttle valve 44 to output a signal indicative of the throttle valve opening angle TA.

The water temperature sensor 63 detects a temperature of the cooling water of the internal combustion engine 10 to output a signal indicative of a cooling-water temperature THW.

The crank position sensor 64 outputs a signal which has a narrow pulse every 10° rotation of the crank shaft 24 and a wide pulse every 360° rotation of the crank shaft 24. The signal is converted into an engine rotational speed NE by the electric controller 80 described later.

The intake cam position sensor 65 generates a single pulse signal every time the intake cam shaft rotates by 90 degrees, further 90 degrees, and further 180 degrees from a predetermined angle.

The exhaust cam position sensor 66 generates a single pulse signal every time the exhaust cam shaft rotates by 90 degrees, further 90 degrees, and further 180 degrees from a predetermined angle.

The upstream air-fuel ratio sensor 67 is disposed in the exhaust passage and a position between "the exhaust gas aggregated portion (aggregated portion of the branch portions of the exhaust manifold 51) and the upstream-side catalytic converter 53". The upstream air-fuel ratio sensor 67 may be disposed at the exhaust gas aggregated portion. As described later in detail, the upstream air-fuel ratio sensor 67 is a "wide range air-fuel ratio sensor of a limiting current type having a diffusion resistance layer" described in, for example, Japanese Patent Application Laid-Open (kokai) No. Hei 11-72473, Japanese Patent Application Laid-Open No. 2000-65782, and Japanese Patent Application Laid-Open No. 2004-69547, etc.

Figure 3:
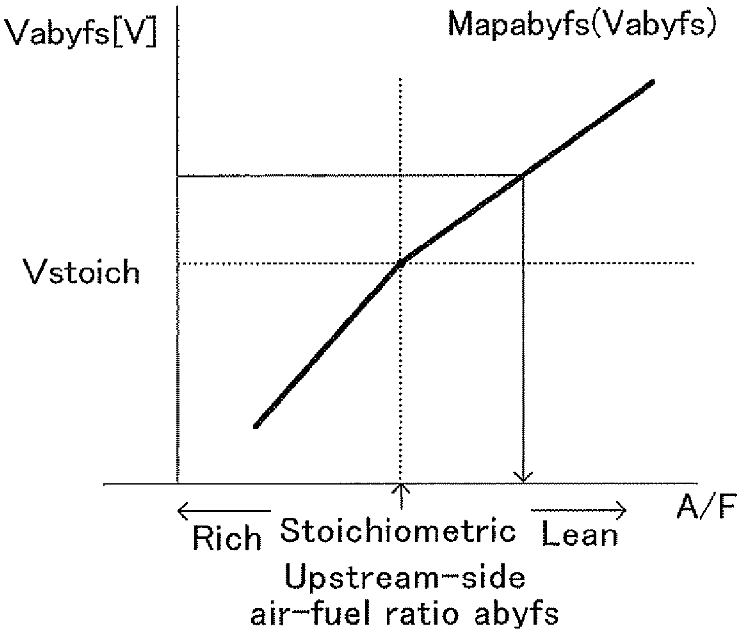
FIG. 3 is a graph showing a relationship between an output value of an upstream air-fuel ratio sensor shown in FIG. 1 and an upstream-side air-fuel ratio.

As shown in FIG. 3, the upstream air-fuel ratio sensor 67 outputs an output value Vabyfs which is a voltage corresponding to an "air-fuel ratio A/F of the exhaust gas to be detected". That is, in the present example, the upstream air-fuel ratio sensor 67 outputs the output value Vabyfs corresponding to the air-fuel ratio of the gas flowing through the position at which the upstream air-fuel ratio sensor 67 is disposed in the exhaust passage (i.e., the air-fuel ratio of the exhaust gas flowing into the upstream air-fuel ratio sensor 67, and thus, the air-fuel ratio of the mixture supplied to the engine).

The output value Vabyfs becomes equal to a value Vstoich, when the air-fuel ratio of the gas to be detected coincides with the stoichiometric air-fuel ratio. The output value Vabyfs increases, as the air-fuel ratio of the gas to be detected becomes larger (leaner). That is, the output value Vabyfs of the upstream air-fuel ratio sensor 67 varies continuously with respect to a change in the air-fuel ratio of the gas to be detected.

The electric controller 80, described later, stores a table (map) Mapabyfs shown in FIG. 3, and detects an air-fuel ratio by applying an actual output value Vabyfs to the table Mapabyfs. Hereinafter, the air-fuel ratio obtained based on the output value Vabyfs of the upstream air-fuel ratio sensor and the table Mapabyfs may be referred to as an upstream air-fuel ratio abyfs or a detected air-fuel ratio abyfs.

The downstream air-fuel ratio sensor 68 is disposed in the exhaust passage, and at a position downstream of the upstream-side catalytic converter 53 and upstream of the downstream-side catalytic converter (that is, at a position between the upstream-side catalytic converter 53 and the downstream-side catalytic converter). The downstream air-fuel ratio sensor 68 is a well-known oxygen-concentration sensor of an electro motive force type (a well-known concentration cell type oxygen-concentration sensor using a stabilized zirconia). The downstream air-fuel ratio sensor 68 outputs an output value Voxs in accordance with an air-fuel ratio of the exhaust gas (to be detected) passing through the position at which the downstream air-fuel ratio sensor 68 is disposed in the exhaust passage (i.e., the air-fuel ratio of a gas flowing out from the upstream-side catalytic converter 53 and flowing into the downstream-side catalytic converter, and thus, a temporal average of the air-fuel ratio of the mixture supplied to the engine).

Figure 4:
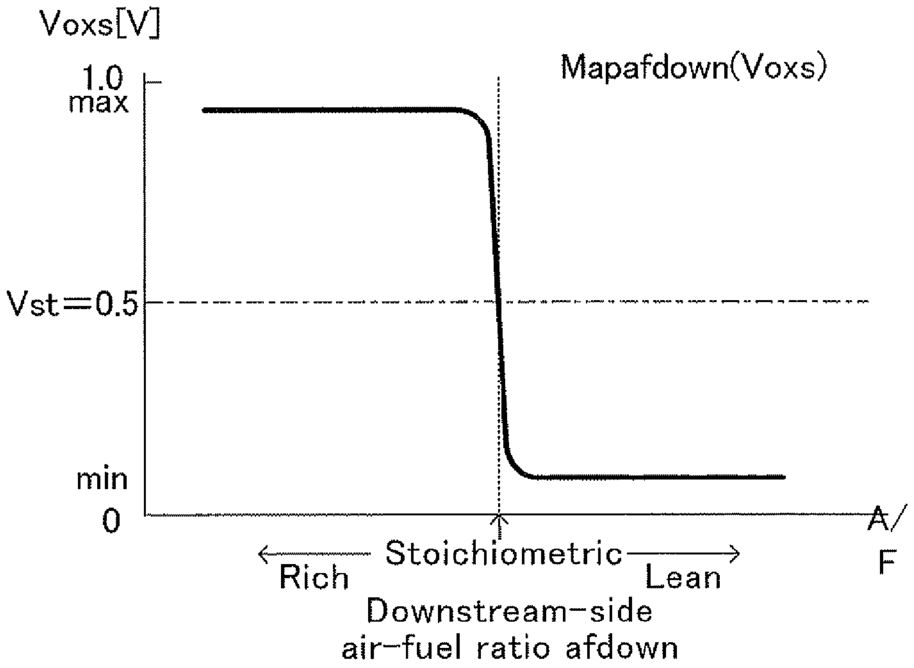
FIG. 4 is a graph showing a relationship between an output value of the downstream air-fuel ratio sensor shown in FIG. 1 and a downstream-side air-fuel ratio.

As shown in FIG. 4, the output value Voxs becomes equal to a maximum output value max (e.g., about 0.9 V) when the air-fuel ratio of the gas to be detected is richer than the stoichiometric air-fuel ratio, becomes equal to a minimum output value min (e.g., about 0.1 V) when the air-fuel ratio of the gas to be detected is leaner than the stoichiometric air-fuel ratio, and becomes equal to a voltage Vst which is about a middle value between the maximum output value max and the minimum output value min (the middle voltage Vst, e.g., about 0.5 V) when the air-fuel ratio of the gas to be detected is equal to the stoichiometric air-fuel ratio. Further, the output value Voxs varies rapidly from the maximum output value max to the minimum output value min when the air-fuel ratio of the gas to be detected varies from the air-fuel ratio richer than the stoichiometric air-fuel ratio to the air-fuel ratio leaner than the stoichiometric air-fuel ratio, and the output value Voxs varies rapidly from the minimum output value min to the maximum output value max when the air-fuel ratio of the gas to be detected varies from the air-fuel ratio leaner than the stoichiometric air-fuel ratio to the air-fuel ratio richer than the stoichiometric air-fuel ratio.

Referring back to FIG. 1, the alcohol concentration sensor 69 is disposed in the fuel supply pipe 45*b*. The alcohol concentration sensor 69 detects a concentration of an alcohol (ethanol, etc.) included in the fuel (the gasoline fuel), and outputs a signal indicative of the alcohol concentration EtOh.

The EGR valve opening degree sensor 70 detects an opening degree of the EGR valve (i.e., a lift amount of a valve included in the EGR valve), and outputs a signal indicative of the opening degree AEGRVact.

The accelerator opening sensor 71 outputs a signal indicative of an operation amount Accp of an accelerator pedal 91 operated by a driver.

An electric controller 80 is a well-known microcomputer including "a CPU 81; a ROM 82 in which programs to be executed by the CPU 81, tables (maps, functions), constants, and the like are stored in advance; a RAM 83 in which the CPU 81 stores data temporarily as needed; a backup RAM 84; an interface 85 including an AD converter; and so on", that are mutually connected to each other through bus.

The backup RAM 84 is supplied with an electric power from a battery mounted on a vehicle on which the engine 10 is mounted, regardless of a position of an unillustrated ignition key switch (off-position, start position, on-position, and so on) of the vehicle. While the electric power is supplied to the backup RAM 84, data is stored in (written into) the backup RAM 84 according to an instruction of the CPU 81, and the backup RAM holds (retains, stores) the data in such a manner that the data can be read out. When the electric power supply to the backup RAM 84 is stopped due to a removal of the battery from the vehicle, or the like, the backup RAM 84 can not hold the data. Therefore, when the electric power supply to the backup RAM 84 is resumed, the CPU 81 initializes the data (or sets the data at default values) to be stored in the backup RAM 84.

The interface 85 is connected to the sensors 61 to 71 and is configured in such a manner that the interface 85 supplies signals from the sensors 61 to 71 to the CPU 81. The interface 85 is configured so as to send drive signals (instruction signals), in response to instructions from the CPU 81, to the actuator 33*a* of the variable intake timing control unit 33, the actuator 36*a* of the variable exhaust timing control unit 36, each of the igniters 38 of each cylinder, each of the fuel injectors 39 provided so as to correspond to each of the cylinders, the throttle valve actuator 44*a*, the purge control valve 49, the EGR valve 55, and so on.

(Outline of Control)

An outline of an operation of the first control apparatus as configured above will next be described. It should be noted that, in the present specification, a value with a parameter k indicates a value for a present (current) combustion cycle. That is, a parameter X(k) is a value X for the present combustion cycle, and a parameter X(k−N) is a value for a combustion cycle N cycles before the present cycle.

The first control apparatus performs an air-fuel ratio feedback control including: a main feedback control so as to have the upstream-side air-fuel ratio abyfs obtained based on the output value Vabyfs of the upstream air-fuel ratio sensor 67 coincide with a target upstream-side air-fuel ratio abyfr; and a sub feedback control so at so have the output value Voxs of the downstream air-fuel ratio sensor 68 coincides with a target downstream-side value Voxsref.

In actuality, the first control apparatus corrects the "output value Vabyfs of the upstream air-fuel ratio sensor 67" by (with) a "sub feedback amount Vafsfb calculated so as to reduce an output error amount DVoxs between the output value Voxs of the downstream air-fuel ratio sensor 68 and the target downstream-side value Voxsref, and its learning value", to thereby calculate an "air-fuel ratio abyfsc for a feedback control (corrected detected air-fuel ratio abyfsc)", and performs the air-fuel ratio feedback control to have the air-fuel ratio abyfsc for a feedback control coincide with the target upstream-side air-fuel ratio abyfr. The sub feedback amount Vafsfb is, for convenience, referred to as a "first feedback amount".

<Main Feedback Control and Determination of Final Fuel Injection Amount>

More specifically, the first control apparatus calculates the output value Vabyfsc for a feedback control, according to a formula (1) described below. In the formula (1), Vabyfs is the output value of the upstream air-fuel ratio sensor 67, Vafsfb is a sub feedback amount calculated based on the output value Voxs of the downstream air-fuel ratio sensor 68, Vafsfbg is a learning value of the sub feedback amount. These values are currently obtained values. The way by which the sub feedback amount Vafsfb is calculated and the way by which the learning value Vafsfbg of the sub feedback amount Vafsfb is calculated will be described later.

$$Vabyfc = Vabyfs + Vafsfb + Vafsfbg \tag{1}$$

The first control apparatus, as described in a formula (2) below, obtains an air-fuel ratio abyfsc for a feedback control by applying the output value Vabyfsc for a feedback control to the table Mapabyfs shown in FIG. 3.

$$abyfsc = Mapabyfs(Vabyfsc) \tag{2}$$

Meanwhile, the first control apparatus obtains a "cylinder intake air amount Mc(k)" which is an "air amount introduced into each of the cylinders (each of the combustion chambers 25)". The cylinder intake air amount Mc(k) is obtained for every intake stroke of each of the cylinders based on the output Ga of the air flow meter 61 and the engine rotational speed NE, at a timing when the cylinder intake air amount Mc(k) is obtained. For example, the cylinder intake air amount Mc(k) is obtained based on "the output Ga of the air flow meter 61, the engine rotational speed NE, and the look-up table MapMc". Alternatively, the cylinder intake air amount Mc(k) is obtained through dividing a value obtained by first lag order processing on the output Ga measured by the air flow meter 61 by the engine rotational speed NE. The cylinder intake air amount Mc(k) may be calculated based on a well-known air model (a model constructed according to laws of physics describing and simulating a behavior of an air in the intake passage). The cylinder intake air amount Mc(k) is stored in the RAM 83 with information indicating the each corresponding intake stroke.

The first control apparatus obtains, as shown by a formula (3) described below, a base fuel injection amount Fb by dividing the cylinder intake air amount Mc(k) by the target upstream-side air-fuel ratio abyfr at the present time. The target upstream-side air-fuel ratio abyfr is set at (to) the stoichiometric air-fuel ratio stoich, with the exception of special cases such as a warming-up period of the engine, a period of increasing of fuel after a fuel cut control, and a period of increasing of fuel for preventing catalytic converter overheat. It should be noted that, in the present example, the target upstream-side air-fuel ratio abyfr is always set to (at) the stoichiometric air-fuel ratio stoich. The base fuel injection amount Fb(k) is stored in the RAM 83 with information indicating the each corresponding intake stroke.

$$Fb(k)=Mc(k)/abyfr \quad (3)$$

The first control apparatus calculates, as shown by a formula (4) described below, a final fuel injection amount Fi by correcting the base fuel injection amount Fb with various correction coefficients. Thereafter, the first apparatus injects a fuel of the final fuel injection amount Fi from the injector 39 corresponding to the cylinder which is in the intake stroke.

$$Fi=KG\cdot FPG\cdot FAF\cdot Fb(k) \quad (4)$$

Each of the various values in the right-hand side of the formula (4) above is as follows.

KG: A learning value of a main feedback coefficient (main FB learning value KG)

FPG: A purge correction coefficient

FAF: The main feedback coefficient updated (calculated) by the main feedback control The way by which the main FB learning value KG is calculated and the way by which the purge correction coefficient FPG is calculated will be described later. Here, the way by which the main feedback coefficient FAF is calculated will be described.

The main feedback coefficient FAF (referred to as a second feedback amount, for convenience) is calculated based on a main feedback value DFi. The main feedback value DFi is obtained as follows. As shown in a formula (5) described below, the first apparatus obtains a "cylinder fuel supply amount Fc(k−N)" which is an amount of the fuel actually supplied to the combustion chamber 25 for a cycle at a timing N cycles before the present time", through dividing the cylinder intake air amount Mc(k−N) which is the cylinder intake air amount for the cycle the N cycles (i.e., N·720° crank angle) before the present time by the air-fuel ratio abyfsc for a feedback control.

$$Fc(k-N)=Mc(k-N)/abyfsc \quad (5)$$

The reason why the cylinder intake air amount Mc(k−N) for the cycle N cycles before the present time is divided by the air-fuel ratio abyfsc for a feedback control in order to obtain the cylinder fuel supply amount Fc(k−N) for the cycle N cycles before the present time is because the exhaust gas generated by the combustion of the mixture in the combustion chamber 25 requires time corresponding to the N cycles to reach the upstream air-fuel ratio sensor 67. It should be noted that, in practical, a gas formed by mixing the exhaust gases discharged from the cylinders in some degree reaches the upstream air-fuel ratio sensor 67.

Subsequently, the first control apparatus calculates, as shown by a formula (6) described below, a "target cylinder fuel supply amount Fcr(k−N) for the cycle the N cycles before the present time", by dividing the "cylinder intake air amount Mc(k−N) for the cycle the N cycles before the present time" by the "target upstream-side air-fuel ratio abyfr(k−N) for the cycle the N cycles before the present time". It should be noted that, in the present example, the target upstream-side air-fuel ratio abyfr is constant, and therefore, the target upstream-side air-fuel ratio is expressed simply as abyfr in the formula (6).

$$Fcr(k-N)=Mc(k-N)/abyfr \quad (6)$$

The control apparatus obtains, as shown by a formula (7) described below, sets an error DFc of the cylinder fuel supply amount to (at) a value obtained by subtracting the cylinder fuel supply amount Fc(k−N) from the target cylinder fuel supply amount Fcr(k−N). The error DFc of the cylinder fuel supply amount represents excess and deficiency of the fuel supplied to the cylinder the N cycle before the present time.

$$DFc=Fcr(k-N)-Fc(k-N) \quad (7)$$

Thereafter, the control apparatus obtains the main feedback value DFi, according to a formula (8) described below. In the formula (8) below, Gp is a predetermined proportion gain, and Gi is a predetermined integration gain. It should be noted that the coefficient KFB in the formula (8) is preferably a value varying depending on the engine rotational speed NE, the cylinder intake air amount Mc, and the like, however, the coefficient KFB is set to (at) "1" in this example. The value SDFc in the formula (8) is an integrated value of the error DFc of the cylinder fuel supply amount. That is, the first control apparatus calculates the main feedback value DFi according to the proportional-integral control (PI control) to have the air-fuel ratio abyfsc for a feedback control coincides with the target upstream-side air-fuel ratio abyfr.

$$DFi=(Gp\cdot DFc+Gi\cdot SDFc)\cdot KFB \quad (8)$$

Subsequently, the first control apparatus applies the main feedback value DFi and the base fuel injection amount Fb(k−N) to a formula (9) described below to thereby obtain the main feedback coefficient FAF. That is, the main feedback coefficient FAF is obtained through dividing a "value obtained by adding the main feedback value DFi to the base fuel injection amount Fb(k−N) the N cycles before the present time" by the "base fuel injection amount Fb(k−N)", $$FAF=(Fb(k-N)+DFi)/Fb(k-N) \quad (9)$$

As shown in the formula (4) described above, the base fuel injection amount Fb(k) is multiplied by the main feedback coefficient FAF. It should be noted that the main feedback coefficient FAF is updated every time a predetermined third update timing arrives (e.g., every time a predetermined third time period elapses). These summarize the outline of the main feedback control (i.e., the air-fuel ratio feedback control).

<Sub Feedback Control>

The first control apparatus obtains, as shown in a formula (10) described below, obtains an error amount of output (first error) DVoxs every time a predetermined first update timing arrives (e.g., a predetermined first time elapses), by subtracting the output value Voxs of the downstream air-fuel ratio sensor 68 at the present time from the target downstream-side value Voxsref.

$$DVoxs=Voxsref-Voxs \quad (10)$$

The target downstream-side value Voxsref in the formula (10) is set in such a manner that a purifying efficiency of the upstream-side catalytic converter 53 becomes highest. The target downstream-side value Voxsref in the present example is set to (at) the value (stoichiometric corresponding value) Vst corresponding to the stoichiometric air-fuel ratio.

The first control apparatus obtains the sub feedback amount Vafsfb according to a formula (11) described below. In the formula (11) below, Kp is a predetermined proportion gain (proportional constant), Ki is a predetermined integration gain (integration constant), and Kd is a predetermined differential gain (differential constant). SDVoxs is an integrated value (temporal integrated value) of the error amount of output DVoxs, and DDVOxs is a differential value (temporal differential value) of the error amount of output DVoxs.

$$Vafsfb=Kp\cdot DVoxs+Ki\cdot SDVoxs+Kd\cdot DDVoxs \quad (11)$$

As described above, the first control apparatus obtains the sub feedback amount Vafsfb according to the proportional-integral-differential control (PID control) to have the output value Voxs of the downstream air-fuel ratio sensor 68 coincide with the target downstream-side value Voxsref. As shown in the formula (1) described above, the sub feedback amount Vafsfb is used to calculate the output value Vabyfc for a feedback control.

As described above, the first control apparatus comprises first feedback amount updating means for updating/changing, every time the predetermined first update timing arrives, the first feedback amount (sub feedback amount Vafsfb) to have the output value Voxs of the downstream air-fuel ratio sensor 68 coincide with the value corresponding to the target downstream-side air-fuel ratio (target downstream-side value Voxsref, (stoichiometric corresponding value Vst), based on the first error (output error amount DVoxs) which is a difference between the output value Voxs of the downstream air-fuel ratio sensor 68 and the target downstream-side value Voxsref.

<Learning of the Sub Feedback Amount>

The first control apparatus updates the learning value Vafsfbg of the sub feedback amount Vafsfb according to a formula (12) described below, every time a predetermined second update timing arrives (e.g., every time a predetermined second time elapses, or every time the output value Voxs of the downstream air-fuel ratio sensor 68 crosses (pass over) the value Vst corresponding to the stoichiometric air-fuel ratio, or the like). Vafsfbgnew in the left-hand side of the formula (12) represents a renewed (updated) learning value Vafsfbg. That is, the sub FB leaning value Vafsfbg is updated in such a manner that "the sub FB leaning value Vafsfbg brings in (or fetch in, deprives of) a steady-state component of the sub feedback amount Vafsfb which is the first feedback amount (i.e., the sub FB leaning value Vafsfbg becomes a value corresponding to the steady-state component of the sub feedback amount Vafsfb)". In other words, the sub FB leaning value Vafsfbg is updated in such a manner that "the sub feedback amount Vafsfb which is the first feedback amount gradually approaches (comes closer to) a value on which the sub FB leaning value Vafsfbg converges in a case in which sub FB leaning value Vafsfbg would not be updated".

As is clear from the formula (12), the learning value Vafsfbg is a value obtained by performing a filtering process to eliminate noises on the integral term Ki·SDVoxs of the sub feedback amount Vafsfb. In the formula (12), the value p is a constant larger than 0 and smaller than 1. The updated learning value Vafsfbgnew is stored in the backup RAM 84 as the leaning value Vafsfbg. As is apparent from the formula (12), the integral term Ki·SDVoxs at the present time is more greatly (strongly) reflected into (onto) the learning value Vafsfbg, as the value p becomes larger. That is, setting the value p to (at) a larger value allows a changing speed of the learning value Vafsfbg to become higher, and therefore, allows the learning value Vafsfbg to more promptly come closer to the integral term Ki·SDVoxs which is likely to be equal to the convergence value. It should be noted that, the learning value Vafsfbg may be updated as shown in a formula (13) described below.

$$Vafsfbg\text{new}=(1-p)\cdot Vafsfbg+p\cdot Ki\cdot SDVoxs \quad (12)$$

$$Vafsfbg\text{new}=(1-p)\cdot Vafsfbg+p\cdot Vafsfb \quad (13)$$

<Correction of the Sub Feedback Amount with the Learning of the Sub Feedback Control>

As shown in the formula (1) described above, the first control apparatus obtains the output value Vabyfsc for a feedback control by adding the sub feedback amount Vafsfb and the learning value Vafsfbg to the output value Vabyfs of the upstream air-fuel ratio sensor 67. The learning value Vafsfbg is the value obtained by bringing in (or fetching in) a part of the integral term Ki·SDVoxs (steady-state component) of the first feedback amount Vafsfb. Accordingly, when the learning value Vafsfbg is changed (updated), and if the sub feedback amount Vafsfb is not corrected in accordance with the change amount of the learning value Vafsfbg, a double correction may be made by "the changed (updated) learning value Vafsfbg and the sub feedback amount Vafsfb". It is therefore necessary to correct the sub feedback amount Vafsfb in accordance with the change amount of the learning value Vafsfbg, when the learning value Vafsfbg is changed.

In view of the above, as shown in a formula (14) described below and a formula (15) described below, the first control apparatus decreases the sub feedback amount Vafsfb by a change amount ΔG, when the learning value Vafsfbg is increased by the change amount ΔG. In the formula (14), Vafsfbg0 is the learning value Vafsfbg immediately before the change (update). Accordingly, the change amount ΔG can be a positive value and a negative value. In the formula (15), Vafsfbnew is the learning value Vafsfbg immediately after the change (update). Further, the first control apparatus preferably corrects the integral value of the error amount of output DVoxs as shown in formula (16) described below, when the learning value Vafsfbg is increased by the change amount ΔG. In the formula (16), SDVoxsnew is the integral value of the error amount of output DVoxs after the correction. It should be noted that the apparatus does not necessarily make the correction according to the formulas (14) to (16).

$$\Delta G=Vafsfbg-Vafsfbg0 \quad (14)$$

$$Vafsfb\text{new}=Vafsfb\cdot\Delta G \quad (15)$$

$$SDVoxs\text{new}=SDVoxs-\Delta G/Ki \quad (16)$$

As described above, the first control apparatus corrects the output value Vabyfs of the upstream air-fuel ratio sensor 67 by (in amount of) a sum of the sub feedback amount Vafsfb and the learning value Vafsfbg, and obtains the air-fuel ratio abyfsc for a feedback control based on the air-fuel ratio abyfsc for a feedback control obtained according to the correction. Thereafter, the control apparatus controls the fuel injection amount Fi in such a manner that the obtained air-fuel ratio abyfsc for a feedback control coincides with the target upstream-side air-fuel ratio abyfr. Consequently, the upstream-side air-fuel ratio abyfs comes close to the target upstream-side air-fuel ratio abyfr, and simultaneously, the output value of the downstream air-fuel ratio sensor 68 comes close to the target downstream-side value Voxsref. That is, the control apparatus comprises air-fuel ratio feedback control means for having the air-fuel ratio of the engine coincide with the target upstream-side air-fuel ratio based on the output value Vabyfs of the upstream air-fuel ratio sensor 67, the sub feedback amount Vafsfb, and the learning value Vafsfbg.

In this way, the first control apparatus comprises learning means for updating the learning value (the learning value Vafsfbg) of the first feedback amount (sub feedback amount Vafsfb) based on the first feedback amount every time the second update timing arrives. The learning means, when the learning value Vafsfbg is updated, corrects the sub feedback amount Vafsfb with using the "change/update amount of the updated learning value Vafsfbg (i.e., the change amount ΔG of the learning value Vafsfbg)", and also corrects the integrated value SDVoxs of the output error amount DVoxs in accordance the change amount ΔG.

<Expedited Learning Control for the Sub Feedback Amount>

The first control apparatus further comprises expedited learning means which performs/executes an expedited learning control to increase a changing speed of the learning value Vafsfbg when it is inferred that an insufficient learning state is occurring as compared to when it is inferred that the insufficient learning state is not occurring. The insufficient learning state is a state in which a second difference which is a difference between the "learning value Vafsfbg" and the "value on which the learning value Vafsfbg is supposed to converge" is equal to or larger than a predetermined value.

More specifically, the first control apparatus infers that the insufficient learning state is occurring, when the change amount (changing speed) of the learning value Vafsfbg is equal to or larger than a predetermined value. The change amount of the learning value Vafsfbg may be obtained, for example, based on a difference between an old (passed) learning value which is the learning value updated/changed the predetermined number of times of update ago (e.g., the learning value Vafsfbg(4) which is the learning value four update times ago) and the currently updated learning value Vafsfbg.

When the first control apparatus infers that the insufficient learning state is occurring, the first control apparatus sets the value p in the formula (12) described above to (at) a value pLarge larger than a value pSmall which is used when the first control apparatus infers that the insufficient learning state is not occurring. Consequently, the changing speed of the learning value Vafsfbg increases, and therefore, the leaning value Vafsfbg approaches the convergence value more quickly.

<Prohibiting the Expedited Learning Control of the Sub Feedback Amount>

Figure 5:
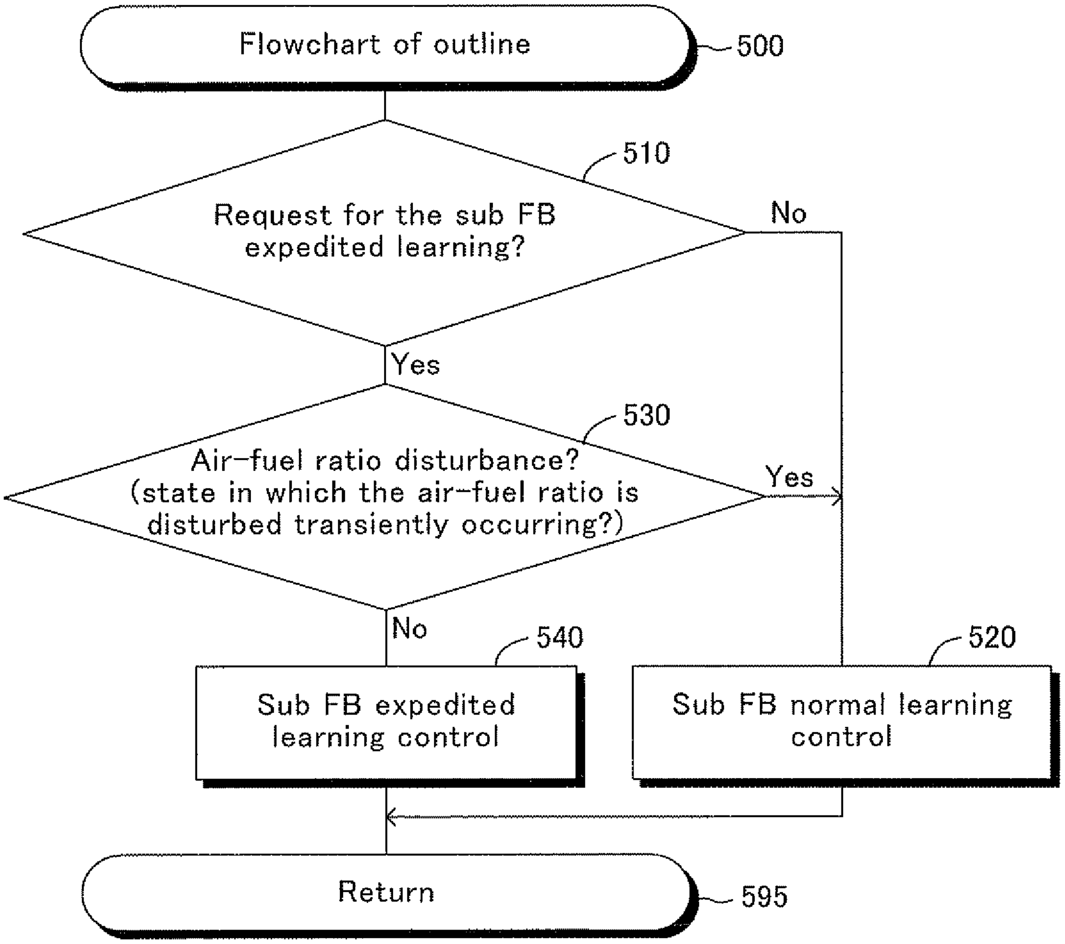
FIG. 5 is a flowchart for describing an outline of an operation of the air-fuel ratio control apparatus according to embodiments of the present invention.

However, when a "state in which the air-fuel ratio of the engine is disturbed/varied transiently/temporarily" occurs while the expedited learning control is being carried out, the sub feedback amount may change to a value different from the convergence value temporarily due to the disturbance of the air-fuel ratio. As a result, the leaning value may deviate from a value which the learning value is supposed to reach, and thus, the air-fuel ratio of the engine may deviate from the appropriate value.

in view of the above, as shown by an outline flowchart in FIG. 5, the first control apparatus firstly determines whether or not there is a request for the expedited learning of the sub feedback amount at step 510 (i.e., whether or not the insufficient learning state is occurring), and proceeds to step 520 to perform a normal learning (control) of the sub feedback amount when there is no request for the expedited learning. That is, the first control apparatus sets the value p in the formula (12) described above to (at) the value pSmall at step 520, to thereby perform the normal learning (control) of the sub feedback amount.

In contrast, when it is determined that there is the request for the expedited learning at step 510, the first control apparatus proceeds to step 530 to infer whether or not the "state in which the air-fuel ratio of the engine is disturbed transiently" occurs, i.e., whether or not there is an "air-fuel ratio disturbance". Thereafter, when it is inferred that there is no air-fuel ratio disturbance, the first control apparatus proceeds to step 540 to set the value p in the formula (12) described above to (at) the value pLarge larger than the value pSmall, to thereby perform the expedited learning control of the sub feedback amount. When it is inferred that there is the "air-fuel ratio disturbance" at step 530, the first control apparatus proceeds to step 520 to thereby perform the normal learning (control) of the sub feedback amount.

Accordingly, when the "state in which the air-fuel ratio of the engine is disturbed transiently" occurs in the case in which the expedited learning control is being performed, or in which the request for the expedited learning due to the insufficient learning state is generated, the expedited learning control is prohibited (terminated), and therefore, it can be avoided that the learning value Vafsfbg of the sub feedback amount deviates greatly from the appropriate value. Consequently, a time (period) necessary for the learning value Vafsfbg to converge on the convergence value can be shortened eventually, and thus, a period in which the emission becomes worse can be shortened.

It should be noted that the "state in which the air-fuel ratio of the engine is disturbed transiently (the air-fuel ratio disturbance)" occurs, for example, due to the evaporated fuel gas purge, the internal EGR amount (the cylinder residual gas), the external EGR amount, the concentration of alcohol of the fuel, or the like.

The "state in which the air-fuel ratio of the engine is disturbed transiently" due to the evaporated fuel gas purge occurs in cases described below.

- When the concentration of the evaporated fuel gas rapidly changes during the evaporated fuel gas purge;
- When the concentration of the evaporated fuel gas is higher than a predetermined concentration during the evaporated fuel gas purge; or
- When "the number of updating times after a start of the engine" of an evaporated fuel gas concentration learning value described later is smaller than a "predetermined threshold of the number of updating times".

The "state in which the air-fuel ratio of the engine is disturbed transiently" due to the internal EGR amount occurs in cases described below.

- When the internal EGR amount becomes larger than an expected internal EGR amount by a predetermined amount or more; or
- When a changing speed (an amount of change per unit time) of the internal EGR amount becomes higher than a predetermined changing speed.

More specifically, the "state in which the air-fuel ratio of the engine is disturbed transiently" due to the internal EGR amount occurs in cases described below. Note that valve overlap amount is an amount representing a duration (length) of the valve overlap period.

When the actual valve overlap amount becomes larger than a target valve overlap amount by a predetermined amount or more;

When a changing speed of the valve overlap amount is higher than a predetermined changing speed threshold;

When an opening timing of the intake valve which determines the valve overlap amount is different (deviates) from its target opening timing of the intake valve by a predetermined value or more;

When a closing timing of the exhaust valve which determines the valve overlap amount is different (deviates) from its target closing timing of the exhaust valve by a predetermined value or more;

When a changing speed of the opening timing of the intake valve is higher than a predetermined speed; or When a changing speed of the closing timing of the exhaust valve is higher than a predetermined speed.

The "state in which the air-fuel ratio of the engine is disturbed transiently" due to the external EGR amount occurs in cases described below.

When the external EGR amount becomes larger than an expected external EGR amount by a predetermined amount or more; or When a changing speed (an amount of change per unit time) of the external EGR amount becomes higher than a predetermined changing speed.

More specifically, the "state in which the air-fuel ratio of the engine is disturbed transiently" due to the external EGR amount occurs in cases described below.

When a changing speed of an external EGR rate becomes higher than a predetermined changing speed; or When an actual external EGR rate becomes higher than a target external EGR rate by a predetermined value. This is a case in which, for example, an actual opening degree of the external EGR valve becomes larger than a target opening degree of the external EGR valve by a predetermined opening degree or more.

The "state in which the air-fuel ratio of the engine is disturbed transiently" due to the concentration of alcohol of the fuel occurs in cases described below.

When the concentration of alcohol included in a fuel in the fuel tank after filling of a fuel into the fuel tank 45 has changed by a predetermined concentration with respect to a fuel in the tank before the filling of the fuel. It should be noted that this state can be detected by storing into the backup RAM 84 the alcohol concentration EtOH which is the output value of the alcohol concentration sensor 69 every time the engine is started; and by determining whether or not a difference between an alcohol concentration EtOH obtained when the engine is started next time and the alcohol concentration EtOH stored in the backup RAM 84 is higher than or equal to a predetermined concentration.

(Actual Operation)

The actual operation of the thus configured first control apparatus will next be described.

<Fuel Injection Amount Control>

Figure 6:
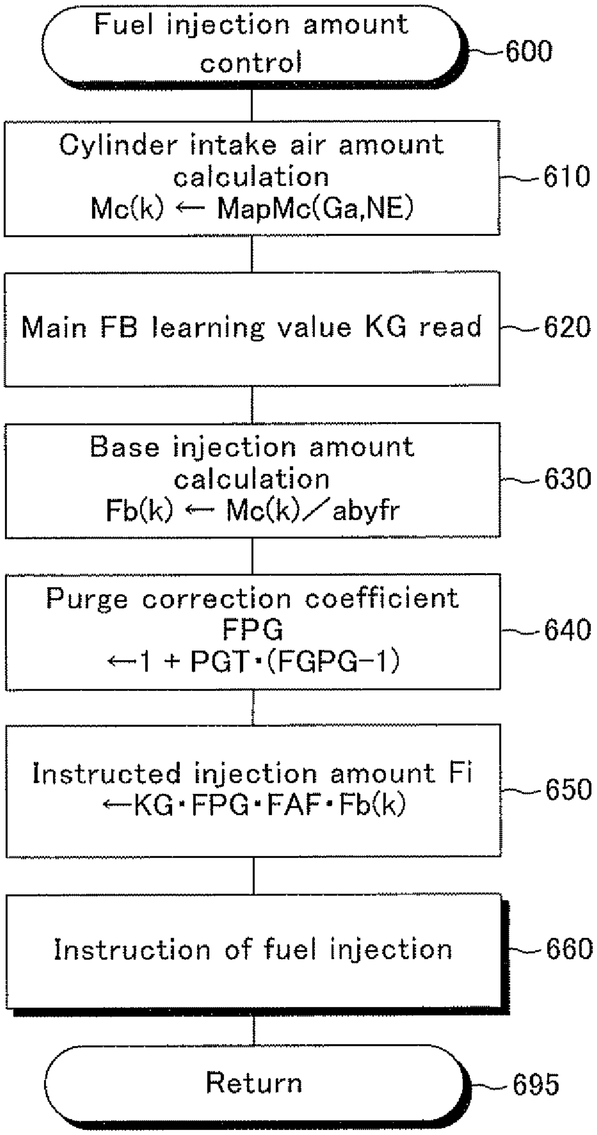
FIG. 6 is a flowchart showing a routine executed by a CPU of an air-fuel ratio control apparatus (a first control apparatus) according to a first embodiment of the present invention.

The CPU 81 repeatedly executes a routine shown in FIG. 6, to calculate a final fuel injection amount Fi and instruct an fuel injection, every time the crank angle of any one of the cylinders reaches a predetermined crank angle before its intake top dead center (e.g., BTDC 90° CA), for the cylinder (hereinafter, referred to as a "fuel injection cylinder") whose crank angle has reached the predetermined crank angle.

Accordingly, at an appropriate timing, the CPU 81 starts a process from step 600, and performs processes from step 610 to step 660 in this order, and thereafter, proceeds to step 695 to end the present routine tentatively.

Step 610: The CPU 81 obtains a cylinder intake air amount Mc(k) at the present time, by applying "the intake air flow rate Ga measured by the air-flow meter 61, and the engine rotational speed NE" to a look-up table MapMc.

Step 620: The CPU 81 reads out (fetches) the main FB learning value KG from the backup RAM 84. The main FB learning value KG is separately obtained by a main feedback learning routine shown in FIG. 8 described later, and is stored in the backup RAM 84.

Step 630: The CPU 81 obtains the base fuel injection amount Fb(k) according to the formula (3) described above.

Step 640: The CPU 81 obtains the purge correction coefficient FPG according to the formula (17) described below. In the formula (17), PGT is a target purge rate. The target purge rate PGT is obtained, at step 930 shown in FIG. 9 described later, based on (a parameter indicative of) an operating state (condition) of the engine 10. FGPG is an evaporated fuel gas concentration learning value. The evaporated fuel gas concentration learning value FGPG is obtained in the routine shown in FIG. 9 described later.

$$FPG=1+PGT(FGPG-1) \quad (17)$$

Step 650: The CPU 81 obtains a final fuel injection amount (an instructed injection amount) Fi by correcting the base fuel injection amount Fb(k) according to the formula (4) described above. The main feedback coefficient FAF is obtained in a routine shown in FIG. 7 described later.

Step 660: The CPU 81 sends an instruction signal to the fuel injector 39 disposed so as to correspond to the fuel injection cylinder, to instruct the fuel injector 39 to inject a fuel of the final fuel injection amount Fi.

In this way, the base fuel injection amount Fb is corrected with the main feedback value DFi (in actuality, the main feedback coefficient FAF, and so on), and the fuel whose amount is equal to the final fuel injection amount Fi which is a resultant value of the correction is injected for the fuel injection cylinder.

<Main Feedback Control>

Figure 7:
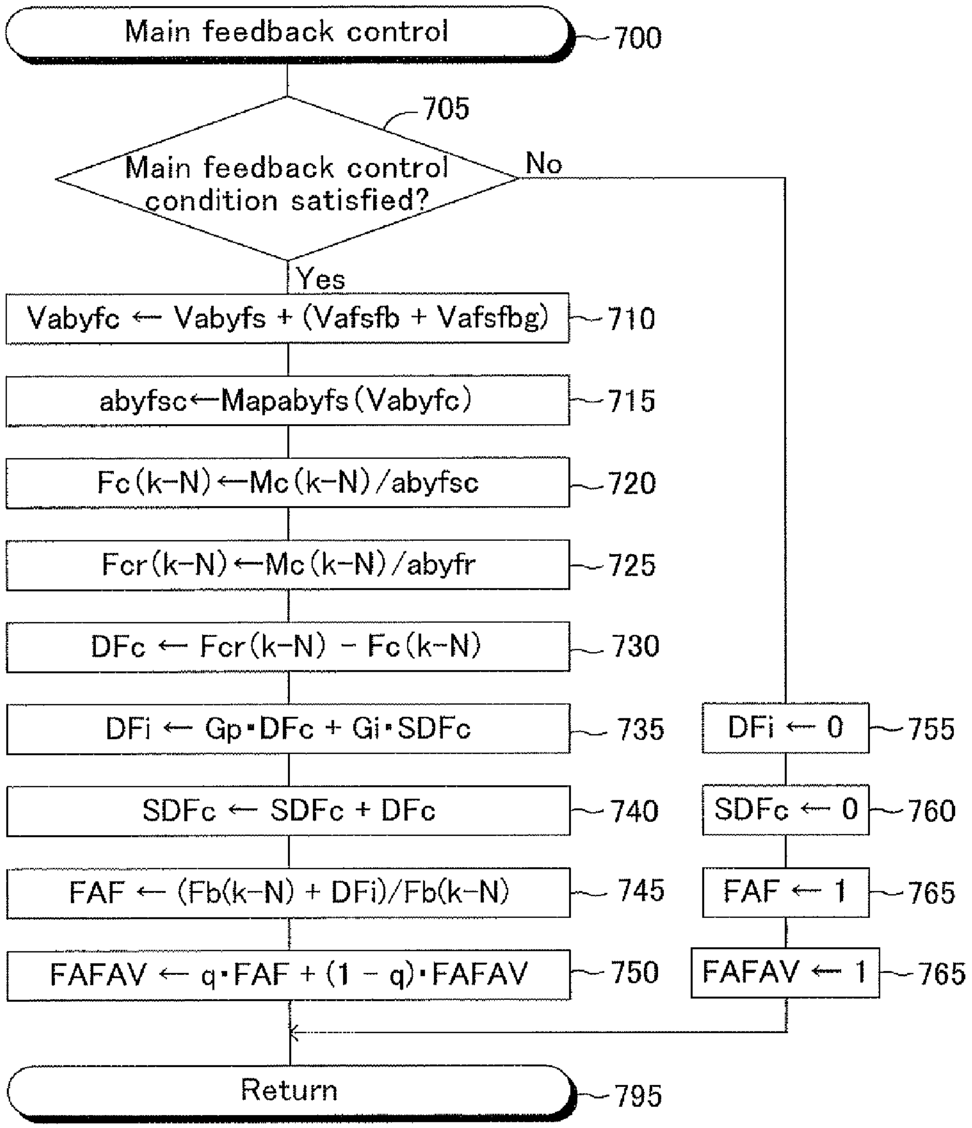
FIG. 7 is a flowchart showing a routine executed by the CPU of the first control apparatus.

The CPU 81 repeatedly executes a routine, shown by a flowchart in FIG. 7, for a calculation of the main feedback amount (second feedback amount), every time a predetermined time period elapses. Accordingly, at an appropriate predetermined timing, the CPU 81 starts the process from step 700 to proceed to step 705 at which CPU 81 determines whether or not a main feedback control condition (an upstream-side air-fuel ratio feedback control condition) is satisfied. The main feedback control condition is satisfied, when, for example, a fuel cut operation is not performed, the cooling water temperature THW is equal to or higher than a first predetermined temperature, a load KL is equal to or smaller than a predetermined value, and the upstream air-fuel ratio sensor 67 has been activated.

The description continues assuming that the main feedback control condition is satisfied. In this case, the CPU 81 makes a "Yes" determination at step 705 to execute processes from steps 710 to 750 described below in this order, and then proceed to step 795 to end the present routine tentatively.

Step 710: The CPU 81 obtains the output value Vabyfc for a feedback control, according to the formula (1) described above.

Step 715: The CPU 81 obtains the air-fuel ratio abyfsc for a feedback control according to the formula (2) described above Step 720: The CPU 81 obtains the cylinder fuel supply amount Fc(k−N) according to the formula (5) described above, Step 725: The CPU 81 obtains the target cylinder fuel supply amount Fcr(k−N) according to the formula (6) described above.

Step 730: The CPU 81 obtains the error DFc of the cylinder fuel supply amount according to the formula (7) described above.

Step 735: The CPU 81 obtains the main feedback value DFi according to the formula (8) described above. It should be noted that, in the present example, the coefficient KFB is set at (to) "1". The integrated value SDFc of the error DFc of the cylinder fuel supply amount is obtained at next step 740.

Step 740: The CPU 81 obtains a new integrated value SDFc of the error DFc of the cylinder fuel supply amount by adding the error DFc of the cylinder fuel supply amount obtained at step 730 described above to the current integrated value SDFc of the error DFc of the cylinder fuel supply amount.

Step 745: The CPU 81 obtains the main feedback coefficient FAF according to the formula (9) described above.

Step 750: The CPU 81 obtains a weighted average value of the main feedback coefficient FAF as a main feedback coefficient average FAFAV (hereinafter, referred to as "correction coefficient average FAFAV") according to a formula (18) described below. In the formula (18), FAFAVnew is a renewed (updated) correction coefficient average FAFAV which is stored as a new correction coefficient average FAFAV. In the formula (18), a value q is a constant larger than zero and smaller than 1. The correction coefficient average FAFAV is used when obtaining "the main FB learning value KG and the evaporated fuel gas concentration learning value FGPG".

$$FAFAVnew=q\cdot FAF+(1-q)\cdot FAFAV \quad (18)$$

As described above, the main feedback value DFi is obtained according to the proportional-integral control. The main feedback value DFi is converted into the main feedback coefficient FAF, and is reflected in (onto) the final fuel injection amount Fi by the process of step 650 shown in FIG. 6 described above. Consequently, excess and deficiency of the fuel supply amount is compensated, and thereby, the average of the air-fuel ratio of the engine (thus, the average of the air-fuel ratio of the gas flowing into the upstream-side catalytic converter 53) is roughly coincided with the target upstream-side air-fuel ratio abyfr (which is the stoichiometric air-fuel ratio, with an exception of the special cases).

In contrast, at the determination of step 705, if the main feedback control condition is not satisfied, the CPU 81 makes a "No" determination at step 705 to proceed to step 755 at which the CPU 81 sets the main feedback value DFi to (at) "0". Subsequently, the CPU 81 sets the integrated value SDFc of the error of the cylinder fuel supply amount to (at) "0" at step 760, sets the main feedback coefficient FAF to (at) "1" at step 765, and sets the correction coefficient average FAFAV to (at) "1" at step 770.

Thereafter, the CPU 81 proceeds to step 795 to end the present routine tentatively. In this way, when the main feedback control condition is not satisfied, the main feedback value DFi is set to (at) "0", and the main feedback coefficient FAF is set to (at) "1". Accordingly, the base fuel injection amount Fb is not corrected by (with) the main feedback coefficient FAF. However, in such a case, the base fuel injection amount Fb is corrected by (with) the main FB learning value KG.

<Main Feedback Learning (Base Air-Fuel Ratio Learning)>

The first control apparatus renews (updates) the main FB learning value KG based on the correction coefficient average FAFAV, in such a manner that the main feedback coefficient FAF comes closer to a reference (base) value "1", during a "purge control valve closing instruction period (the period in which the duty ratio DPG is "0")" for which an instruction signal to keep the purge control valve 49 at fully/completely closing state is sent to the purge control valve 49.

Figure 8:
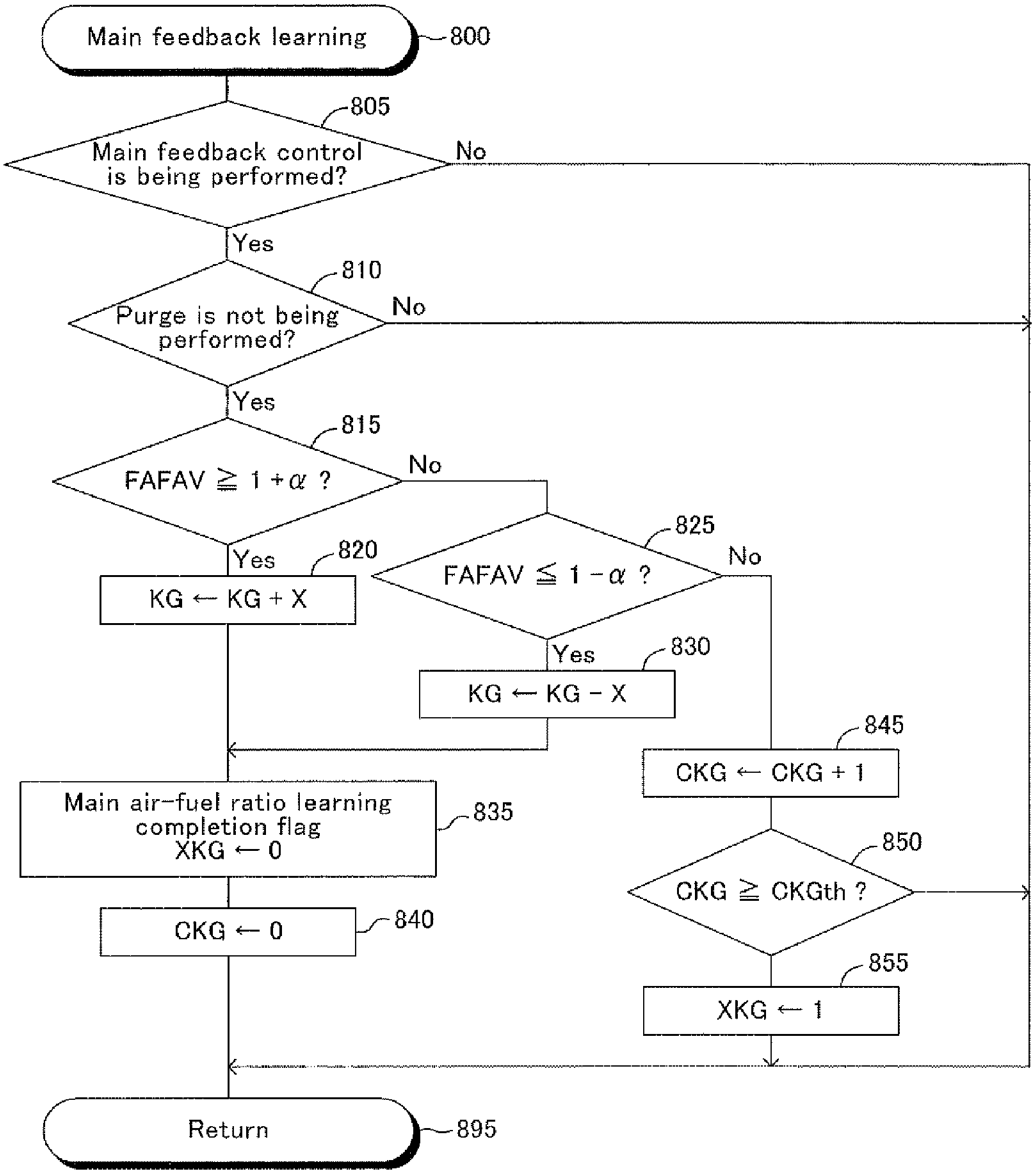
FIG. 8 is a flowchart showing a routine executed by the CPU of the first control apparatus.

In order to update/change the main FB learning value KG, the CPU 81 executes a main feedback learning routine shown in FIG. 8 every time a predetermined time period elapses. Therefore, at an appropriate timing, the CPU 81 starts the process from step 800 to proceed to step 805 at which CPU 81 determines whether or not the main feedback control is being performed (i.e., whether or not the main feedback control condition is satisfied). If the main feedback control is not being performed, the CPU 81 makes a "No" determination at step 805 to proceed directly to step 895 to end the present routine tentatively. Consequently, the update of the main FB learning value KG is not carried out.

In contrast, when the main feedback control is being performed, the CPU 81 proceeds to step 810 to determine whether or not "the evaporated fuel gas purge is not being carried out (more specifically, whether or not the target purge rate PGT obtained by a routine shown in FIG. 9 described later is not "0")". When the fuel gas purge is being carried out, the CPU 81 makes a "No" determination at step 810 to proceed directly to step 895 to end the present routine tentatively. Consequently, the main FB learning value KG is not updated.

In contrast, in a case in which the fuel gas purge is not being carried out when the CPU 81 proceeds to step 810, the CPU 81 makes a "Yes" determination at step 810 to proceed to step 815 at which the CPU 81 determines whether or not the correction coefficient average FAFAV is equal to or larger than the value 1+α (α is a predetermined minute value larger than 0 and smaller than 1, e.g. 0.02). At this time, if the correction coefficient average FAFAV is equal to or larger than the value 1+α, the CPU 81 proceeds to step 820 to increase the main FB learning value KG by a predetermined positive value X. Thereafter, the CPU 81 proceeds to step 835.

In contrast, if the correction coefficient average FAFAV is smaller than the value 1+α when the CPU 81 proceeds to step 815, the CPU 81 proceeds to step 825 to determine whether or not the correction coefficient average FAFAV is equal to or smaller than the value 1−α. At this time, if the correction coefficient average FAFAV is smaller than the value 1−α, the CPU 81 proceeds to step 830 to decrease the main FB learning value KG by the predetermined positive value X. Thereafter, the CPU 81 proceeds to step 835.

Further, when the CPU 81 proceeds to step 835, the CPU 81 sets a main feedback learning completion flag (main FB learning completion flag) XKG to (at) "0". The main FB learning completion flag XKG indicates that the main feedback learning has been completed when its value is equal to "1", and that the main feedback learning has not been completed yet when its value is equal to "0". Subsequently, the CPU 81 proceeds to step 840 to set a value of a main learning counter CKG to (at) "0". It should be noted that the value of the main learning counter CKG is also set to (at) "0" by an initialization routine executed when a position of an unillustrated ignition key switch of the vehicle on which the engine 10 is mounted is changed from the off-position to the on-position. Thereafter, the CPU 81 proceeds to step 895 to end the present routine tentatively.

Further, if the correction coefficient average FAFAV is larger than the value 1−α (that is, the correction coefficient average FAFAV is between the value $1-\alpha$ and the value $1+\alpha$) when the CPU 81 proceeds to step 825, the CPU 81 proceeds to step 845 to increment the main learning counter CKG by "1".

Thereafter, the CPU 81 proceeds to step 850 to determine whether or not the main learning counter CKG is equal to or larger than a predetermined main learning counter threshold CKGth. When the main learning counter CKG is equal to or larger than the predetermined main learning counter threshold CKGth, the CPU 81 proceeds to step 855 to set the main FB learning completion flag XKG to (at) "1". That is, it is regarded that the learning of the main feedback learning value KG has been completed, when the number of times of occurrence of a state in which the value of the correction coefficient average FAFAV is between the value $1-\alpha$ and the value $1+\alpha$ after the start of the engine 10 is equal to or larger than the predetermined main learning counter threshold CKGth. Thereafter, the CPU 81 proceeds to step 895 to end the present routine tentatively.

In contrast, if the main learning counter CKG is smaller than the predetermined main learning counter threshold CKGth when the CPU 81 proceeds to step 850, the CPU 81 proceeds directly to step 895 from step 850 to end the present routine tentatively.

It should be noted that the program may be configured in such a manner that the main learning counter CKG is set to (at) "0" when the "No" determination is made at either step 805 or step 810. According to the configuration, it is regarded that the learning of the main FB learning value KG has been completed, when the number of times of occurrence of the state in which the value of the correction coefficient average FAFAV is between the value $1-\alpha$ and the value $1+\alpha$ in a state in which the CPU 81 proceeds to steps following to step 815 (that is, in a state in which the main feedback learning is performed) becomes larger than the main learning counter threshold CKGth.

in this way, the main FB learning value KG is renewed (updated) while the main feedback control is being performed and the evaporated fuel gas purge is not being performed.

<Driving of the Purge Control Valve>

Figure 9:
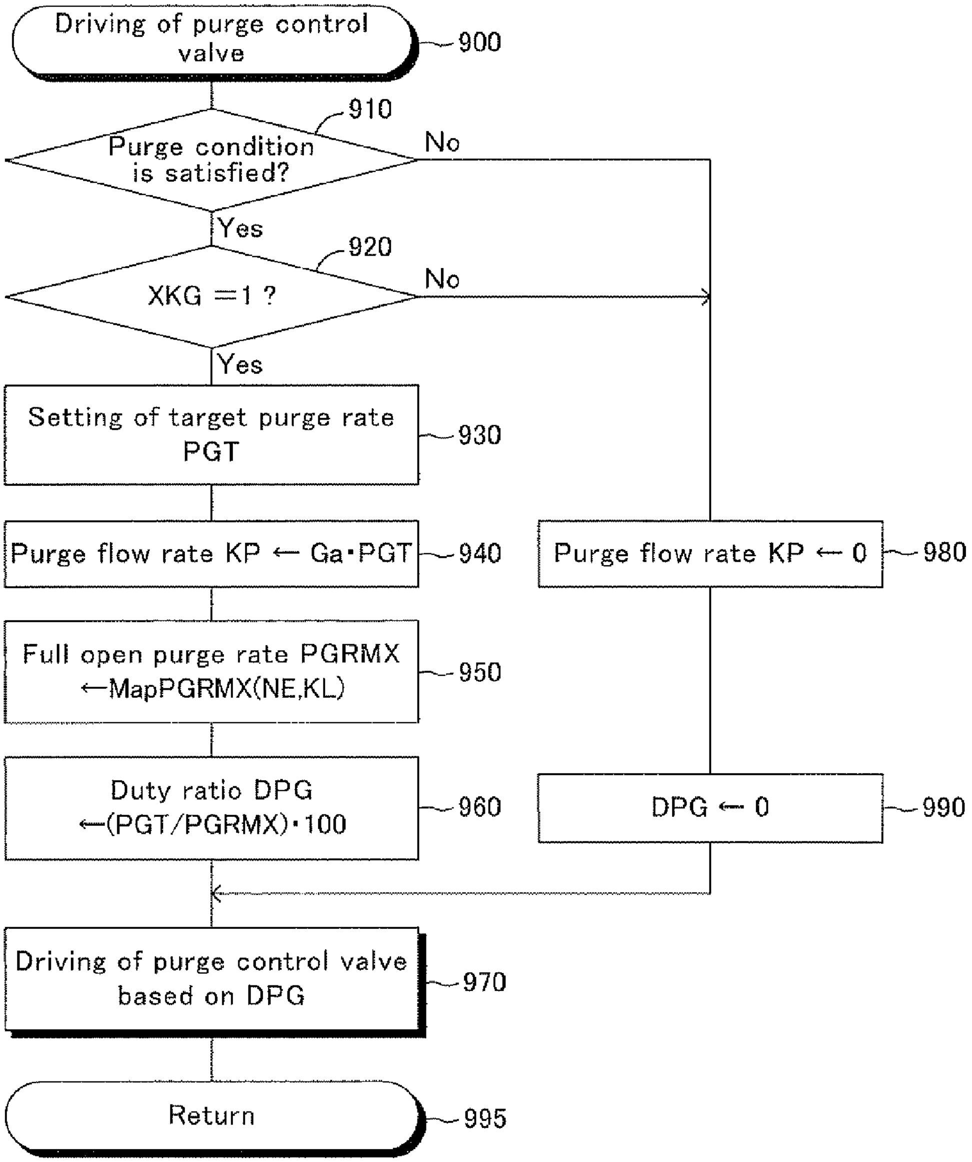
FIG. 9 is a flowchart showing a routine executed by the CPU of the first control apparatus.

Meanwhile, the CPU 81 executes a purge control valve driving routine" shown in FIG. 9 every time a predetermined time period elapses. Accordingly, at an appropriate timing, the CPU 81 starts the process from step 900 to proceed to step 910 at which CPU 81 determines whether or not a purge condition is satisfied. The purge condition is satisfied when, for example, the air-fuel ratio feedback control is being performed, and the engine 10 is being operated under a steady state (e.g., a change amount of the throttle valve opening angle TA representing the load of the engine per unit time is equal to or smaller than a predetermined value).

Here, it is assumed that the purge condition is satisfied. In this case, the CPU 81 makes a "Yes" determination at step 910 to proceed to step 920 at which the CPU 81 determines whether or not the main FB learning completion flag XKG is equal to "1" (i.e., whether or not the main feedback learning has been completed). When the main FB learning completion flag XKG is equal to "1", the CPU 81 makes a "Yes" determination at step 920 to execute processes from steps 930 to 970 described below in this order, and then proceeds to step 995 to end the present routine tentatively.

Step 930: The CPU 81 sets/determines the target purge rate PGT based on an operating state of the engine 10 (e.g., the load KL of the engine, and the engine rotational speed NE). It should be noted that the target purge rate PGT may be increased by a predetermined value while the correction coefficient average FAFAV is between the value $1+\alpha$ and the value $1-\alpha$. The load KL is a loading rate (filling rate) KL in the present example, and is obtained according to a formula (A) described below. In the formula (A), $\rho$ is an air density (unit is (g/l), L is a displacement of the engine 10 (unit is (l)), and 4 is the number of cylinders of the engine 10. It should be noted that the load KL may be the cylinder intake air amount Mc, the throttle valve opening angle TA, the accelerator pedal operation amount Accp, or the like.

$$KL=(Mc(k)/(\rho\cdot L/4))\cdot 100(\%) \quad (A)$$

Step 940: The CPU 81 calculates a "purge flow rate (an evaporated fuel gas purge amount) KP which is a flow rate of the evaporated fuel gas" based on the target purge rate PGT and the intake air amount (air flow rate) Ga, according to a formula (19) described below. In other words, the purge rate is defined as a ratio of the purge flow rate KP to the intake air amount Ga. Alternatively, the purge rate may be defined as a ratio of the purge flow rate KP to "a sum (Ga+KP) of the intake air amount Ga and the purge flow rate KP".

$$KP=Ga\cdot PGT \quad (19)$$

Step 950: The CPU 81 obtains a full open purge rate PGRMX by applying the rotational speed NE and the load KL to a table (Map) MapPGRMX, as shown in a formula (20) described below. The full open purge rate PGRMX is a purge rate when the purge control valve 49 is fully opened. The table MapPGRMX is obtained in advance based on results of experiments or simulations, and is stored in the ROM 82. According to the table MapPGRMX, the full open purge rate PGRMX is determined so as to become smaller, as the rotational speed NE becomes higher or the load KL becomes higher.

$$PGRMX=\text{Map}PGRMX(NE,KL) \quad (20)$$

Step 960: The CPU 81 calculates the duty ratio DPG using the full open purge rate PGRMX and the target purge rate PGT, according to a formula (21) described below.

$$DPG=(PGT/PGRMX)\cdot 100 \quad (21)$$

Step 970: The CPU 81 opens or closes the purge control valve 49 based on the duty ratio DPG.

In contrast, when the purge condition is not satisfied, the CPU 81 makes a "No" determination at step 910 to proceed to step 980. In addition, when the main FB learning completion flag XKG is "0", the CPU 81 makes a "No" determination at step 920 to proceed to step 980. Then, the CPU 81 sets the purge flow rate KP to (at) "0" at step 980, sets the duty ratio DPG to (at) "0" at step 990, and thereafter proceeds to step 970. At this time, since the duty ratio DPG is set at "0", the purge control valve 49 is fully/completely closed. Thereafter, the CPU 81 proceeds to step 995 to end the present routine tentatively.

<Evaporated Fuel Gas Concentration Learning>

Figure 10:
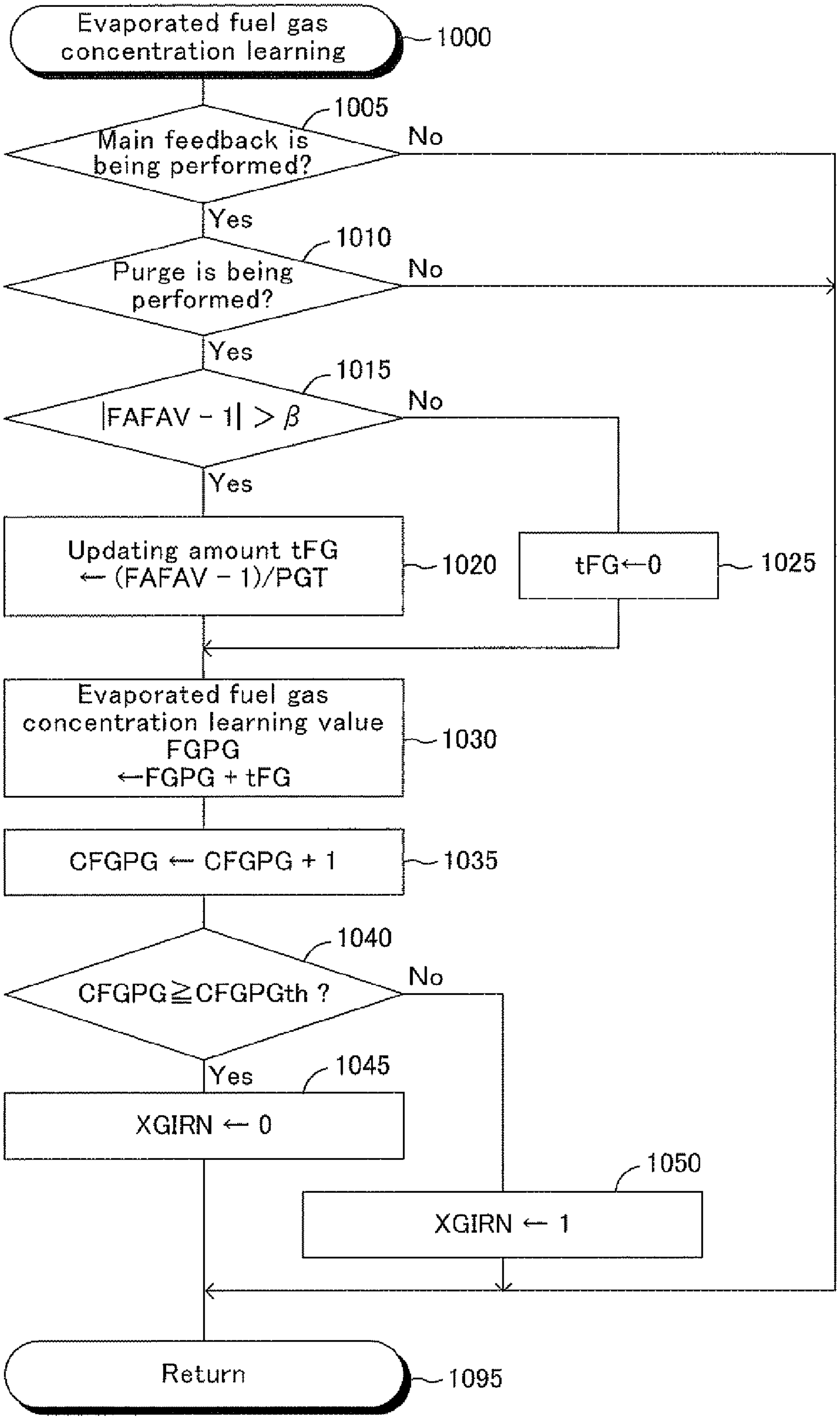
FIG. 10 is a flowchart showing a routine executed by the CPU of the first control apparatus.

Further, the CPU 81 executes an "evaporated fuel gas concentration learning routine" shown in FIG. 10 every time a predetermined time period elapses. An execution of the evaporated fuel gas concentration learning routine allows to update/change the evaporated fuel gas concentration learning value FGPG while the evaporated fuel gas purge is being carried out.

That is, at an appropriate timing, the CPU 81 starts the process from step 1000 to proceed to step 1005 at which CPU 81 determines whether or not the main feedback control is being performed. At this time, if the main feedback control is not being performed, the CPU 81 makes a "No" determination at step 1005 to proceed directly to step 1095 to end the present routine tentatively. Accordingly, the update of the evaporated fuel gas concentration learning value FGPG is not performed.

In contrast, when the main feedback control is being performed, the CPU 81 proceeds to step 1010 at which the CPU 81 determines whether or not "the evaporated fuel gas purge is being performed (more specifically, whether or not the target purge rate PGT obtained by the routine shown in FIG. 9 is "0")". At this time, if the evaporated fuel gas purge is not being performed, the CPU 81 makes a "No" determination at step 1010 to proceed directly to step 1095 to end the present routine tentatively. Accordingly, the update of the evaporated fuel gas concentration learning value FGPG is not performed.

If the evaporated fuel gas purge is being performed when the CPU 81 proceeds to step 1010, the CPU 81 makes a "Yes" determination at step 1010 to proceed to step 1015 at which the CPU 81 determines whether or not an absolute value |FAFAV−1| of a value obtained by subtracting "1" from the correction coefficient average FAFAV is equal to or larger than a predetermined value β. β is a predetermined minute value larger than 0 and smaller than 1, and for example, 0.02.

When the absolute value |FAFAV−1| is equal to or larger than the value 3, the CPU 81 makes a "Yes" determination at step 1015 to proceed to step 1020 at which the CPU 81 obtains an updating amount tFG according to a formula (22) described below. The target purge rate PGT in the formula (22) is set at step 930 shown in FIG. 9. As is apparent from the formula (22), the updating amount tFG is "an error ϵ a (a difference obtained by subtracting 1 from FAFAV, i.e. FAFAV−1)" per 1% of the target purge rate. Thereafter, the CPU 81 proceeds step 1030.

$$tFG=(FAFAV-1)/PGT \quad (22)$$

The upstream air-fuel ratio abyfs becomes smaller with respect to the stoichiometric air-fuel ratio (an air-fuel ratio in a richer side with respect to the stoichiometric air-fuel ratio), as the concentration of the evaporated fuel gas becomes higher. Accordingly, the main feedback coefficient FAF becomes a "smaller value", and therefore, the correction coefficient average FAFAV also becomes a "smaller value" which is smaller than "1". As a result, the value (FAFAV−1) becomes negative, and thus, the updating amount tFG becomes negative. Further, an absolute value of the updating amount tFG becomes larger as the value FAFAV becomes smaller (deviates more from "1"). That is, updating amount tFG becomes a negative value whose absolute value becomes larger, as the concentration of the evaporated fuel gas becomes higher.

In contrast, if the absolute value |FAFAV−1| is equal to or smaller than the predetermined value β, the CPU 81 makes a "No" determination at step 1015 to proceed to step 1025 to set the updating amount tFG to (at) "0". Subsequently, the CPU 81 proceeds to step 1030.

The CPU 81 updates/changes the evaporated fuel gas concentration learning value FGPG at step 1030 according to a formula (23) described below. In the formula (23), FGPGnew is renewed (updated) evaporated fuel gas concentration learning value FGPG. Consequently the evaporated fuel gas concentration learning value FGPG becomes smaller as the concentration of the evaporated fuel gas becomes higher. It should be noted that an initial value of the evaporated fuel gas concentration learning value FGPG is set at "1".

$$FGPGnew=FGPG+tFG \quad (23)$$

Subsequently, the CPU 81 proceeds to step 1035 at which the CPU 81 increments "the number of times of update opportunity CFGPG of the evaporated fuel gas concentration learning value FGPG (hereinafter referred to as "the number of times of update CFGPG)" by "1". The number of times of update CFGPG is set to (at) "0" by the initializing routine described above.

Subsequently, the CPU 81 proceeds to step 1040 at which the CPU 81 determines whether or not the number of times of update CFGPG is equal to or larger than the number of times of update threshold CFGPGth. When the number of times of update CFGPG is equal to or larger than the number of times of update threshold CFGPGth, the CPU 81 proceeds to step 1045 at which the CPU 81 sets an air-fuel ratio disturbance occurrence flag XGIRN to (at) "0".

In contrast, when the number of times of update CFGPG is smaller than the number of times of update threshold CFGPGth, the evaporated fuel gas concentration learning value FGPG has not yet sufficiently learned/updated. Therefore, the CPU 81 infers that the disturbance which causes the air-fuel ratio to vary, and proceeds to step 1050 at which the CPU 81 sets the air-fuel ratio disturbance occurrence flag XGIRN to (at) "1". The air-fuel ratio disturbance occurrence flag XGIRN is referred to (observed) when the CPU 81 determines whether or not the expedite learning control should be performed in an expedited learning control routine shown in FIG. 13 described later. It should be noted that the air-fuel ratio disturbance occurrence flag XGIRN is set to (at) "0" in the initialization routine described above.

<Calculation of the Sub Feedback Amount and the Sub FB Learning Value>

Figure 11:
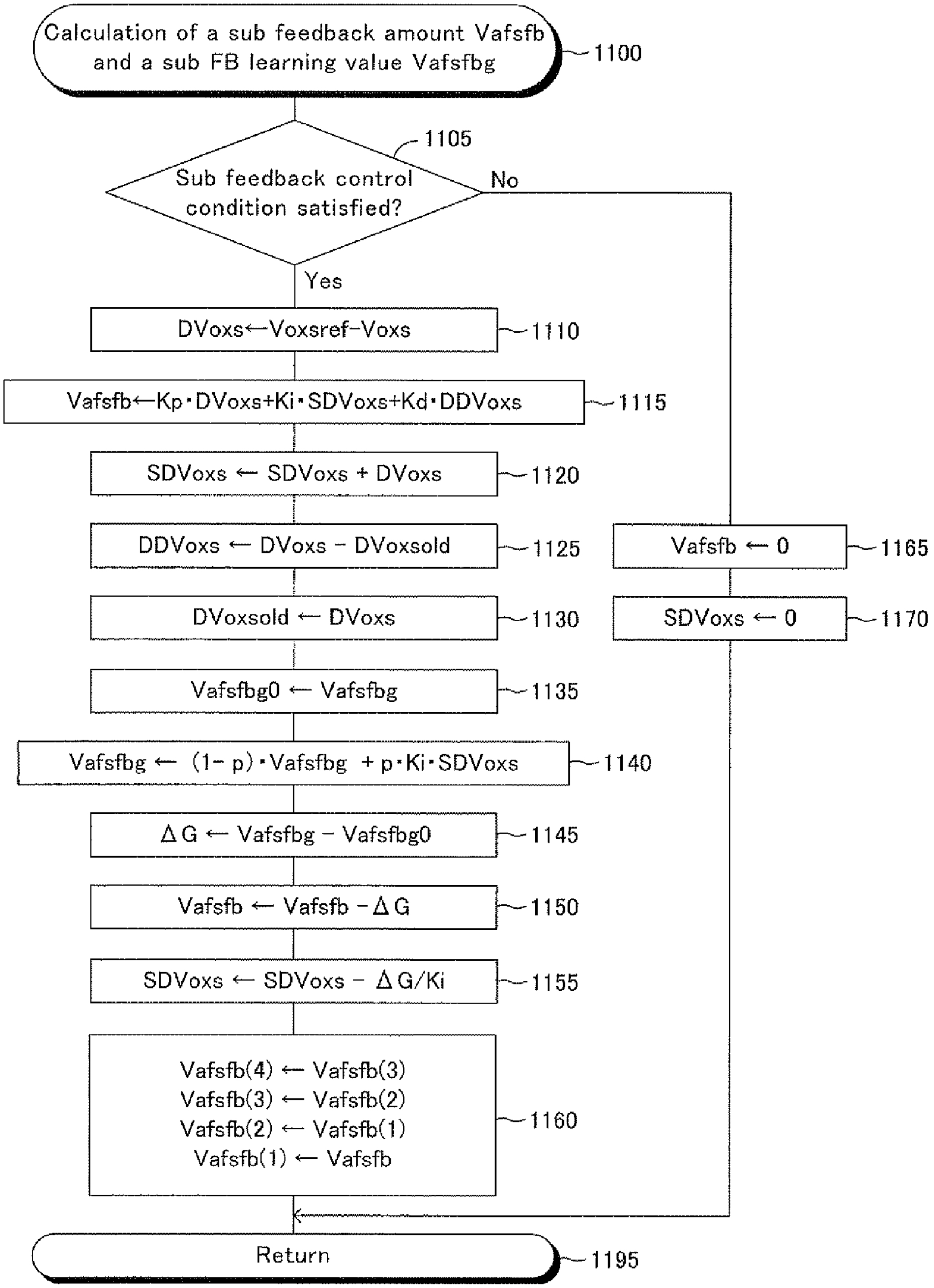
FIG. 11 is a flowchart showing a routine executed by the CPU of the first control apparatus.

The CPU 81 executes a routine shown in FIG. 11 every time a predetermined time period elapses in order to calculate the sub feedback amount Vafsfb and the learning value Vafsfbg of the sub feedback amount Vafsfb. Accordingly, at an appropriate timing, the CPU 81 starts the process from step 1100 to proceed to step 1105 at which CPU determines whether or not a sub feedback control condition is satisfied. The sub feedback control condition is satisfied when, for example, the main feedback control condition described in step 705 shown in FIG. 7 is satisfied, the target upstream-side air-fuel ratio is set to (at) the stoichiometric air-fuel ratio, the cooling water temperature THW is equal to or higher than a second determined temperature higher than the first determined temperature, and the downstream air-fuel ratio sensor 68 has been activated.

The description continues assuming that the sub feedback control condition is satisfied. In this case, the CPU 81 makes a "Yes" determination at step 1105 to execute processes from steps 1110 to 1160 described below in this order, and proceeds to step 1195 to end the present routine tentatively.

Step 1110: The CPU 81 obtains the error amount of output DVoxs which is a difference between the target downstream-side value Voxsref (i.e., the stoichiometric air-fuel ratio corresponding value Vst) and the output value Voxs of the downstream air-fuel ratio sensor 68, according to a formula (10) described above. The error amount of output DVoxs is referred to as a "first error".

Step 1115: The CPU 81 obtains the sub feedback amount Vafsfb according to a formula (11) described above.

Step 1120: The CPU 81 obtains a new integrated value SDVoxs of the error amount of output by adding the "error amount of output DVoxs obtained at step 1110" to the "current integrated value SDVoxs of the error amount of output".

Step 1125: The CPU 81 obtains a new differential value DDVoxs by subtracting a "previous error amount of the output DVoxsold calculated when the present routine was executed at a previous time" from the "error amount of output DVoxs calculated at the step 1110".

Step 1130: The CPU 81 stores the "error amount of output DVoxs calculated at the step 1110" as the "previous error amount of the output DVoxsold".

As described above, the CPU 81 calculates the "sub feedback amount Vafsfb" according to the proportional-integral-differential (PID) control to have the output value Voxs of the downstream air-fuel ratio sensor 68 coincide with the target downstream-side value Voxsref. As shown in the formula (1) described above, the sub feedback amount Vafsfb is used to calculate the output value Vabyfc for a feedback control.

Step 1135: The CPU 81 stores the "current sub FB learning value Vafsfbg" as a "before updated learning value Vafsfbg0".

Step 1140: The CPU 81 updates/changes the sub FB learning value Vafsfbg according to the formula (12) or the formula (13) described above. The updated sub FB learning value Vafsfbg (=Vafsfbgnew) is stored in the backup RAM 84. The value p in the formula (12) or in the formula (13) is set to (at) pSmall during a normal operating state including a period in which the expedited learning control is prohibited, and is set to (at) pLarge larger than pSmall when the expedited learning control is performed, by an expedited learning routine shown in FIG. 13 described later.

As is clear from the formula (12), the sub FB learning value Vafsfbg is a value obtained by performing a "filtering process to eliminate noises" on the "integral term Ki·SDVoxs of the sub feedback amount Vafsfb". In other words, the sub FB learning value Vafsfbg is a value corresponding to a steady-state component (integral term) of the sub feedback amount Vafsfb.

Also, as is clear from the formula (13), the sub FB learning value Vafsfbg is a first order lag amount (blurred amount) of the sub feedback amount Vafsfb.

Thus, the sub FB learning value Vafsfbg is updated/changed so as to bring in (fetche in) the steady-state component of the sub feedback amount Vafsfb.

Step 1145: The CPU 81 calculates a change amount (update amount) ΔG of the sub FB learning value Vafsfbg, according to the formula (14) described above.

Step 1150: The CPU 81 corrects the sub feedback amount Vafsfb with the change amount ΔG, according to the formula (15) described above.

Step 1155: The CPU 81 corrects the integral term Ki·SDVoxs based on the change amount ΔG according to the formula (16) described above. It should be noted that step 1155 may be omitted. Further, the steps from step 1145 to step 1155 may be omitted.

Step 1160: The CPU 81 stores the learning value Vafsfbg (3) which was obtained when the process of step 1140 was executed three times ago as the learning value Vafsfbg(4) which was obtained when the process of step 1140 was executed four times ago. Hereinafter, the learning value Vafsfbg(n) which was obtained when the process of step 1140 was executed n times ago is simply referred as an "n times previous learning value Vafsfbg(n)". Further, the CPU 81 stores the two times previous learning value Vafsfbg(2) as the three times previous learning value Vafsfbg(3), and stores the one time previous learning value Vafsfbg(1) as the two times previous learning value Vafsfbg(2). Furthermore, the CPU 81 stores the learning value Vafsfbg currently obtained at step 1140 as the one time previous learning value Vafsfbg(1).

By the processes described above, the sub feedback amount Vafsfb and the sub FB learning value Vafsfbg are updated every time the predetermined time period elapses (every time the first update timing arrives, and every time the second update timing arrives).

In contrast, when the sub feedback control condition is not satisfied, the CPU 81 makes a "No" determination at step 1105 shown in FIG. 11 to execute processes of step 1165 and step 1170 described below, and then proceeds to step 1195 to end the present routine tentatively.

Step 1165: The CPU 81 sets the value of the sub feedback amount Vafsfb at (to) "0".

Step 1170: The CPU 81 sets the value of the integrated value SDVoxs of the error amount of output at (to) "0".

By the processes described above, as is clear from the formula (1) above, the output value Vabyfsc for a feedback control becomes equal to the sum of the output value Vabyfs of the upstream air-fuel ratio sensor 67 and the sub FB learning value Vafsfbg. That is, in this case, "updating the sub feedback amount Vafsfb" and "reflecting the sub feedback amount Vafsfb in (into) the final fuel injection amount Fi" are stopped. It should be noted that at least the sub FB learning value Vafsfbg corresponding to the integral term of the sub feedback amount Vafsfb is reflected in (into) the final fuel injection amount Fi.

<Large Deviation Determination of the Sub Feedback Amount>

Figure 12:
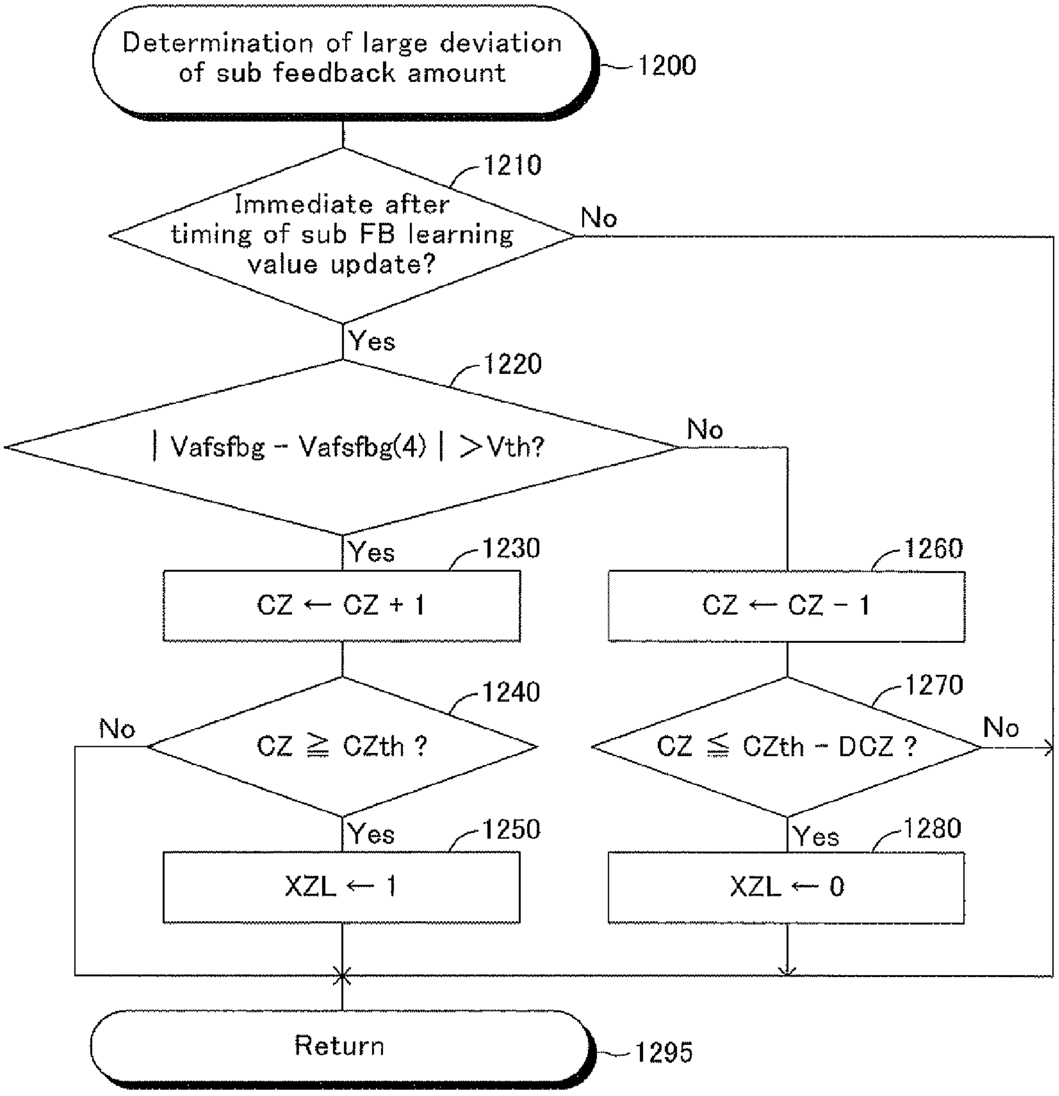
FIG. 12 is a flowchart showing a routine executed by the CPU of the first control apparatus.

The CPU 81 executes a routine shown in FIG. 12 every time a predetermined time period elapses in order to determine whether or not it is necessary to execute/perform the expedited learning control for the sub FB learning value. Accordingly, at an appropriate timing, the CPU 81 starts the process from step 1200 to proceed to step 1210 at which CPU determine whether or not "the present time is immediately after a timing at which the sub FB learning value Vafsfbg is updated (immediately after the sub FB learning value update timing). At this time, the present time is not immediately after the sub FB learning value update timing, the CPU 81 proceeds directly to step 1295 from step 1210 to end the present routine tentatively.

In contrast, when the present time is immediately after the sub FB learning value update timing, the CPU 81 makes a "Yes" determination at step 1210 to proceed to step 1220 at which the CPU 81 determines whether or not a formula (24) described below is satisfied.

$$Vafsfbg - Vafsfbg(4)| > Vth \qquad (24)$$

That is, the CPU 81 determines whether or not an absolute value of a difference between the learning value Vafsfbg(4) which was updated a predetermined times ago (in the present example, four times) and the learning value Vafsfbg which has been updated currently is larger than a predetermined threshold Vth. If the learning value Vafsfbg deviates from the convergence value by a "predetermined value" or more, the learning value Vafsfbg is updated by a considerably amount every time it is updated, and therefore, the formula (24) described above is satisfied. In other words, a satisfaction of the formula (24) indicates that it is inferred that an insufficient learning state is occurring in which a "second error" which is a difference between the "learning value Vafsfbg" and the "value on which the learning value Vafsfbg is supposed to converge" is equal to or larger than a predetermined value.

In view of the above, when the formula (24) described above is satisfied, the CPU 81 makes a "Yes" determination at step 1220 to proceed to step 1230 to increment a value of a deviation determination counter CZ by "1". Subsequently the CPU 81 proceeds to step 1240 to determine whether or not the value of the deviation determination counter CZ is equal to or larger than a deviation determination threshold (expedited learning control request threshold) CZth.

At this time, if the value of the deviation determination counter CZ is smaller than the deviation determination threshold CZth, the CPU 81 proceeds directly to step 1295 to end the present routine tentatively.

In contrast, when the difference between the "learning value Vafsfbg" and the "value on which the learning value Vafsfbg is supposed to converge" is considerably large, the determination condition at step 1220 is continuously satisfied. In this case, the process at step 1230 is repeatedly executed, and therefore, the value of the deviation determination counter CZ gradually increases to reach the deviation determination threshold CZth at a certain timing. At this stage, when the CPU 81 executes the process at step 1240, the CPU 81 makes a "Yes" determination at step 1240 to proceed to step 1250 at which the CPU 81 sets a value of an expediting learning request flag XZL (large deviation determination flag XZL) to (at) "1". It should be noted that expediting learning request flag XZL is set to (at) "0" by the initialization routine described above, however, expediting learning request flag XZL may be set to (at) "1" by the initialization routine.

On the other hand, when the determination condition at step 1220 (the formula (24)) is not satisfied, the CPU 81 makes a "No" determination at step 1220 to proceed to step 1260 at which the CPU 81 decrements the value of the deviation determination counter CZ by "1". Subsequently the CPU 81 proceeds to step 1270 to determine whether or not the value of the deviation determination counter CZ is equal to or smaller than a small deviation determination threshold (expedited learning control unnecessary threshold) CZth−DCZ. Here, the value DCZ is a positive value, and the value CZth−DCZ is also a positive value. That is, the small deviation determination threshold (CZth−DCZ) is smaller than the deviation determination threshold CZth.

At this time, if the value of the deviation determination counter CZ is larger than the small deviation determination threshold (CZth−DCZ), the CPU 81 proceeds directly to step 1295 to end the present routine tentatively.

In contrast, when the difference between the "learning value Vafsfbg" and the "value on which the learning value Vafsfbg is supposed to converge" is small, the determination condition at step 1220 is continuously unsatisfied. In this case, the process at step 1260 is repeatedly executed, and therefore, the value of the deviation determination counter CZ gradually decreases to become equal to or smaller than the small deviation determination threshold (CZth−DCZ) at a certain timing. At this stage, when the CPU 81 executes the process at step 1270, the CPU 81 makes a "Yes" determination at step 1270 to proceed to step 1280 to set the value of the expediting learning request flag XZL (large deviation determination flag XZL) to (at) "0". In this way, the expediting learning request flag XZL is set.

<Expedited Learning Control of the Sub FB Learning Value (First)>

Figure 13:
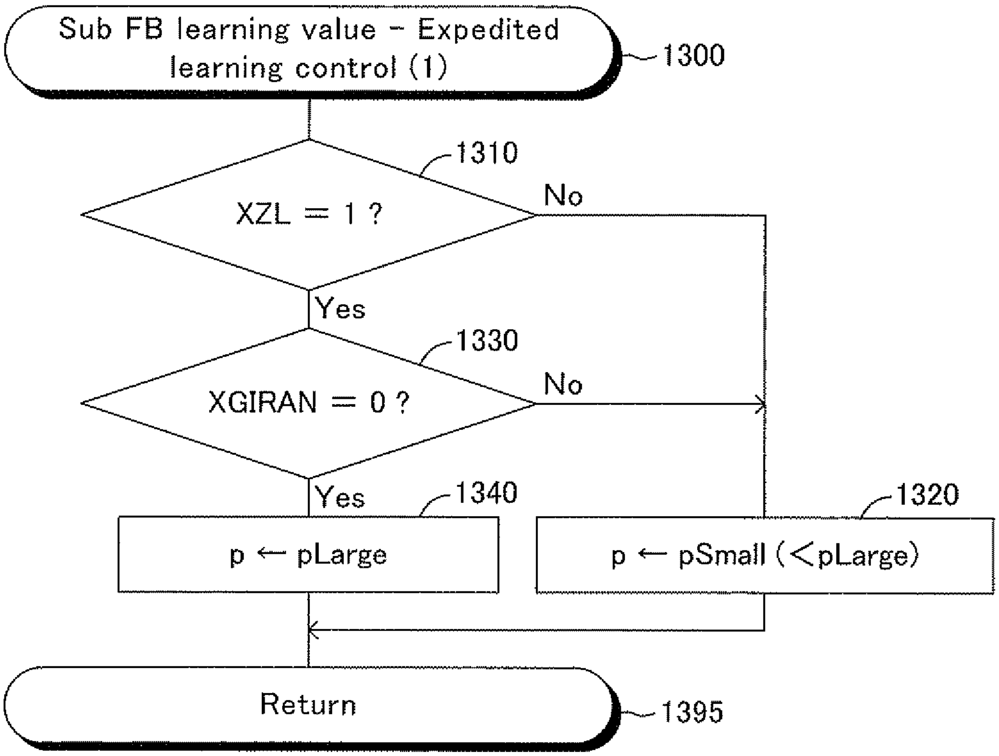
FIG. 13 is a flowchart showing a routine executed by the CPU of the first control apparatus.

The CPU 81 executes an expedited learning control routine of the sub FB learning value Vafsfbg shown in FIG. 13 every time a predetermined time period elapses. Accordingly, at an appropriate timing, the CPU 81 starts the process from step 1300 to proceed to step 1310 at which CPU 81 determine whether or not the value of the expediting learning request flag XZL is equal to "1".

When the value of the expediting learning request flag XZL is equal to "0", the CPU 81 makes a "No" determination at step 1310 to proceed to step 1320 at which the CPU 81 sets the value p in the formula (12) (or the formula (13)) used at step 1140 shown in FIG. 11 to (at) a first value (normal learning speed corresponding value) pSmall. Thereafter, the CPU 81 proceeds to step 1395 to end the present routine tentatively. Consequently, the learning value Vafsfbg brings (fetches) in the newly obtained integral term Ki·SDVoxs by a small rate (amount) at step 1140 shown in FIG. 11, and therefore, the learning value Vafsfbg comes closer to (approach) the convergence value gradually (slowly). Alternatively, when the formula (13) is used at step 1140 shown in FIG. 11, the learning value Vafsfbg comes closer to (approach) the steady-state component of the learning value Vafsfbg gradually (slowly). That is, the normal learning control is performed.

In contrast, when the value of the expediting learning request flag XZL is equal to "1", the CPU 81 makes a "Yes" determination at step 1310 to proceed to step 1330 at which the CPU 81 determines whether or not the value of the air-fuel ratio disturbance occurrence flag XGIRN is equal to "0". When the value of the air-fuel ratio disturbance occurrence flag XGIRN is set to (at) "1" at step 1250 shown in FIG. 12 described above, the CPU 81 makes a "No" determination at step 1330 to proceed to step 1320 described above. Accordingly, the normal learning control is performed.

In contrast, when the CPU 81 proceeds to step 1330, and the value of the air-fuel ratio disturbance occurrence flag XGIRN is equal to "0", the CPU makes a "Yes" determination at step 1330 to proceed to step 1340. At step 1340, the CPU sets the value p in the formula (12) (or the formula (13)) used at step 1140 shown in FIG. 11 to (at) a second value (expedited learning speed corresponding value) pLarge. The value pLarge is larger than the value pSmall. Consequently, the learning value Vafsfbg brings (fetches) in the newly obtained integral term Ki·SDVoxs by a large rate (amount) at step 1140 shown in FIG. 11, and therefore, the learning value Vafsfbg comes closer to (approach) the convergence value promptly (quickly). Alternatively, when the formula (13) is used at step 1140 shown in FIG. 11, the learning value Vafsfbg comes closer to (approach) the steady-state component of the learning value Vafsfbg promptly (quickly). That is, the expedited learning control is performed.

As described above, even if the request for the expedited learning control to have the learning value Vafsfbg comes close to the convergence value promptly is generated (i.e., even when the expediting learning request flag XZL is set to "1"), the expedited learning control is prohibited when the number of times of update opportunity CFGPG of the evaporated fuel gas concentration learning value is smaller than the number of times of update threshold CFGPGth, and therefore, it is inferred that the "state in which the air-fuel ratio of the engine is disturbed transiently" due to the evaporated fuel gas purge occurs because the correction of the base fuel injection amount Fb by the purge correction coefficient FPG is not sufficient (i.e., when the value of the air-fuel ratio disturbance occurrence flag XGIRN is set to (at) "1"). Therefore, it can be avoided that the learning value Vafsfbg changes to a value which is different from the value on which the learning value Vafsfbg should converges.

It should be noted that the first control apparatus is an apparatus which is applied to the multi-cylinder engine 10 having a plurality of the cylinders, and which comprises:

a catalytic converter 53 disposed in an exhaust passage of the engine and at a position downstream of an exhaust gas aggregated portion into which exhaust gases discharged from combustion chambers 25 (in the present example, all of the combustion chambers 25) of at least two or more of a plurality of the cylinders merge;

fuel injectors 39, each injecting a fuel to be contained in a mixture supplied to (each of) the combustion chambers 25 (in the present example, all of the combustion chambers 25) of the two or more of the cylinders;

a downstream air-fuel ratio sensor 68, which is disposed in the exhaust passage and at a position downstream of the catalytic converter 53, and which outputs an output value according to an air-fuel ratio of a gas passing through the position at which the downstream air-fuel ratio sensor is disposed;

first feedback amount updating means (refer to the routine shown in FIG. 11, especially step 1105-step 1130) for updating, every time a predetermined first update timing (a timing at which the routine shown in FIG. 11 is executed) arrives, a first feedback amount (the sub feedback amount Vafsfb) to have the output value Voxs of the downstream air-fuel ratio sensor 68 coincide with a value (the target downstream-side value Voxsref=the stoichiometric corresponding value Vst) corresponding to a target downstream-side air-fuel ratio, based on the first error (output error amount DVoxs) which is a difference between the output value Voxs of the downstream air-fuel ratio sensor and the value corresponding to the target downstream-side air-fuel ratio (the target downstream-side value Voxsref);

learning means (refer to the routine shown in FIG. 11, especially step 1135-step 1155) for updating, every time a predetermined second update timing (a timing at which the routine shown in FIG. 11 is executed) arrives, a learning value (the sub FB learning value Vafsfbg) of the first feedback amount in such a manner that the learning value brings in a steady-state component of the first feedback amount (the sub feedback amount Vafsfb), based on the first feedback amount;

air-fuel ratio control means (refer to the routines shown in FIGS. 6 and 7) for controlling an air-fuel ratio of the exhaust gas flowing into the catalytic converter 53 by controlling an amount of the fuel injected from the injectors 39, based on at least one of the first feedback amount (the sub feedback amount Vafsfb) and the learning value (the sub FB learning value Vafsfbg);

expedited learning means for inferring whether or not an insufficient learning state in which the second error which is a difference between the learning value and a value on which the learning value is supposed to converge is equal to or larger than a predetermined value is occurring (refer to step 1160 shown in FIG. 11 and the routine shown in FIG. 12), and for performing an expedited learning control to increase a changing speed of the learning value when it is inferred that the insufficient learning state is occurring (when the value of the expediting learning request flag XZL is equal to "1") as compared to when it is inferred that the insufficient learning state is not occurring (when the value of the expediting learning request flag XZL is equal to "0") (refer to the routine shown in FIG. 13 and the value p at step 1140 shown in FIG. 11); and prohibiting expedited learning means for inferring whether or not a disturbance which transiently varies the air-fuel ratio of the mixture supplied to the combustion chambers 25 of the at least two or more of the cylinders (in the present example, all of the combustion chambers 25 of all of the cylinders) occurs (step 1040 shown in FIG. 10), and for prohibiting the expedited learning control when it is inferred that the disturbance occurs (when the value of the air-fuel ratio disturbance occurrence flag XGIRN is equal to "1") (refer to step 1330 and step 1320, shown in FIG. 13).

In addition, the air-fuel ratio control means includes:

an upstream air-fuel ratio sensor (67), which is disposed at the aggregated exhaust gas portion or between the aggregated exhaust gas portion and the catalytic converter (53) in the exhaust passage, and which outputs an output value according to an air-fuel ratio of a gas flowing through a position at which the upstream air-fuel ratio sensor is disposed;

base fuel injection amount determining means (refer to step 610 and step 630, shown in FIG. 6) for determining a base fuel injection amount Fb to have the air-fuel ratio of the mixture supplied to the combustion chambers of the at least two or more of the cylinders coincide with a target upstream-side air-fuel ratio abyfr which is an air-fuel ratio equal to the target downstream air-fuel ratio, based on an intake air amount of the engine and the target upstream-side air-fuel ratio;

second feedback amount updating means (refer to the routine shown in FIG. 7, and step 650 shown in FIG. 6) for updating, every time a predetermined third update timing (a timing at which the routine shown in FIG. 7 is executed) arrives, a second feedback amount (the main feedback coefficient FAF, or at least a product (FAF·FPG) of the main feedback coefficient FAF and the purge correction coefficient FPG) to correct the base fuel injection amount Fb in such a manner that the air-fuel ratio of the mixture supplied to the combustion chambers of the at least two or more of the cylinders coincides with the target upstream-side air-fuel ratio abyfr, based on the output value Vabyfs of the upstream air-fuel ratio sensor (67), the first feedback amount (the sub feedback amount Vafsfb), and the learning value (the sub FB learning value Vafsfbg); and fuel injection instruction means (refer to step 650 and step 660, shown in FIG. 6) for instructing the fuel injectors 39 to inject the fuel of a fuel injection amount (Fi) obtained by correcting the base fuel injection amount (Fb) by the second feedback amount.

Further, in the first control apparatus, the learning means is configured so as to update the learning value (the sub FB learning value Vafsfbg) so as to have the learning value (the sub FB learning value Vafsfbg) gradually come closer to (approach) either the first feedback amount (the sub feedback amount Vafsfb) or the steady-state component (e.g., the integral term Ki·SDVoxs) included in the first feedback amount (refer to step 1140 shown in FIG. 11); and the expedited learning means is configured so as to instruct the first feedback amount updating means to increase a changing speed (the value p at step 1140 shown in FIG. 11) of the first feedback amount (the sub feedback amount Vafsfb) in such a manner that the changing speed of the first feedback amount when it is inferred that the insufficient learning state is occurring is higher than the changing speed of the first feedback amount when it is inferred that the insufficient learning state is not occurring (refer to the routine shown in FIG. 13).

Furthermore, the first control apparatus can be expressed as follows.

An air-fuel ratio control apparatus comprising:

a fuel tank (45) for storing fuel to be supplied to the fuel injectors;

a purge passage section (48) connecting between the fuel tank and an intake passage of the engine to form a passage allowing an evaporated fuel gas generated in the fuel tank to be introduced into the intake passage;

a purge control valve (49), which is disposed in the purge passage section, and is configured in such a manner that its opening degree is changed in response to an instruction signal; and purge control means (refer to the routine shown in FIG. 9) for providing to the purge control valve (49), the instruction signal to change the opening degree of the purge control valve (49) according to an operating state of the engine; and wherein, the second feedback amount updating means is configured so as to update, as an evaporated fuel gas concentration learning value (the evaporated fuel gas concentration learning value FGPG), a value relating to a concentration of the evaporated fuel gas, based on at least the output value Vabyfs of the upstream air-fuel ratio sensor when the purge control valve is opened at a predetermined opening degree other than zero (refer to the routine shown in FIG. 10), and so as to update the second feedback amount (at least a product (FAF·FPG) of the main feedback coefficient FAF and the purge correction coefficient FPG) further based on the evaporated fuel gas concentration learning value (FGPG); and the prohibiting expedited learning means is configured so as to infer that the disturbance which transiently varies the air-fuel ratio occurs, when the number of updating times (CFGPG) of the evaporated fuel gas concentration learning value (FGPG) after a start of the engine is smaller than a predetermined threshold (CFGPGth) of the number of updating times (refer to step 1035-step 1050, shown in FIG. 10).

According to the first control apparatus, when it is likely that the disturbance which transiently varies the air-fuel ratio of the engine occurs, that is, when the evaporated fuel gas concentration learning value has not been updated sufficiently (CFGPG<CFGPGth), and thus, when an effect of the evaporated fuel gas on the air-fuel ratio of the engine is not compensated sufficiently by the second feedback amount, the expedited learning control is prohibited (including, terminated). Accordingly, a possibility that the sub FB learning value Vafsfbg deviates greatly from the appropriate value can be lowered. Consequently, a period in which the emission becomes worse can be shortened.

Second Embodiment

An air-fuel ratio control apparatus of a multi-cylinder internal combustion engine according to a second embodiment of the present invention (hereinafter, referred to as a "second control apparatus") will next be described. The second control apparatus is different from the first control apparatus only in that the condition(s) for setting the air-fuel ratio disturbance occurrence flag XGIRN to "1" or "0" is different from that of the first control apparatus. Accordingly, hereinafter, the difference will mainly be described.

Figure 14:
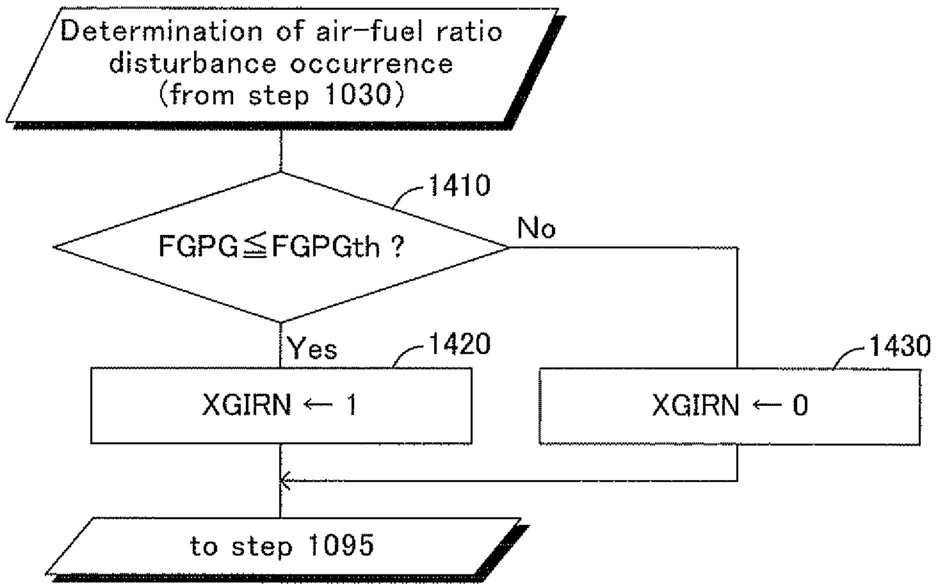
FIG. 14 is a flowchart showing a routine executed by a CPU of an air-fuel ratio control apparatus, according to a second embodiment of the present invention.

The CPU 81 of the second control apparatus executes a routine in which steps from step 1035 to step 1050 shown in FIG. 10 are replaced with steps from step 1410 to step 1430 shown in FIG. 14. That is, the CPU 81 proceeds to step 1410 shown in FIG. 14 after it updates the evaporated fuel gas concentration learning value FGPG at step 1030 shown in FIG. 10. At step 1410, the CPU 81 determines whether or not the evaporated fuel gas concentration learning value FGPG is equal to or smaller than a concentration learning value threshold FGPGth. As described above, the evaporated fuel gas concentration learning value FGPG becomes smaller as the concentration of the evaporated fuel gas is higher. Therefore, the CPU 81 substantially determines whether or not the "concentration of the evaporated fuel gas is equal to or higher than a predetermined concentration threshold" at step 1410.

When the evaporated fuel gas concentration learning value FGPG is equal to or smaller than the concentration learning value threshold FGPGth (i.e., the concentration of the evaporated fuel gas is equal to or higher than the predetermined concentration threshold), the CPU 81 makes a "Yes" determination at step 1410 to proceed to step 1420 at which the CPU 81 sets the value of the air-fuel ratio disturbance occurrence flag XGIRN to (at) "1". That is, in this case, the CPU 81 infers that "the disturbance which varies/changes the air-fuel ratio occurs" due to the evaporated fuel gas purge. Thereafter, the CPU 81 proceeds to step 1095.

In contrast, when the CPU 81 proceeds to step 1410, and the evaporated fuel gas concentration learning value FGPG is larger than the concentration learning value threshold FGPGth (i.e., the concentration of the evaporated fuel gas is lower than the predetermined concentration threshold), the CPU 81 makes a "No" determination at step 1410 to proceed to step 1430 at which the CPU 81 sets the value of the air-fuel ratio disturbance occurrence flag XGIRN to (at) "0". That is, in this case, the CPU 81 infers that "the disturbance which varies/changes the air-fuel ratio does not occur" due to the evaporated fuel gas purge. Thereafter, the CPU 81 proceeds to step 1095.

As described above, the second control apparatus comprises, prohibiting expedited learning means (the routine shown in FIG. 14) which is configured so as to obtain a value according to the concentration of the evaporated fuel gas (the evaporated fuel gas concentration learning value FGPG), and so as to infer that the disturbance which transiently varies the air-fuel ratio occurs when it is inferred based on the obtained value that the concentration of the evaporated fuel gas is higher than a predetermined concentration threshold (refer to the "Yes" determination at step 1410 shown in FIG. 14).

It should be noted that the second control apparatus may be configured in such a manner that it comprises an "evaporated fuel gas concentration sensor" disposed in the purge passage pipe 48 (i.e., the purge passage section) and at a position downstream of the purge control valve 49 (in a side of the surge tank 41*b*), and it sets the value of the air-fuel ratio disturbance occurrence flag XGIRN to (at) "1" when an evaporated fuel gas concentration detected by the evaporated fuel gas concentration sensor (detected gas concentration) is equal to or higher than a predetermined concentration threshold, and it sets the value of the air-fuel ratio disturbance occurrence flag XGIRN to (at) "0" when the detected gas concentration is lower than the predetermined concentration threshold.

When the concentration of the evaporated fuel gas is equal to or higher than the predetermined concentration threshold, the air-fuel ratio of the engine may vary transiently. Accordingly, the expedited learning control is prohibited appropriately, by inferring that the "disturbance which varies/changes the air-fuel ratio of the engine transiently due to the evaporated fuel gas purge" occurs when it is inferred that the concentration of the evaporated fuel gas is equal to or higher than the predetermined concentration threshold, as the second control apparatus.

Third Embodiment

An air-fuel ratio control apparatus of a multi-cylinder internal combustion engine according to a third embodiment of the present invention (hereinafter, referred to as a "third control apparatus") will next be described. The third control apparatus is different from the first control apparatus only in that the condition(s) for setting the air-fuel ratio disturbance occurrence flag XGIRN to "1" or "0" is different from that of the first control apparatus. Accordingly, hereinafter, the difference will mainly be described.

Figure 15:
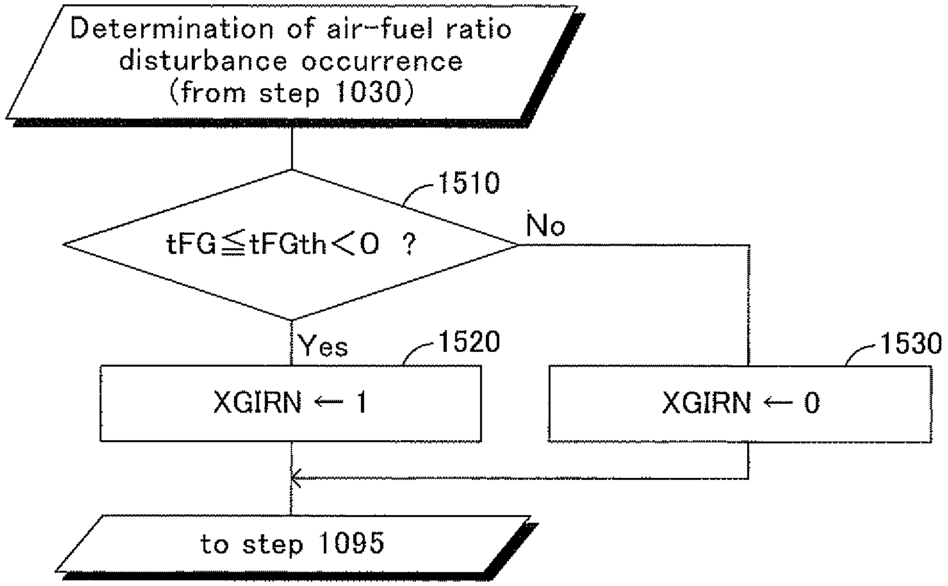
FIG. 15 is a flowchart showing a routine executed by a CPU of an air-fuel ratio control apparatus according to a third embodiment of the present invention.

The CPU 81 of the third control apparatus executes a routine in which steps from step 1035 to step 1050 shown in FIG. 10 are replaced with steps from step 1510 to step 1530 shown in FIG. 15. That is, the CPU 81 proceeds to step 1510 shown in FIG. 15 after it updates the evaporated fuel gas concentration learning value FGPG at step 1030 shown in FIG. 10. At step 1510, the CPU 81 determines whether or not the "updating amount tFG obtained at step 1020 shown in FIG. 10" is equal to or smaller than a concentration leaning updating threshold tFGth. It should be noted that the concentration leaning updating threshold tFGth is a predetermined negative value.

The routine shown in FIG. 10 is executed every time the predetermined time elapses, and thus, the updating amount tFG of the evaporated fuel gas concentration learning value FGPG is substantially equal to a "temporal change amount of the evaporated fuel gas concentration learning value FGPG". Further, when the concentration of the evaporated fuel gas is increasing rapidly, the main feedback coefficient FAF becomes smaller rapidly, and accordingly, the correction coefficient average FAFAV decreases rapidly. Consequently, as understood from the formula (22) described above, when the concentration of the evaporated fuel gas is increasing rapidly, the updating amount tFG becomes smaller rapidly. Accordingly, at step 1510, the CPU 81 substantially determines whether or not it is inferred that the change (increasing speed) of the concentration of the evaporated fuel gas is equal to or larger than a predetermined concentration change threshold.

When the updating amount tFG is equal to or smaller than the concentration leaning updating threshold tFGth (i.e., the change (increasing speed) of the concentration of the evaporated fuel gas is equal to or smaller than the predetermined concentration change threshold), the CPU 81 makes a "Yes" determination at step 1510 to proceed to step 1520 at which the CPU 81 sets the air-fuel ratio disturbance occurrence flag XGIRN to (at) "1". That is, in this case, the CPU 81 infers that the "disturbance which varies the air-fuel ratio" due to the evaporated fuel gas occurs. Thereafter, the CPU 81 proceeds to step 1095.

In contrast, when the CPU 81 proceeds to step 1510, and the updating amount tFG is larger than the concentration leaning updating threshold tFGth (i.e., the change (increasing speed) of the concentration of the evaporated fuel gas is smaller than the predetermined concentration change threshold), the CPU 81 makes a "No" determination at step 1510 to proceed to step 1530 at which the CPU 81 sets the air-fuel ratio disturbance occurrence flag XGIRN to (at) "0". That is, in this case, the CPU 81 infers that the "disturbance which varies the air-fuel ratio" due to the evaporated fuel gas does not occur. Thereafter, the CPU 81 proceeds to step 1095.

It should be noted that the third control apparatus may be configured in such a manner that:

an "evaporated fuel gas concentration sensor" is disposed in the purge passage pipe 48 (i.e., the purge passage) at a position downstream of the purge control valve 49 (in a side of the surge tank 41);

the third control apparatus obtains a "change amount in the concentration of the evaporated fuel gas per unit time (i.e., change rate of the evaporated fuel gas concentration)" based on a concentration (detected gas concentration) of the evaporated fuel gas detected by the evaporated fuel gas concentration sensor;

the third control apparatus sets the air-fuel ratio disturbance occurrence flag XGIRN to (at) "1" when the obtained change amount in the concentration of the evaporated fuel gas is equal to or larger than a predetermined concentration change threshold; and the third control apparatus sets the air-fuel ratio disturbance occurrence flag XGIRN to (at) "0" when the obtained change amount in the concentration of the evaporated fuel gas is smaller than the predetermined concentration change threshold.

Further, third control apparatus may be configured in such a manner that:

it obtains a change amount in the evaporated fuel gas concentration learning value FGPG per unit time (changing speed of the evaporated fuel gas concentration learning value FGPG)

it obtains a changing speed (rate) of the concentration of the evaporated fuel gas based on the obtained change amount in the evaporated fuel gas concentration learning value FGPG per unit time;

it sets the air-fuel ratio disturbance occurrence flag XGIRN to (at) "1" when the obtained changing speed of the concentration of the evaporated fuel gas is equal to or larger than the predetermined concentration change threshold; and it sets the air-fuel ratio disturbance occurrence flag XGIRN to (at) "0" when the obtained changing speed of the concentration of the evaporated fuel gas is smaller than the predetermined concentration change threshold.

As described above, the third control apparatus comprises prohibiting expedited learning means (refer to the routine shown in FIG. 15) which is configured so as to obtain a value (evaporated fuel gas concentration learning value FGPG) according to the concentration of the evaporated fuel gas, and so as to infer that the disturbance which transiently varies the air-fuel ratio occurs when it is inferred based on the obtained value that a changing speed of the concentration of the evaporated fuel gas is higher than a predetermined threshold of concentration changing speed (refer to the "Yes" determination at step 1510 shown in FIG. 15).

When the changing speed of the concentration of the evaporated fuel gas is higher than the predetermined threshold of concentration changing speed, the air-fuel ratio of the engine may vary transiently. Accordingly, the expedited learning control is appropriately prohibited by inferring that the "disturbance which varies the air-fuel ratio transiently due to the evaporated fuel gas" occurs when it is inferred that the changing speed of the concentration of the evaporated fuel gas is higher than the predetermined threshold of concentration changing speed, as the third control apparatus.

Fourth Embodiment

An air-fuel ratio control apparatus of a multi-cylinder internal combustion engine according to a fourth embodiment of the present invention (hereinafter, referred to as a "fourth control apparatus") will next be described. The fourth control apparatus is different from the first control apparatus only in that the fourth control apparatus controls the valve overlap period, and adopts condition(s) different from the condition(s) that the first control apparatus adopts as the condition(s) for setting the value of air-fuel ratio disturbance occurrence flag XGIRN to "1" or "0". Accordingly, hereinafter, the differences will mainly be described.

Figure 16:
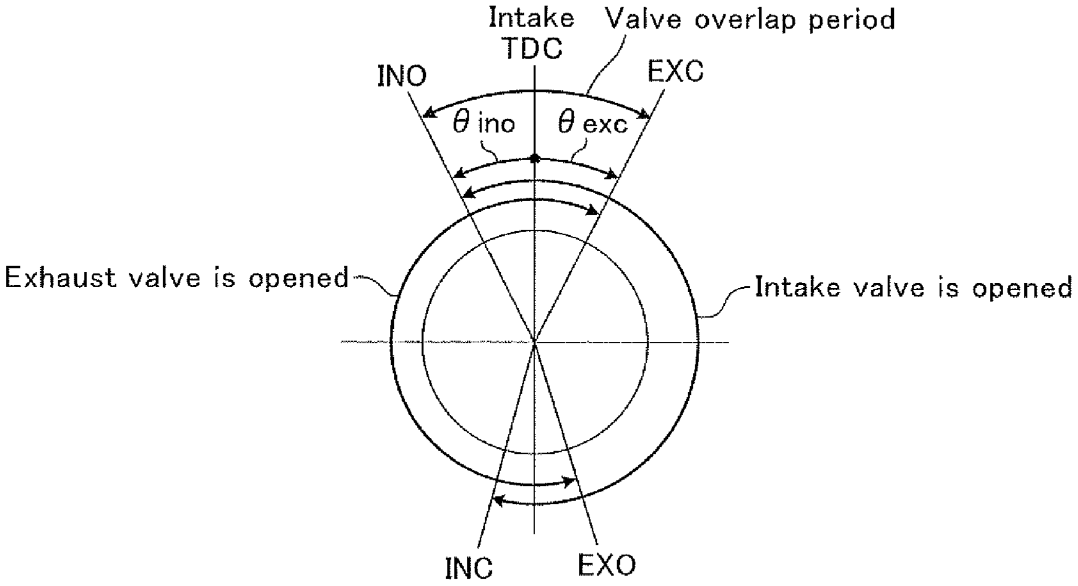
FIG. 16 is a figure for describing a valve overlap period.

As shown in FIG. 16, when focusing on a certain cylinder, the valve overlap period is a period in which both "the intake valve 32 and the exhaust valve 35" of the certain cylinder are opened. A start timing of the valve overlap period is an opening timing INO of the intake valve 32, and an end timing of the valve overlap period is a closing timing EXC of the exhaust valve 35.

The opening timing INO of the intake valve 32 is represented/expressed an advance angle $\theta ino$ ($\theta ino>0$) from an intake top dead center. A unit of the advance angle $\theta ino$ is crank angle (°). In other words, the intake valve 32 opens at the angle $\theta ino$ before the intake top dead center (BTDC $\theta ino$). The advance angle $\theta ino$ is referred to as an "advance amount of the intake valve opening timing".

The closing timing EXC of the exhaust valve 35 is represented/expressed a retard angle $\theta exc$ ($\theta exc>0$) from the intake top dead center. A unit of the retard angle $\theta exc$ is crank angle (°). In other words, the exhaust valve 35 closes at the angle $\theta exc$ after the intake top dead center (ATDC $\theta exc$). The retard angle $\theta exc$ is referred to as a "retard amount of the exhaust valve closing timing".

Accordingly, a valve overlap amount (unit is crank angle (°)) VOL representing a duration (length) of the valve overlap period is equal to a sum of the advance angle θino (advance amount of the intake valve opening timing θino) representing the opening timing INO of the intake valve and the retard angle θ exc (retard amount of the exhaust valve closing timing θ exc) representing the closing timing EXC of the exhaust valve (VOL=θ ino+θ exc).

Generally, an amount of a burnt gas (combustion gas, internal EGR gas) discharged into the intake port 31 during the valve overlap period increases, as the valve overlap amount VOL becomes larger, and therefore, an amount of the burnt gas which flows into the combustion chamber 25 (internal EGR amount) while the intake valve opens after the valve overlap period increases.

Accordingly, when the valve overlap amount VOL changes greatly (change speed of the valve overlap amount VOL is great), the internal EGR amount changes greatly. This great change in (of) the internal EGR amount causes the air-fuel ratios of the mixtures supplied to the cylinders to become imbalanced temporarily. In such a case, the sub feedback amount Vafsfb varies temporarily, and therefore, it is not preferable that the expedited learning control is performed. In view of the above, the fourth control apparatus infers that the "disturbance which varies the air-fuel ratio"occurs when the valve overlap amount VOL changes greatly, and prohibits (to perform) the expedited learning control in such a case.

Figure 17:
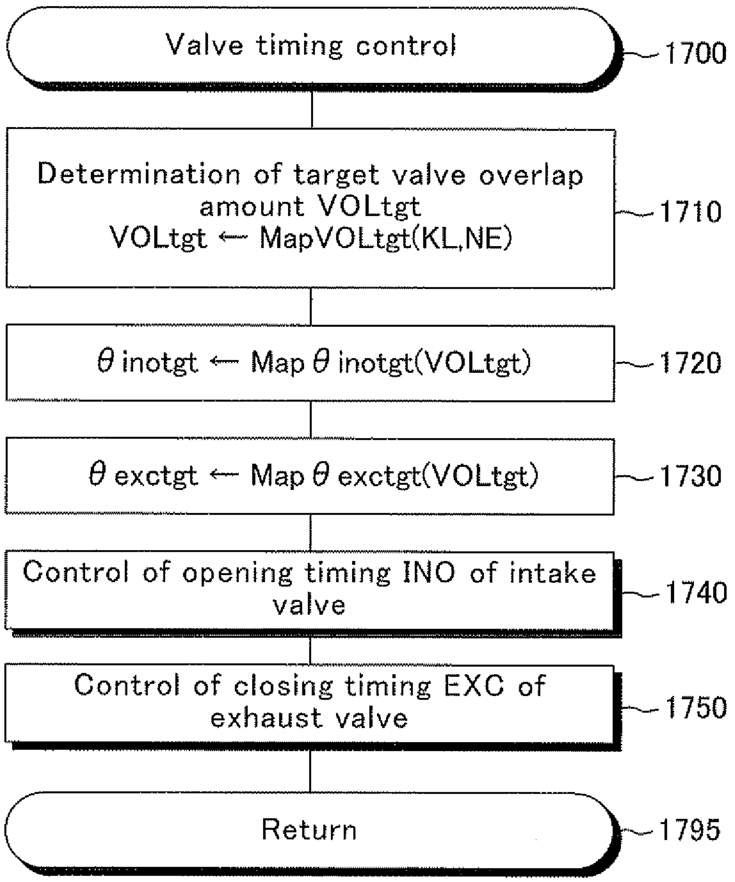
FIG. 17 is a flowchart showing a routine executed by a CPU of an air-fuel ratio control apparatus according to a fourth embodiment of the present invention.

More specifically, the CPU 81 of the fourth control apparatus executes the routines that the CPU 81 of the first control apparatus executes, and further executes a "valve timing control routine" shown by a flowchart in FIG. 17 every time a predetermined time period elapses. It should be noted that steps from step 1035 to step 1050 shown in FIG. 10 may be omitted.

Accordingly, at an appropriate timing, the CPU 81 starts a process from step 1700 shown in FIG. 17, and performs processes from step 1710 to step 1750 in this order, and thereafter, proceeds to step 1795 to end the present routine tentatively.

Step 1710: The CPU 81 determines a target value VOLtgt of the valve overlap amount VOL (target valve overlap amount VOLtgt), by applying the load KL and the engine rotational speed NE to a table MapVOLtgt. For example, according to the table MapVOLtgt, the target valve overlap amount VOLtgt is determined so as to be largest in a middle load region and a middle rotational speed region. Further, according to the MapVOLtgt, the target valve overlap amount VOLtgt is determined so as to become smaller as the load becomes higher or lower, and as the engine rotational speed becomes higher or lower.

Step 1720: The CPU 81 determines a target value (target intake valve advance angle) θ inotgt of the advance angle θ ino of the intake valve representing the opening timing INO of the intake valve, by applying the target valve overlap amount VOLtgt determined at step 1710 to a table Map θ inotgt.

Step 1730: The CPU 81 determines a target value (target exhaust valve retard angle) θ exctgt of the retard angle θ exc of the exhaust valve representing the closing timing EXC of the exhaust valve, by applying the target valve overlap amount VOLtgt determined at step 1710 to a table Map θ exctgt.

It should be noted that the table Map θ inotgt and the table Map θ exctgt are determined in advance in such a manner that a sum of the target intake valve advance angle θ inotgt and the target exhaust valve retard angle θ exctgt, obtained when the target valve overlap amount VOLtgt is applied to these tables, coincides with the target valve overlap amount VOLtgt.

Step 1740: The CPU 81 sends an instruction to the actuator **33*a* of the variable intake timing control unit 33 in such a manner that the intake valve 32** of each of the cylinders opens at the target intake valve advance angle θ inotgt (i.e. BTDC θ inotgt).

Step 1750: The CPU 81 sends an instruction to the actuator **36*a* of the variable exhaust timing control unit 36 in such a manner that the exhaust valve 35** of each of the cylinders closes at the target exhaust valve retard angle θ exctgt (i.e. ATDC θ exctgt).

In this way, the valve overlap period is controlled.

Figure 18:
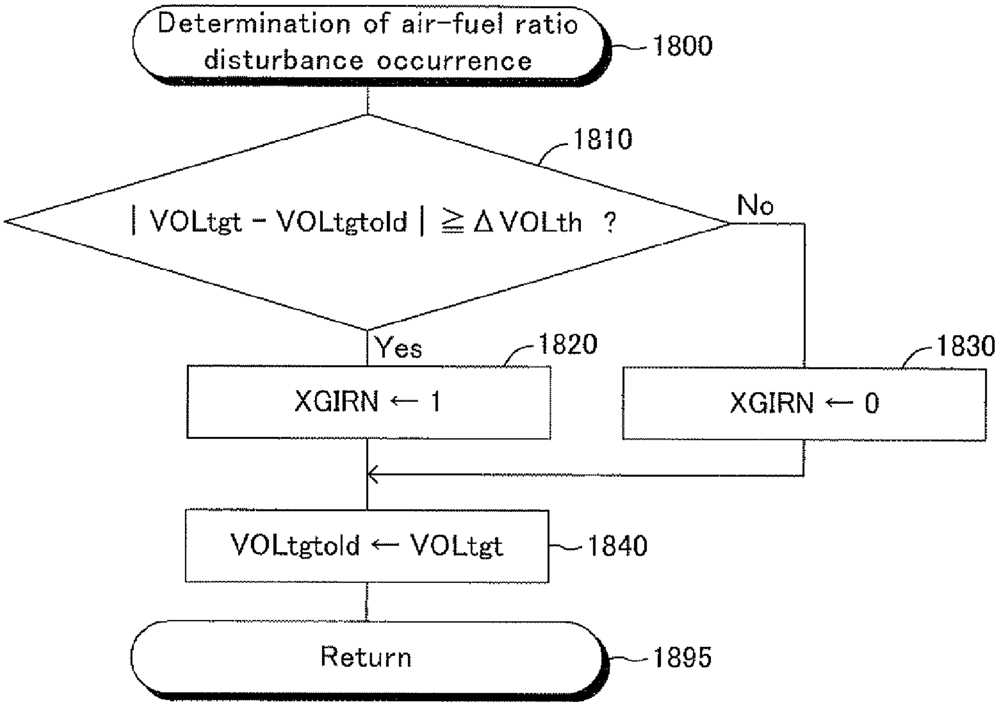
FIG. 18 is a flowchart showing a routine executed by the CPU of the air-fuel ratio control apparatus according to the fourth embodiment of the present invention.

The CPU 81 of the fourth control apparatus executes an "air-fuel ratio disturbance occurrence determination routine" shown by a flowchart in FIG. 18 every time a predetermined time period elapses. Accordingly, at an appropriate predetermined timing, the CPU 81 starts the process from step 1800 shown in FIG. 18 to proceed to step 1810 at which the CPU 81 determines whether or not an absolute value |VOLtgt−VOLtgtold| of a difference between the "target valve overlap amount VOLtgt at the present time" and a "target valve overlap amount VOLtgtold the predetermined time before (ago), which was stored when the present routine was executed at a previous timing (refer to step 1840 described later)" is equal to or larger than a valve overlap amount changing speed threshold Δ VOLth. The valve overlap amount changing speed threshold Δ VOLth is a predetermined positive value. The absolute value |VOLtgt−VOLtgtold| of the difference substantially represents a magnitude of the change speed of the valve overlap amount VOL, and thus, the CPU 81 substantially determines, at step 1810, whether or not "the magnitude of the change speed of the valve overlap amount VOL is equal to or higher than the valve overlap amount changing speed threshold Δ VOLth".

When the absolute value |VOLtgt−VOLtgtold| of the difference is equal to or higher than the valve overlap amount changing speed threshold Δ VOLth, the CPU 81 makes a "Yes" determination at step 1810 to proceed to step 1820. That is, since the internal EGR amount varies excessively greatly (the change speed of the internal EGR amount is excessively high), the CPU 81 infers that the disturbance which varies the air-fuel ratio occurs. At step 1820, the CPU 81 sets the air-fuel ratio disturbance occurrence flag XGIRN to (at) "1". Thereafter, the CPU 81 proceeds to step 1840.

In contrast, when the absolute value |VOLtgt−VOLtgtold| of the difference is smaller than the valve overlap amount changing speed threshold Δ VOLth, the CPU 81 makes a "No" determination at step 1810 to proceed to step 1830. That is, since the internal EGR amount varies in a small amount, the CPU 81 infers that the disturbance which varies the air-fuel ratio does not occur. At step 1830, the CPU 81 sets the air-fuel ratio disturbance occurrence flag XGIRN to (at) "0". Thereafter, the CPU 81 proceeds to step 1840.

The CPU 81 stores the "target valve overlap amount VOLtgt at the present time" as the "target valve overlap amount VOLtgt the predetermined time before (ago)" at step 1840. Thereafter, the CPU 81 proceeds to step 1895 to end the present routine tentatively.

In this way, when the absolute value |VOLtgt−VOLtgtold| of the difference is equal to or higher than the valve overlap amount changing speed threshold Δ VOLth, the air-fuel ratio disturbance occurrence flag XGIRN is set to (at) "1", and therefore, the CPU 81 makes a "No" determination at step 1330 shown in FIG. 13 to proceed to step 1320. Accordingly, the expedited learning control is prohibited.

It should be noted that the CPU 81 of the fourth control apparatus may be configured in such a manner that the CPU 81 determines, at step 1810 shown in FIG. 18, whether or not a value (VOLtgt−VOLtgtold) obtained by subtracting the "target valve overlap amount VOLtgtold the predetermined time before (ago)" from the "target valve overlap amount VOLtgt at the present time" is equal to or larger than the valve overlap amount changing speed threshold Δ VOLth. According to this configuration, the expedited learning control for the leaning value Vafsfbg is prohibited, when an increasing speed of the target valve overlap amount VOLtgt (and, accordingly, an increasing speed of the substantial valve overlap amount VOL) is equal to or higher than the valve overlap amount changing speed threshold Δ VOLth.

Similarly, the CPU 81 of the fourth control apparatus may be configured in such a manner that the CPU 81 determines, at step 1810 shown in FIG. 18, whether or not a value (VOLtgtold−VOLtgt) obtained by subtracting the "target valve overlap amount VOLtgt at the present time" from the "target valve overlap amount VOLtgtold the predetermined time before (ago)" is equal to or larger than the valve overlap amount changing speed threshold Δ VOLth. According to this configuration, the expedited learning control for the leaning value Vafsfbg is prohibited, when a decreasing speed of the target valve overlap amount VOLtgt (and, accordingly, a decreasing speed of the substantial valve overlap amount VOL) is equal to or higher than the valve overlap amount changing speed threshold Δ VOLth.

Further, the CPU 81 of the fourth control apparatus may be configured in such a manner that the CPU 81, at step 1810 shown in FIG. 18, adopts an "actual valve overlap amount VOLact at the present time" in place of the "target valve overlap amount VOLtgt at the present time", and adopts an "actual valve overlap amount VOLact the predetermined time before (ago)" in place of the "target valve overlap amount VOLtgtold the predetermined time before (ago)". It should be noted that the actual valve overlap amount VOLact can be obtained based on an actual intake valve advance angle θ inoact and an actual exhaust valve retard angle θ excact. The actual advance angle θ inoact can be obtained based on the signals from the crank position sensor 64 and the intake cam position sensor 65. The actual retard angle θ excact can be obtained based on the signals from the crank position sensor 64 and the exhaust cam position sensor 66.

As described above, the fourth control apparatus comprises:

internal EGR amount control means (refer to the routine shown in FIG. 17) for controlling an amount (internal EGR amount) of cylinder residual gas in response to an operating state of the engine, the cylinder residual gas being a "burnt gas in each of the combustion chambers of the at least two or more of the cylinders", and existing in each of the combustion chambers of the at least two or more of the cylinders" at a start timing of a compression stroke of each of the cylinders"; and prohibiting expedited learning means (refer to the routine shown in FIG. 18) which is configured so as to infer that the disturbance which transiently varies the air-fuel ratio occurs when it is inferred that a changing speed of the internal EGR amount is equal to or higher than a predetermined internal EGR amount changing speed threshold (refer to the "Yes" determination at step 1810 shown in FIG. 18), i.e., when a changing speed of a valve overlap amount (the target value VOLtgt of the valve overlap amount, or the actual valve overlap amount VOLact) is equal to or higher than the changing speed threshold.

Further, the fourth control apparatus comprises:

valve overlap period changing means (refer to the routine shown in FIG. 17) for changing, based on an operating state of the engine 10, a valve overlap period; and prohibiting expedited learning means (refer to the routine shown in FIG. 18) which is configured so as to infer that the disturbance which transiently varies the air-fuel ratio occurs when it is inferred that a "changing speed of a duration/length of a valve overlap period (i.e. the valve overlap amount)" is equal to or higher than a "predetermined valve overlap amount changing speed threshold" (refer to the "Yes" determination at step 1810 shown in FIG. 18).

Accordingly, the fourth control apparatus can prohibit the expedited learning control appropriately when it is inferred that the "disturbance which transiently varies the air-fuel ratio due to the internal EGR" caused by a rapid change of the valve overlap amount VOL occurs.

Fifth Embodiment

An air-fuel ratio control apparatus of a multi-cylinder internal combustion engine according to a fifth embodiment of the present invention (hereinafter, referred to as a "fifth control apparatus") will next be described. The fifth control apparatus is different from the fourth control apparatus only in that the fifth control apparatus adopts condition(s) different from the condition(s) that the fourth control apparatus adopts as the condition(s) for setting the value of air-fuel ratio disturbance occurrence flag XGIRN to "1" or "0". Accordingly, hereinafter, the difference will mainly be described.

As described before, the variable intake timing control unit 33 includes the mechanical configuration to change the opening timing INO of the intake valve by supply and discharge of the operating oil. Therefore, the "actual intake valve advance angle θ inoact" adjusted by the variable intake timing control unit 33 may overshoot with respect to the target intake valve advance angle θ inotgt when the target intake valve advance angle θ inotgt varies.

Similarly, the variable exhaust timing control unit 36 includes the mechanical configuration to change the closing timing EXC of the exhaust valve by supply and discharge of the operating oil. Therefore, the "actual exhaust valve retard angle θ excact" adjusted by the variable exhaust timing control unit 36 may overshoot with respect to the target exhaust valve retard angle θ exctgt when the target exhaust valve retard angle θ exctgt varies.

In such a period in which the overshoot of the "actual intake valve advance angle θ inoact and/or the actual exhaust valve retard angle θexcact" occurs, an actual valve overlap amount VOLact overshoots with respect to the target valve overlap amount VOLtgt. Thus, an amount of the internal EGR may become excessively larger than an expected amount of the internal EGR, an air-fuel ratio imbalance among cylinders may occur temporarily. In such a case, it is not preferable that the expedited learning control of the learning value Vafsfbg is performed. Accordingly, when a difference (VOLact−VOLtgt) between the "actual valve overlap amount VOLact and the target valve overlap amount VOLtgt" becomes larger than a predetermined value, the fifth control apparatus infers that "the disturbance which varies the air-fuel ratio occurs", and prohibits (to perform) the expedited learning control in such a case.

More specifically, the CPU 81 of the fifth control apparatus executes the routines that the fourth control apparatus executes, except the routine shown in FIG. 18. Further, the CPU 81 of the fifth control apparatus executes an "air-fuel ratio disturbance occurrence determination routine" shown by a flowchart in FIG. 19 in place of FIG. 18. Accordingly, at an appropriate predetermined timing, the CPU 81 starts a process from step 1900 shown in FIG. 19 to execute processes from step 1910 to step 1940 in this order, and thereafter, proceeds to step 1950.

Step 1910: The CPU 81 reads (fetches) the actual intake valve advance angle θ inoact which is separately obtained. The actual intake valve advance angle θ inoact can be obtained based on the signals from the crank position sensor 64 and the intake cam position sensor 65.

Step 1920: The CPU 81 reads (fetches) the actual exhaust valve retard angle θ excact which is separately obtained. The actual exhaust valve retard angle θ excact can be obtained based on the signals from the crank position sensor 64 and the exhaust cam position sensor 66.

Step 1930: The CPU 81 calculates a sum of the actual intake valve advance angle θ inoact and the actual exhaust valve retard angle θ excact as the actual valve overlap amount VOLact.

Step 1940: The CPU 81 obtains, as an overshoot amount OSVOL of the valve overlap amount VOL, a value obtained by subtracting the target valve overlap amount VOLtgt from the actual valve overlap amount VOLact. The overshoot amount OSVOL is expressed as a width of the crank angle.

Thereafter, the CPU 81 determines, at step 1950, whether or not the "overshoot amount OSVOL of the valve overlap amount" obtained at step 1940 described above is equal to or larger than an "overshoot threshold (predetermined crank angle width threshold) OSVOLth which is a positive value".

When the overshoot amount OSVOL is equal to or larger than the overshoot threshold OSVOLth, the CPU 81 makes a "Yes" determination at step 1950 to proceed to step 1960. That is, since the internal EGR amount varies excessively greatly, the CPU 81 infers that the disturbance which varies the air-fuel ratio occurs. At step 1960, the CPU 81 sets the air-fuel ratio disturbance occurrence flag XGIRN to (at) "1". Thereafter, the CPU 81 proceeds to step 1995 to end the present routine tentatively.

In contrast, when the overshoot amount OSVOL is smaller than the overshoot threshold OSVOLth, the CPU 81 makes a "No" determination at step 1950 to proceed to step 1970. That is, since the internal EGR amount varies in a small amount, the CPU 81 infers that the disturbance which varies the air-fuel ratio does not occur. At step 1970, the CPU 81 sets the air-fuel ratio disturbance occurrence flag XGIRN to (at) "0". Thereafter, the CPU 81 proceeds to step 1995 to end the present routine tentatively.

It should be noted that the CPU 81 may be configured so as to determine, at step 1950, whether or not an absolute value of the overshoot amount OSVOL is equal to or larger than the overshoot threshold OSVOLth. According to this configuration, not only when the actual overlap amount VOLact becomes larger than the target overlap amount VOLtgt at the present time by a large amount, but also when the actual overlap amount VOLact becomes smaller than the target overlap amount VOLtgt at the present time by a large amount, the air-fuel ratio disturbance occurrence flag XGIRN is set to (at) "1", and thus, the expedited leaning control is prohibited.

Figure 19:
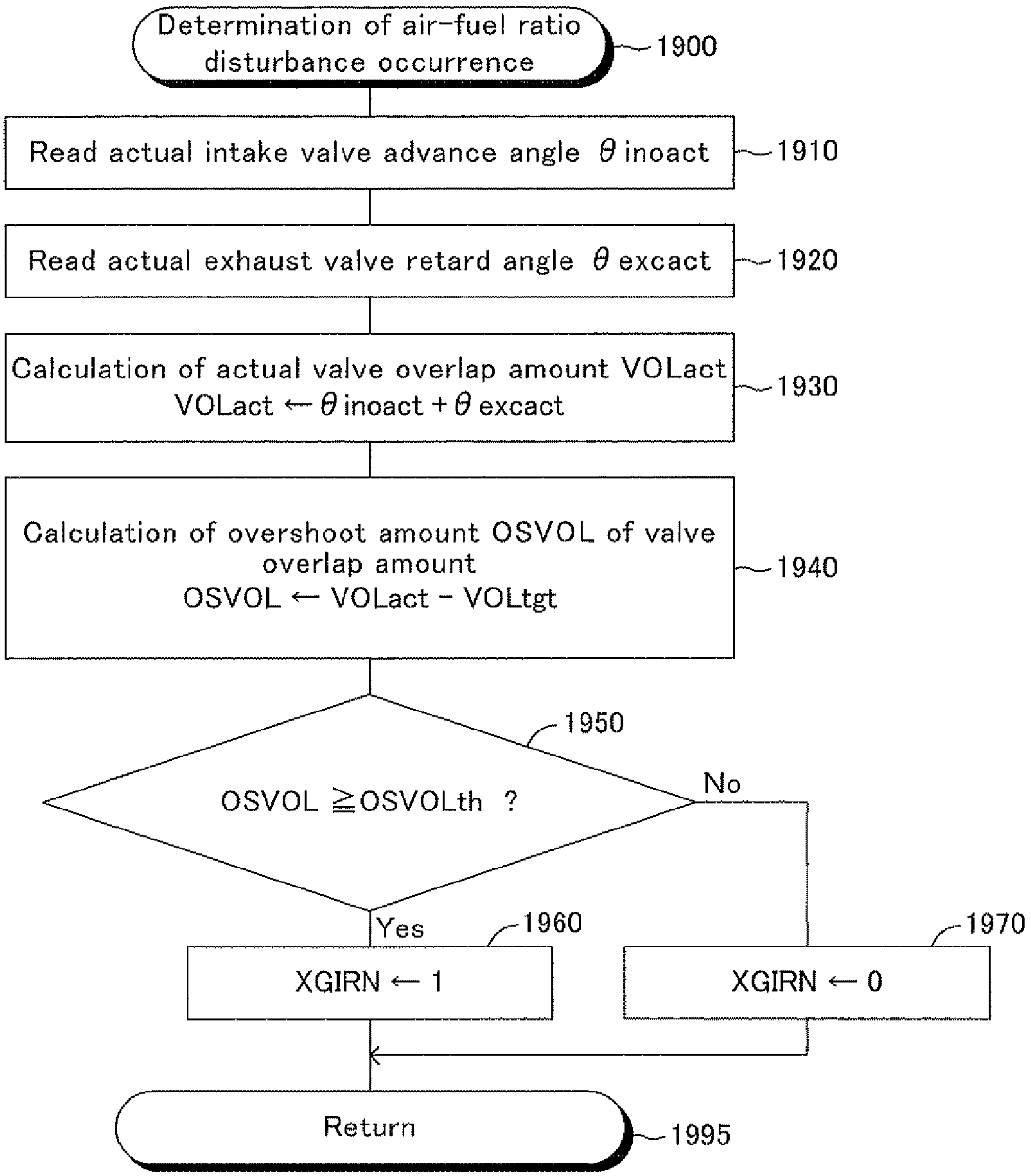
FIG. 19 is a flowchart showing a routine executed by a CPU of an air-fuel ratio control apparatus according to a fifth embodiment of the present invention.

As described above, the fifth control apparatus comprises:

internal EGR amount changing means (the variable intake timing control unit 33 and the variable exhaust timing control unit 36) for changing a control parameter (the valve overlap amount) for varying internal EGR amount in response to an instruction signal;

control parameter target value obtaining means (refer to step 1710 shown in FIG. 17) for obtaining a target value (the target valve overlap amount VOLtgt) of the control parameter for varying the internal EGR amount in response to an operating state of the engine; and internal EGR amount control means (refer to step 1720-step 1750, shown in FIG. 17) for providing to the internal EGR amount changing means the instruction signal to have an actual value of the control parameter coincide with the target value of the control parameter; and prohibiting expedited learning means (refer to the routine shown in FIG. 19) which is configured so as to obtain the actual value (the actual valve overlap amount VOLact) of the control parameter for varying the internal EGR amount, and so as to infer that the disturbance which transiently varies the air-fuel ratio occurs when it is inferred that a difference (OSVOL) between the obtained actual value (VOLact) of the control parameter and the target value (VOLtgt) of the control parameter is equal to or larger than a predetermined control parameter difference threshold (OSVOLth) (refer to the "Yes" determination at step 1950 shown in FIG. 19).

Further, the fifth control apparatus comprises:

valve overlap period changing means (refer to the variable intake timing control unit 33, the variable exhaust timing control unit 36, and the routine shown in FIG. 17) for changing a valve overlap period in such a manner that the valve overlap period coincides with a target overlap period (a period determined by the target intake valve advance angle θ inotgt and the target exhaust valve retard angle θ exctgt) determined based on an operating state of the engine; and prohibiting expedited learning means (refer to the routine shown in FIG. 19) which is configured so as to obtain an actual value (VOLact) of a valve overlap amount which is a length of the valve overlap period, and so as to infer that the disturbance which transiently varies the air-fuel ratio occurs when it is determined that a difference (valve overlap amount difference (OSVOL)) between the obtained actual value (VOLtgt) of the valve overlap amount and a target overlap amount (VOLtgt) which is a length of the target overlap period is equal to or longer than a predetermined valve overlap amount difference threshold (OSVOLth) (refer to the "Yes" determination at step 1950 shown in FIG. 19).

Accordingly, the fifth control apparatus can prohibit the expedited learning control appropriately when the "actual overlap amount is excessively large (or excessively small) with respect to the target valve overlap amount", and thereby, the internal EGR amount becomes excessively large (or excessively small), which may cause the air-fuel ratio of the engine to transiently vary.

Sixth Embodiment

An air-fuel ratio control apparatus of a multi-cylinder internal combustion engine according to a sixth embodiment of the present invention (hereinafter, referred to as a "sixth control apparatus") will next be described. The sixth control apparatus is different from the fourth control apparatus only in that the sixth control apparatus determines "the intake valve advance angle θ ino and the exhaust valve retard angle θ exc" directly based on the load KL ant the engine rotational speed NE, and adopts a condition different from the condition that the fourth control apparatus adopts (as the condition) for setting the value of air-fuel ratio disturbance occurrence flag XGIRN to "1" or "0". Accordingly, hereinafter, the differences will mainly be described.

The fourth control apparatus described above sets the air-fuel ratio disturbance occurrence flag XGIRN to (at) "1", when the magnitude |VOLtgt−VOLtgtold| of the change speed of the valve overlap amount is equal to or larger than the valve overlap amount changing speed threshold Δ VOLth. In contrast, the sixth control apparatus sets the air-fuel ratio disturbance occurrence flag XGIRN to (at) "1", when the opening timing INO of the intake valve varies rapidly. This is because, even when the valve overlap amount VOL is the same (constant), the internal EGR amount varies depending on the intake valve opening timing INO (i.e., the start timing of the valve overlap period).

Figure 20:
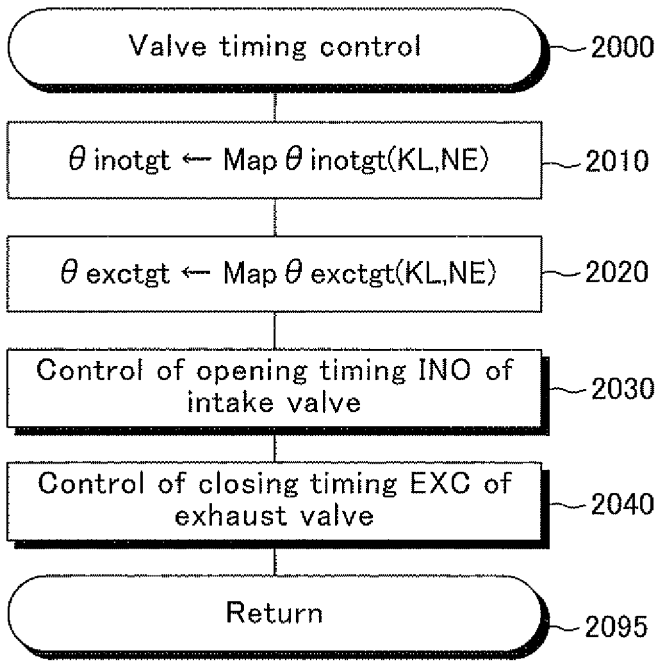
FIG. 20 is a flowchart showing a routine executed by a CPU of an air-fuel ratio control apparatus according to a sixth embodiment of the present invention.

More specifically, the CPU 81 of the sixth control apparatus executes a "valve timing control routine" shown by a flowchart in FIG. 20. Accordingly, at an appropriate predetermined timing, the CPU 81 starts a process from step 2000 shown in FIG. 20 to execute processes from step 2010 to step 2040 in this order, and thereafter, proceeds to step 2095 to end the present routine tentatively.

Step 2010: The CPU 81 determines the target intake valve advance angle θ inotgt by applying the road KL and the engine rotational speed NE to a table Map θ inotgt.

Step 2020: The CPU 81 determines the target exhaust valve retard angle θ exctgt by applying the road KL and the engine rotational speed NE to a table Map θ exctgt.

Step 2030: The CPU 81 sends an instruction to the actuator 33*a* of the variable intake timing control unit 33 in such a manner that the intake valve 32 of each of the cylinders is opened at the target intake valve advance angle θ inotgt (i.e. BTDC θ inotgt).

Step 2040: The CPU 81 sends an instruction to the actuator 36*a* of the variable exhaust timing control unit 36 in such a manner that the exhaust valve 35 of each of the cylinders is closed at the target exhaust valve retard angle θ exctgt (i.e. ATDC θ exctgt).

The table Map θ inotgt used at step 2010 and the table Map θ exctgt used at step 2020 are determined in advance in such a manner that a certain valve overlap period (i.e. the valve overlap amount and the start timing of the valve overlap period) in accordance with the load KL and the engine rotational speed NE is realized. In this way, the valve overlap period is controlled.

Figure 21:
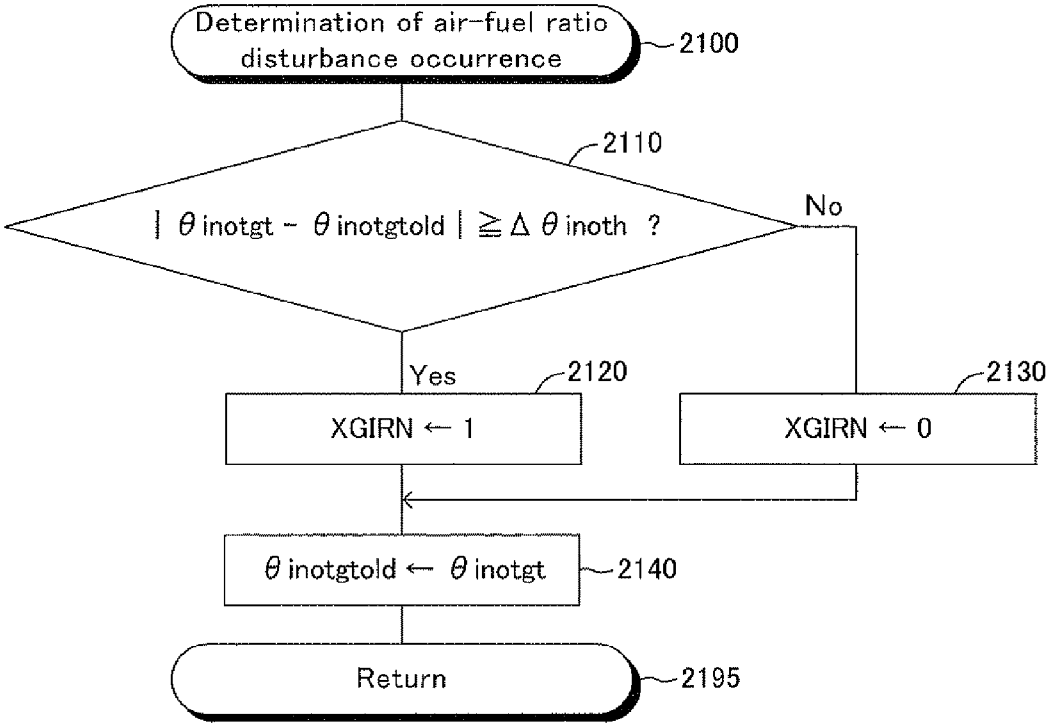
FIG. 21 is a flowchart showing a routine executed by the CPU of the air-fuel ratio control apparatus according to the sixth embodiment of the present invention.

Further, the CPU 81 of the sixth control apparatus executes an "air-fuel ratio disturbance occurrence determination routine" shown by a flowchart in FIG. 21, every time a predetermined time period elapses. Accordingly, at an appropriate predetermined timing, the CPU 81 starts a process from step 2100 shown in FIG. 21 to proceed to step 2110 at which the CPU 81 determines whether or not an absolute value | θ inotgt−θ inotgtold| of a difference between the "target intake valve advance angle θ inotgt at the present time" and the "target intake valve advance angle θ inotgtold the predetermined time before, which was stored when the present routine was executed at a previous timing (refer to step 2140 described later)" is equal to or larger than a predetermined advance angle changing speed threshold Δ θ inoth. The advance angle changing speed threshold Δ θ inoth is a positive predetermined value. The absolute value | θ inotgt−θ inotgtold| of the difference substantially represents a magnitude of the change speed of the intake valve advance angle θ ino (opening timing INO of the intake valve), and therefore, the CPU 81 substantially determines, at step 2110, whether or not "the change speed of the opening timing INO of the intake valve" is equal to or larger than the advance angle changing speed threshold Δ θ inoth.

When the absolute value |θ inotgt−θ inotgtold| of the difference is equal to or larger than the predetermined advance angle changing speed threshold Δ θ inoth, the CPU 81 makes a "Yes" determination at step 2110 to proceed to step 2120. That is, since the internal EGR amount varies excessively greatly, the CPU 81 infers that the disturbance which varies the air-fuel ratio occurs. At step 2120, the CPU 81 sets the air-fuel ratio disturbance occurrence flag XGIRN to (at) "1". Thereafter, the CPU 81 proceeds to step 2140.

In contrast, when the absolute value |θ inotgt−θ inotgtold| of the difference is smaller than the predetermined advance angle changing speed threshold Δ θ inoth, the CPU 81 makes a "No" determination at step 2110 to proceed to step 2130. That is, since the internal EGR amount varies in a small amount, the CPU 81 infers that the disturbance which varies the air-fuel ratio does not occur. At step 2130, the CPU 81 sets the air-fuel ratio disturbance occurrence flag XGIRN to (at) "0". Thereafter, the CPU 81 proceeds to step 2140.

The CPU 81 stores the "target intake valve advance angle θ inotgt at the present time" as the "target intake valve advance angle θ inotgtold the predetermined time before (ago)" at step 2140. Thereafter, the CPU 81 proceeds to step 2195 to end the present routine tentatively.

It should be noted that the CPU 81 of the sixth control apparatus may be configured in such a manner that the CPU 81 determines, at step 2110 shown in FIG. 21, whether or not a value (θ inotgt−θ inotgtold) obtained by subtracting the "target intake valve advance angle θ inotgtold the predetermined time before (ago)" from the "target intake valve advance angle θ inotgt at the present time" is equal to or larger than the predetermined advance angle changing speed threshold Δ θ inoth. Further, the CPU 81 of the sixth control apparatus may be configured so as to determine, at step 2110 shown in FIG. 21, whether or not a value (θinotgtold−θ inotgt) obtained by subtracting the "target intake valve advance angle θ inotgt at the present time" from the "target intake valve advance angle θ inotgtold the predetermined time before (ago)" is equal to or larger than the predetermined advance angle changing speed threshold Δ θ inoth.

In addition, the CPU 81 of the sixth control apparatus may be configured in such a manner that the CPU 81 determines, at step 2110 shown in FIG. 21, whether or not an absolute value |θ inoact−θ inoactold| of a difference between the "actual intake valve advance angle θ inoact at the present time" and the "actual intake valve advance angle θ inoactold the predetermined time before (ago)" is equal to or larger than the predetermined advance angle changing speed threshold Δ θ inoth. Further, the CPU 81 of the sixth control apparatus may be configured so ato to determines, at step 2110 shown in FIG. 21, whether or not a value (θ inoact−θ inoactold) obtained by subtracting the "actual intake valve advance angle θ inoactold the predetermined time before (ago)" from the "actual intake valve advance angle θ inoact at the present time" is equal to or larger than the predetermined advance angle changing speed threshold Δ θ inoth. Further, the CPU 81 of the sixth control apparatus may be configured so ato to determines, at step 2110 shown in FIG. 21, whether or not a value (θ inoact−θ inoactold) obtained by subtracting the "actual intake valve advance angle θ inoact at the present time" from the "actual intake valve advance angle θ inoactold the predetermined time before (ago)" is equal to or larger than the predetermined advance angle changing speed threshold Δ θ inoth.

As described above, the sixth control apparatus comprises:

intake valve opening timing control means (refer to the variable intake timing control unit 33 and the routine shown in FIG. 20) for changing, based on an operating state of the engine, an opening timing INO of an intake valve of each of the at least two or more of the cylinders (in the present example, all of the cylinders); and prohibiting expedited learning means (refer to the routine shown in FIG. 21) which is configured so as to infer that the disturbance which transiently varies the air-fuel ratio occurs when it is inferred that a changing speed (θ inotgt−θ inotgtold) of the opening timing of the intake valve is equal to or higher than a predetermined intake valve opening timing changing speed threshold (Δ θ inoth) (refer to the "Yes" determination at step 2110 shown in FIG. 21).

Generally, an intake valve opening timing INO and an exhaust valve closing timing EXC are determined so as to provide the "valve overlap period". Therefore, the internal EGR amount varies depending on the intake valve opening timing INO (the advance angle θ ino of the intake valve) which is a "start timing of the valve overlap period". Accordingly, when the changing speed of the opening timing of the intake valve is equal to or higher than the predetermined intake valve opening timing changing speed threshold, the air-fuel ratio of the engine may vary transiently. In view of the above, the sixth control apparatus can infer that the "disturbance which varies the air-fuel ratio transiently due to the internal EGR" occurs when it is inferred that the changing speed of the opening timing of the intake valve is equal to or higher than the predetermined intake valve opening timing changing speed threshold, and therefore, can prohibit the expedited learning control appropriately.

Seventh Embodiment

An air-fuel ratio control apparatus of a multi-cylinder internal combustion engine according to a seventh embodiment of the present invention (hereinafter, referred to as a "seventh control apparatus") will next be described. The seventh control apparatus is different from the sixth control apparatus only in that the seventh control apparatus adopts a condition different from the condition that the sixth control apparatus adopts (as the condition) for setting the value of air-fuel ratio disturbance occurrence flag XGIRN to "1" or "0". Accordingly, hereinafter, the differences will mainly be described.

As described before, the variable intake timing control unit 33 includes the mechanical configuration to change the opening timing INO of the intake valve by supply and discharge of the operating oil. Therefore, the "actual intake valve advance angle θ inoact" adjusted by the variable intake timing control unit 33 may overshoot with respect to the target intake valve advance angle θ inotgt when the target intake valve advance angle θ inotgt varies. In such a period in which the overshoot of the "actual intake valve advance angle θ inoact" may occur, an amount of the internal EGR is excessively larger than an expected amount of the internal EGR, and an air-fuel ratio imbalance among cylinders may occur temporarily. In such a case, it is not preferable that the expedited learning control of the learning value Vafsfbg is performed. Accordingly, when a difference (θinoact−θ inotgt) between the "actual intake valve advance angle θ inoact and the target intake valve advance angle θ inotgt" becomes larger than a predetermined value, the seventh control apparatus infers that the "disturbance which varies the air-fuel ratio" occurs, and prohibits (to perform) the expedited learning control.

More specifically, the CPU 81 of the seventh control apparatus executes the routines that the sixth control apparatus executes, except the routine shown in FIG. 21. Further, the CPU 81 of the seventh control apparatus executes an "air-fuel ratio disturbance occurrence determination routine" shown by a flowchart in FIG. 22 in place of FIG. 21.

Figure 22:
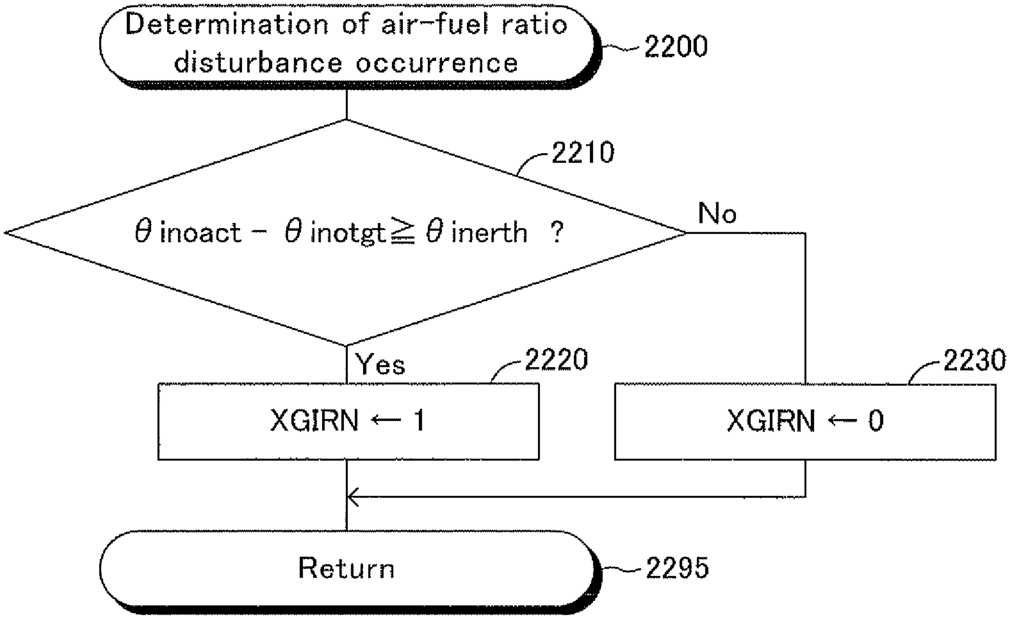
FIG. 22 is a flowchart showing a routine executed by a CPU of an air-fuel ratio control apparatus according to a seventh embodiment of the present invention.

Accordingly, at an appropriate predetermined timing, the CPU 81 starts a process from step 2200 shown in FIG. 22 to proceed to step 2210 at which the CPU 81 determines a difference (θ inoact−θ inotgt) between the "actual intake valve advance angle θ inoact at the present time" and the "target intake valve advance angle θ inotgt" is equal to or larger than a predetermined intake valve opening timing overshoot threshold θ inerth.

When the difference (θ inoact−θ inotgt) is equal to or larger than the predetermined intake valve opening timing overshoot threshold θ inerth, the CPU 81 makes a "Yes" determination at step 2210 to proceed to step 2220. That is, since the internal EGR amount varies excessively greatly, the CPU 81 infers that the disturbance which varies the air-fuel ratio occurs. At step 2220, the CPU 81 sets the air-fuel ratio disturbance occurrence flag XGIRN to (at) "1". Thereafter, the CPU 81 proceeds to step 2295 to end the present routine tentatively.

In contrast, when the difference (θ inoact−θ inotgt) is smaller than the predetermined intake valve opening timing overshoot threshold θ inerth, the CPU 81 makes a "No" determination at step 2210 to proceed to step 2230. That is, since the internal EGR amount varies in a small amount, the CPU 81 infers that the disturbance which varies the air-fuel ratio does not occur. At step 2230, the CPU 81 sets the air-fuel ratio disturbance occurrence flag XGIRN to (at) "0". Thereafter, the CPU 81 proceeds to step 2295 to end the present routine tentatively.

It should be noted that the CPU 81 of the seventh control apparatus may be configured so as to determine, at step 2210 shown in FIG. 22, whether or not an absolute value |θ inoact−θ inotgt| of the difference (θ inoact−θ inotgt) is equal to or larger than the predetermined intake valve opening timing overshoot threshold θ inerth.

As described above, the seventh control apparatus comprises:

intake valve opening timing control means (refer to the variable intake timing control unit 33, step 2010 and step 2030 shown in FIG. 20) for changing an opening timing INO (i.e. the advance angle θ ino of the intake valve) of an intake valve of each of the at least two or more of the cylinders (in the present example, all of the cylinders) in such a manner that the "opening timing NO of the intake valve" coincides with a "target opening timing of the intake valve (i.e., the target intake valve advance angle θ inotgt)" determined based on an operating state of the engine; and prohibiting expedited learning means (refer to the routine shown in FIG. 22) which is configured so as to obtain an actual opening timing of the intake valve (the actual intake valve advance angle θ inoact), and so as to infer that the disturbance which transiently varies the air-fuel ratio occurs when it is inferred that a difference between the "obtained actual opening timing of the intake valve (the actual intake valve advance angle θ inoact)" and the "target opening timing of the intake valve (the target intake valve advance angle θ inotgt)" is equal to or larger than a "predetermined intake valve opening timing difference threshold (θ inerth)" (refer to the "Yes" determination at step 2210 shown in FIG. 22).

Accordingly, the seventh control apparatus can prohibit the expedited learning control appropriately, in a case in which the internal EGR amount becomes excessively large or excessively small when the actual opening timing of the intake valve becomes excessively large (excessively advanced) or excessively small (excessively retarded) with respect to the target opening timing of the intake valve, and thereby, when the air-fuel ratio of the engine may transiently vary.

Eighth Embodiment

An air-fuel ratio control apparatus of a multi-cylinder internal combustion engine according to an eighth embodiment of the present invention (hereinafter, referred to as a "eighth control apparatus") will next be described. The eighth control apparatus is different from the sixth control apparatus only in that the eighth control apparatus adopts a condition different from the condition that the sixth control apparatus adopts (as the condition) for setting the value of air-fuel ratio disturbance occurrence flag XGIRN to "1" or "0". Accordingly, hereinafter, the differences will mainly be described.

The sixth control apparatus described above sets the value of air-fuel ratio disturbance occurrence flag XGIRN to (at) "1", when the intake valve opening timing INO varies rapidly. In contrast, the eighth control apparatus sets the value of air-fuel ratio disturbance occurrence flag XGIRN to (at) "1", when the exhaust valve closing timing EXC varies rapidly. This is because, even when the valve overlap amount VOL and/or the intake valve opening timing INO (i.e., the start timing of the valve overlap period) are the same (constant), the internal EGR amount varies depending on the exhaust valve closing timing EXC (i.e., the end timing of the valve overlap period).

More specifically, the CPU 81 of the eighth control apparatus executes the routines that the sixth control apparatus executes, except the routine shown in FIG. 21. Further, the CPU 81 of the eighth control apparatus executes an "air-fuel ratio disturbance occurrence determination routine" shown by a flowchart in FIG. 23 in place of FIG. 21.

Figure 23:
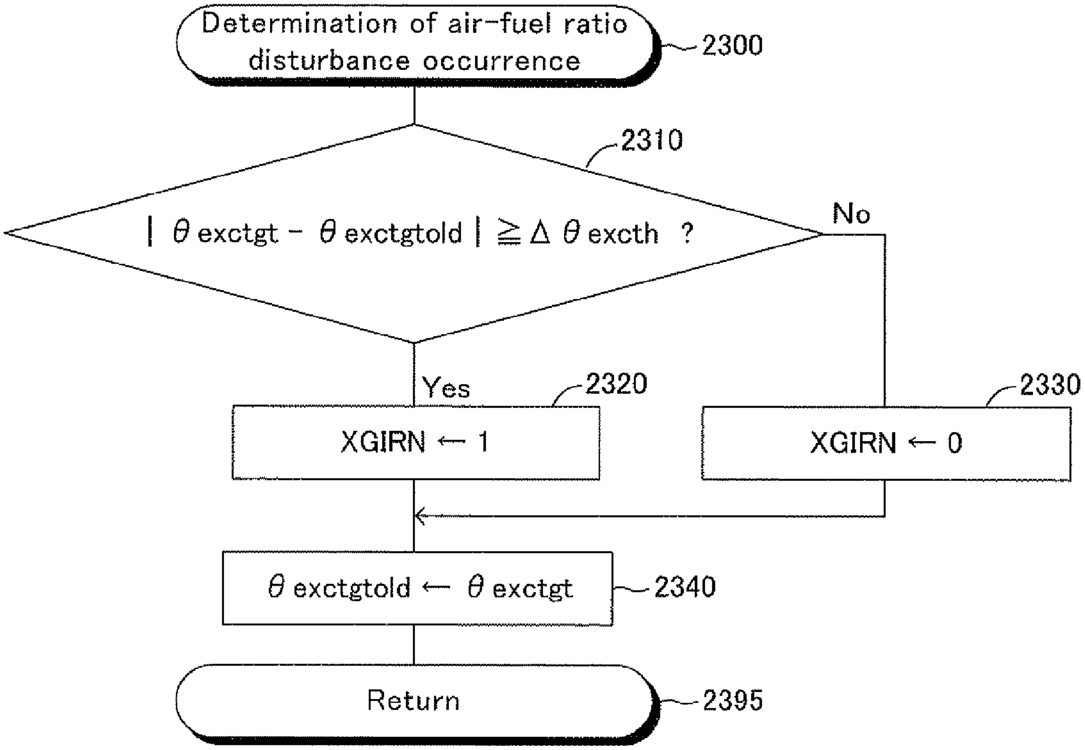
FIG. 23 is a flowchart showing a routine executed by a CPU of an air-fuel ratio control apparatus according to an eighth embodiment of the present invention.

Accordingly, at an appropriate predetermined timing, the CPU 81 starts a process from step 2300 shown in FIG. 23 to proceed to step 2310 at which the CPU 81 determines whether or not an absolute value |θ exctgt−θ exctgtold| of a difference between the "target exhaust valve retard angle θ exctgt at the present time" and the "target exhaust valve retard angle θ exctgtold the predetermined time before (ago), which was stored when the present routine was executed at a previous timing (refer to step 2340 described later)" is equal to or larger than a predetermined retard angle changing speed threshold Δ θ excth.

When the absolute value | θ exctgt−θ exctgtold| of the difference is equal to or larger than a predetermined retard angle changing speed threshold Δ θ excth, the CPU 81 makes a "Yes" determination at step 2310 to proceed to step 2320. That is, since the internal EGR amount varies excessively greatly, the CPU 81 infers that the disturbance which varies the air-fuel ratio occurs. At step 2320, the CPU 81 sets the air-fuel ratio disturbance occurrence flag XGIRN to (at) "1". Thereafter, the CPU 81 proceeds to step 2340.

In contrast, when the absolute value |θ exctgt−θ exctgtold| of the difference is smaller than the predetermined retard angle changing speed threshold Δ θ excth, the CPU 81 makes a "No" determination at step 2310 to proceed to step 2320, the CPU 81 makes a "No" determination at step 2310 to proceed to step 2330. That is, since the internal EGR amount varies in a small amount, the CPU 81 infers that the disturbance which varies the air-fuel ratio does not occur. At step 2330, the CPU 81 sets the air-fuel ratio disturbance occurrence flag XGIRN to (at) "0". Thereafter, the CPU 81 proceeds to step 2340.

The CPU 81 stores the "target exhaust valve retard angle θ exctgt at the present time" as the "target exhaust valve retard angle θ exctgtold the predetermined time before (ago)" at step 2340. Thereafter, the CPU 81 proceeds to step 2395 to end the present routine tentatively.

It should be noted that the CPU 81 of the eighth control apparatus may be configured in such a manner that the CPU 81 determines, at step 2310 shown in FIG. 23, whether or not a value (θ exctgt−θ exctgtold) obtained by subtracting the "target exhaust valve retard angle θ exctgtold the predetermined time before (ago)" from the "target exhaust valve retard angle θ exctgt at the present time" is equal to or larger than the predetermined retard angle changing speed threshold Δ θ excth. Further, the CPU 81 of the eighth control apparatus may be configured so as to determine, at step 2310 shown in FIG. 23, whether or not a value (θexctgtold·θ exctgt) obtained by subtracting the "target exhaust valve retard angle θ exctgt at the present time" from the "target exhaust valve retard angle θ exctgtold the predetermined time before (ago)" is equal to or larger than the predetermined retard angle changing speed threshold Δ θ excth.

As described above, the eighth control apparatus comprises:

exhaust valve closing timing control means (refer to the variable exhaust timing control unit 36 and the routine shown in FIG. 20) for changing, based on an operating state of the engine, a closing timing EXC of an exhaust valve of each of the at least two or more of the cylinders (in the present example, all of the cylinders); and prohibiting expedited learning means (refer to the routine shown in FIG. 23) which is configured so as to infer that the disturbance which transiently varies the air-fuel ratio occurs when it is inferred that a changing speed (θ exctgt−θ exctgtold) of the closing timing of the exhaust valve is equal to or higher than a predetermined exhaust valve closing timing changing speed threshold (Δ θ excth) (refer to the "Yes" determination at step 2310 shown in FIG. 23).

As described above, the intake valve opening timing NO and the exhaust valve closing timing EXC are determined so as to provide the "valve overlap period". Therefore, the internal EGR amount varies depending on the exhaust valve closing timing EXC (the retard angle θ exc of the exhaust valve) which is an "end timing of the valve overlap period". Accordingly, when the changing speed of the closing timing of the exhaust valve is equal to or higher than the predetermined exhaust valve closing timing changing speed threshold, the air-fuel ratio of the engine may vary transiently. In view of the above, the eighth control apparatus can infer that the "disturbance which varies the air-fuel ratio transiently due to the internal EGR" occurs when it is inferred that the changing speed of the closing timing of the exhaust valve is equal to or higher than the predetermined exhaust valve closing timing changing speed threshold, and therefore, can prohibit the expedited learning control appropriately.

Ninth Embodiment

An air-fuel ratio control apparatus of a multi-cylinder internal combustion engine according to a ninth embodiment of the present invention (hereinafter, referred to as a "ninth control apparatus") will next be described. The ninth control apparatus is different from the sixth control apparatus only in that the ninth control apparatus adopts a condition different from the condition that the sixth control apparatus adopts (as the condition) for setting the value of air-fuel ratio disturbance occurrence flag XGIRN to "1" or "0". Accordingly, hereinafter, the differences will mainly be described.

As described before, the variable exhaust timing control unit 36 includes the mechanical configuration to change the closing timing EXC of the exhaust valve by supply and discharge of the operating oil. Therefore, the "actual exhaust valve retard angle θ excact" adjusted by the variable exhaust timing control unit 36 may overshoot with respect to the target exhaust valve retard angle θ exctgt when the target exhaust valve retard angle θ exctgt varies. In such a period in which the overshoot of the "actual exhaust valve retard angle θ excact" occurs, an amount of the internal EGR is excessively larger than an expected amount of the internal EGR, and the amount of the internal EGR varies greatly. Thus, an air-fuel ratio imbalance among cylinders occurs temporarily. In such a case, it is not preferable that the expedited learning control of the learning value Vafsfbg is performed. Accordingly, when a "difference (θ excact−θexctgt) between the actual exhaust valve retard angle θ excact and the target exhaust valve retard angle θ exctgt" becomes larger than a predetermined value, the ninth control apparatus infers that "the disturbance which varies the air-fuel ratio occurs" and prohibits (to perform) the expedited learning control.

More specifically, the CPU 81 of the ninth control apparatus executes the routines that the CPU 81 of the sixth control apparatus executes, except the routine shown in FIG. 21. Further, the CPU 81 of the ninth control apparatus executes an "air-fuel ratio disturbance occurrence determination routine" shown by a flowchart in FIG. 24 in place of FIG. 21.

Figure 24:
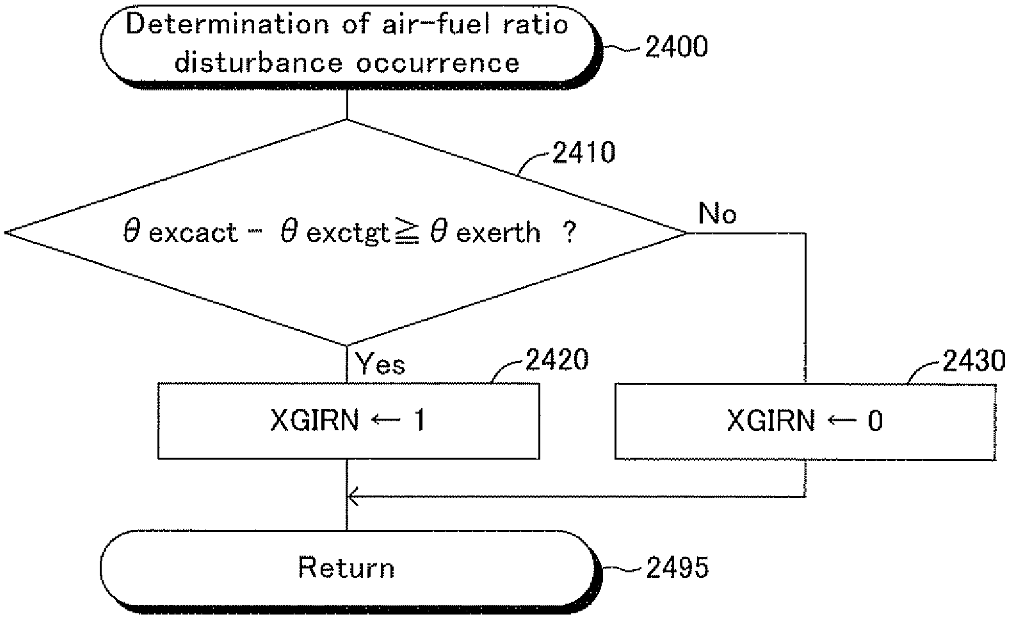
FIG. 24 is a flowchart showing a routine executed by a CPU of an air-fuel ratio control apparatus according to a ninth embodiment of the present invention.

Accordingly, at an appropriate predetermined timing, the CPU 81 starts a process from step 2400 shown in FIG. 24 to proceed to step 2410 at which the CPU 81 determines a difference (θ excact−θ exctgt) between the "actual exhaust valve retard angle θ excact at the present time" and the "target exhaust valve retard angle θ exctgt" is equal to or larger than a predetermined exhaust valve closing timing overshoot threshold θ exerth.

When the difference (θ excact−θ exctgt) is equal to or larger than the predetermined exhaust valve closing timing overshoot threshold θ exerth, the CPU 81 makes a "Yes" determination at step 2410 to proceed to step 2420. That is, since the internal EGR amount varies excessively greatly, the CPU 81 infers that the disturbance which varies the air-fuel ratio occurs. At step 2420, the CPU 81 sets the air-fuel ratio disturbance occurrence flag XGIRN to (at) "1". Thereafter, the CPU 81 proceeds to step 2495 to end the present routine tentatively.

In contrast, when the difference (θ excact−θ exctgt) is smaller than the predetermined exhaust valve closing timing overshoot threshold exerth, the CPU 81 makes a "No" determination at step 2410 to proceed to step 2430. That is, since the internal EGR amount varies in a small amount, the CPU 81 infers that the disturbance which varies the air-fuel ratio does not occur. At step 2430, the CPU 81 sets the air-fuel ratio disturbance occurrence flag XGIRN to (at) "0". Thereafter, the CPU 81 proceeds to step 2495 to end the present routine tentatively.

It should be noted that the CPU 81 of the ninth control apparatus may be configured so as to determine, at step 2410 shown in FIG. 24, whether or not an absolute value |θ excact−θ exctgt| of the difference (θ excact−θ exctgt) is equal to or larger than the predetermined exhaust valve closing timing overshoot threshold θ exerth.

As described above, the ninth control apparatus comprises:

exhaust valve closing timing control means (refer to the variable exhaust timing control unit 36, step 2020 and step 2040 shown in FIG. 20) for changing a closing timing EXC of an exhaust valve (i.e., the exhaust valve retard angle θ exc) of each of the at least two or more of the cylinders (in the present example, all of the cylinders) in such a manner that the "closing timing EXC of the exhaust valve (i.e., the exhaust valve retard angle θ exc)" coincides with a "target closing timing of the exhaust valve (the target exhaust valve retard angle θ exctgt) determined based on an operating state of the engine"; and prohibiting expedited learning means (refer to the routine shown in FIG. 24) which is configured so as to obtain an actual closing timing (the actual exhaust valve retard angle θ excact) of the exhaust valve, and so as to infer that the disturbance which transiently varies the air-fuel ratio occurs when it is inferred that a difference between the "obtained actual closing timing of the exhaust valve (the actual exhaust valve retard angle θ excact)" and the "target closing timing of the exhaust valve (the target exhaust valve retard angle θ exctgt)" is equal to or larger than a predetermined exhaust valve closing timing difference threshold (θ exerth) (refer to the "Yes" determination at step 2410 shown in FIG. 24).

Accordingly, the ninth control apparatus can prohibit the expedited learning control appropriately, in a case in which the internal EGR amount becomes excessively large or excessively small when the actual closing timing of the exhaust valve becomes excessively large (excessively advanced) or excessively small (excessively retarded) with respect to the target closing timing of the exhaust valve, and thereby, when the air-fuel ratio of the engine may transiently vary.

Tenth Embodiment

An air-fuel ratio control apparatus of a multi-cylinder internal combustion engine according to a tenth embodiment of the present invention (hereinafter, referred to as a "tenth control apparatus") will next be described. The tenth control apparatus is different from the first control apparatus only in that the tenth control apparatus controls an amount of the external EGR, and adopts a condition different from the condition that the first control apparatus adopts (as the condition) for setting the value of air-fuel ratio disturbance occurrence flag XGIRN to "1" or "0". Accordingly, hereinafter, the differences will mainly be described.

A great change in (of) the external EGR amount causes the air-fuel ratio of the mixtures supplied to the cylinders to become imbalanced temporarily. In such a case, it is not preferable that the expedited learning control is performed. In view of the above, the tenth control apparatus infers that the "disturbance which varies the air-fuel ratio" occurs, and prohibits (to perform) the expedited learning control, when an external EGR rate (hereinafter, simply referred to as an "EGR rate") changes greatly. Here, the EGR rate is a ratio of an external EGR gas flow rate to an intake air amount (air flow rate) Ga. It should be noted that the EGR rate is defined as a ratio of the "external EGR gas flow rate" to a "sum of the intake air amount Ga and the external EGR gas flow rate".

Figure 25:
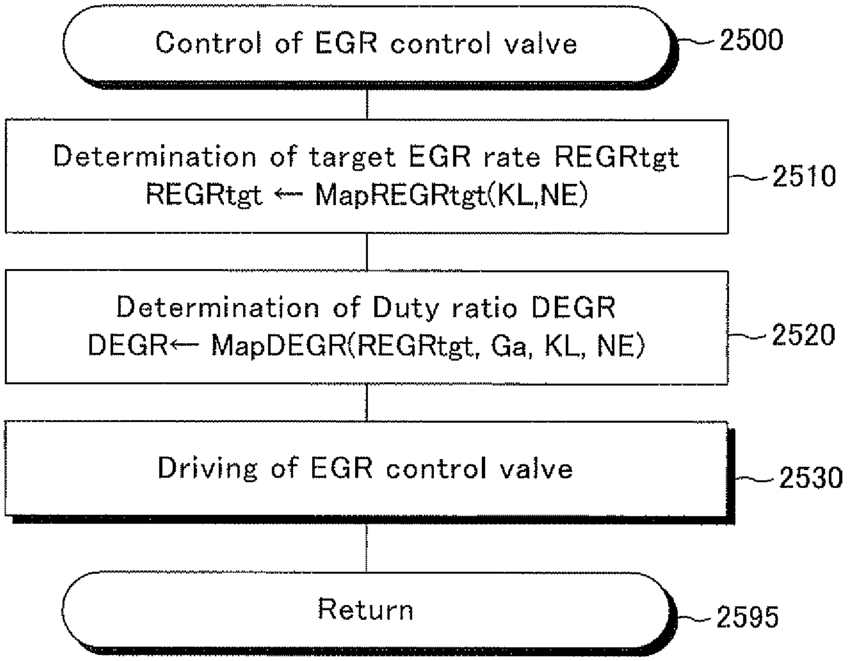
FIG. 25 is a flowchart showing a routine executed by a CPU of an air-fuel ratio control apparatus according to a tenth embodiment of the present invention.

More specifically, the CPU 81 of the tenth control apparatus executes the routines that the CPU 81 of the first control apparatus executes, and further executes an "EGR valve control routine" shown by a flowchart in FIG. 25 every time a predetermined time period elapses. Accordingly, at an appropriate predetermined timing, the CPU 81 starts a process from step 2500 shown in FIG. 25 to execute processes from step 2510 to step 2530 in this order, and thereafter, proceeds to step 2595 to end the present routine tentatively.

Step 2510: The CPU 81 determines a target EGR rate (target external EGR rate) REGRtgt by applying the road KL and the engine rotational speed NE to a table MapREGRtgt. For example, according to the table MapREGRtgt, the target EGR rate REGRtgt is determined so as to be largest in a middle load region and a middle rotational speed region. Further, according to the table MapREGRtgt, the target EGR rate REGRtgt is determined so as to become smaller as the load becomes higher or lower, and as the engine rotational speed becomes higher or lower.

Step 2520: The CPU 81 determines a duty ratio DEGR to be supplied to the EGR valve 55 by applying the target EGR rate REGRtgt determined at step 2510, the intake air amount Ga, the engine rotational speed NE, and the road KL to the table MapDEGR. The table MapDEGR is formed in advance based on data obtained by experiments.

Step 2530: The CPU 81 controls the opening degree of the EGR valve 55 based on the duty ratio DEGR determined at step 2520.

In this way, the external EGR amount (i.e., the EGR rate) is controlled.

Figure 26:
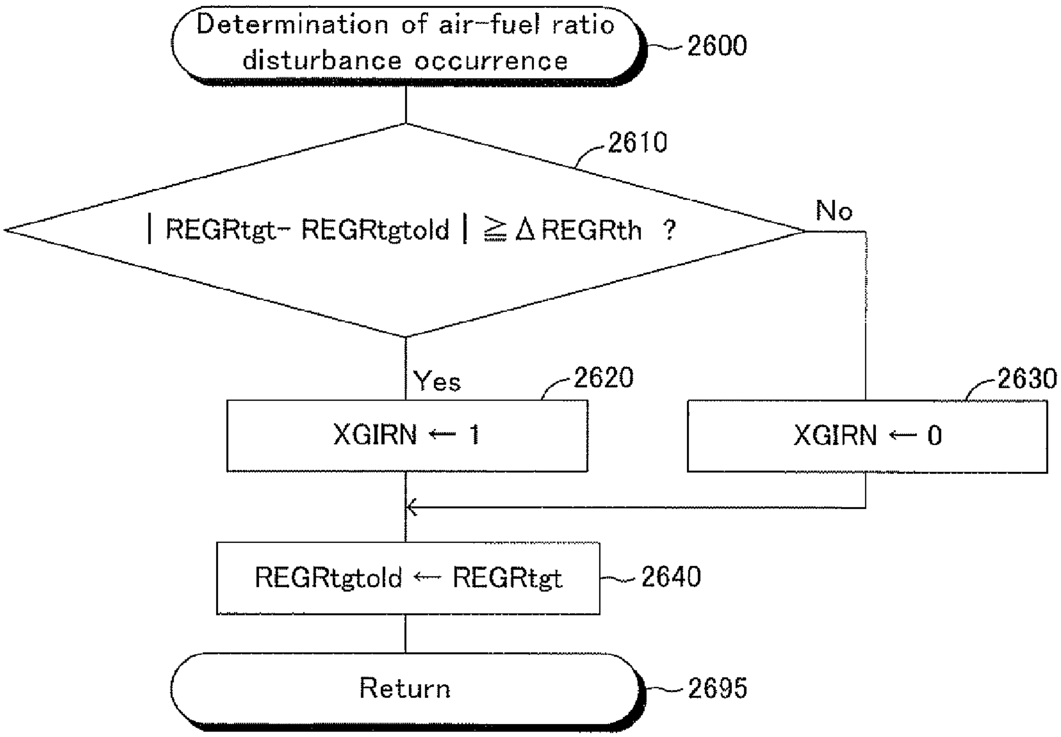
FIG. 26 is a flowchart showing a routine executed by the CPU of the air-fuel ratio control apparatus according to the tenth embodiment of the present invention.

Further, the CPU 81 of the tenth control apparatus executes an "air-fuel ratio disturbance occurrence determination routine" shown by a flowchart in FIG. 26 every time a predetermined time period elapses. Accordingly, at an appropriate predetermined timing, the CPU 81 starts the process from step 2600 shown in FIG. 26 to proceed to step 2610 at which the CPU 81 determines whether or not an absolute value |REGRtgt−REGRtgtold| of a difference between the "target EGR rate REGRtgt at the present time" and a "target EGR rate REGRtgt the predetermined time before (ago), which was stored when the present routine was executed at a previous timing (refer to step 2640 described later)" is equal to or larger than an EGR rate changing speed threshold Δ REGRth.

When the absolute value |REGRtgt−REGRtgtold| of the difference is equal to or higher than the EGR rate changing speed threshold Δ REGRth, the CPU 81 makes a "Yes" determination at step 2610 to proceed to step 2620. That is, since the external EGR rate (therefore, the EGR amount) varies excessively greatly, the CPU 81 infers that the disturbance which varies the air-fuel ratio occurs. At step 2620, the CPU 81 sets the air-fuel ratio disturbance occurrence flag XGIRN to (at) "1". Thereafter, the CPU 81 proceeds to step 2640.

In contrast, when the absolute value REGRtgt−REGRtgtold| of the difference is smaller than the EGR rate changing speed threshold ΔREGRth, the CPU 81 makes a "No" determination at step 2610 to proceed to step 2630. That is, since the external EGR ratio (and therefore, the external EGR amount) varies in a small amount, the CPU 81 infers that the disturbance which varies the air-fuel ratio does not occur. At step 2630, the CPU 81 sets the air-fuel ratio disturbance occurrence flag XGIRN to (at) "0". Thereafter, the CPU 81 proceeds to step 2640.

The CPU 81 stores the "target EGR rate REGRtgt at the present time" as the "target EGR rate REGRtgt the predetermined time before (ago)" at step 2640. Thereafter, the CPU 81 proceeds to step 2695 to end the present routine tentatively.

In this way, when the absolute value |REGRtgt−REGRtgtold| of the difference is equal to or higher than the EGR rate changing speed threshold Δ REGRth, the air-fuel ratio disturbance occurrence flag XGIRN is set to (at) "1", and therefore, the CPU 81 makes a "No" determination at step 1330 shown in FIG. 13 to proceed to step 1320. Accordingly, the expedited learning control is prohibited.

It should be noted that the CPU 81 of the tenth control apparatus may be configured in such a manner that the CPU 81 determines, at step 2610 shown in FIG. 26, whether or not a value (REGRtgt−REGRtgtold) obtained by subtracting the "target EGR rate REGRtgtold the predetermined time before (ago)" from the "target EGR rate REGRtgt at the present time" is equal to or larger than the EGR rate changing speed threshold Δ REGRth. Further, the CPU 81 may be configured so as to determine, at step 2610 shown in FIG. 26, whether or not a value (REGRtgtold−REGRtgt) obtained by subtracting the "target EGR rate REGRtgt at the present time" from the "target EGR rate REGRtgtold the predetermined time before (ago)" is equal to or larger than the EGR rate changing speed threshold Δ REGRth.

As described above, the tenth control apparatus comprises:

an exhaust gas recirculation pipe (54) connecting between a portion upstream of the catalytic converter (53) in the exhaust passage of the engine and an intake passage (the surge tank 41*b*) of the engine;

an EGR valve (55), which is disposed in the exhaust gas recirculation pipe, and which is configured in such a manner that its opening degree is changed in response to an instruction signal;

external EGR amount control means (refer to the routine shown in FIG. 25) for providing the instruction signal to the EGR valve so as to change an amount of an external EGR which is introduced into the intake passage through flowing in the exhaust gas recirculation pipe by changing the opening degree of the EGR valve (55) in response to an operating state of the engine; and prohibiting expedited learning means (refer to the routine shown in FIG. 26) which is configured so as to infer that the disturbance which transiently varies the air-fuel ratio occurs when it is inferred that a changing speed (REGRtgt−REGRtgtold) of the external EGR amount (in the present example, the external EGR rate) is equal to or higher than a predetermined external EGR amount changing speed threshold (the EGR rate changing speed threshold Δ REGRth) (refer to the "Yes" determination at step 2610 shown in FIG. 26).

Accordingly, the tenth control apparatus can prohibit the expedited learning control appropriately when it is inferred that the "disturbance which transiently varies the air-fuel ratio due to the external EGR" caused by a rapid change of the external EGR amount (the external EGR rate) occurs.

Eleventh Embodiment

An air-fuel ratio control apparatus of a multi-cylinder internal combustion engine according to an eleventh embodiment of the present invention (hereinafter, referred to as an "eleventh control apparatus") will next be described. The eleventh control apparatus is different from the tenth control apparatus only in that the eleventh control apparatus adopts a condition different from the condition that the tenth control apparatus adopts (as the condition) for setting the value of air-fuel ratio disturbance occurrence flag XGIRN to "1" or "0". Accordingly, hereinafter, the differences will mainly be described.

More specifically, the CPU 81 of the eleventh control apparatus executes the routines that the CPU 81 of the tenth control apparatus executes, except the routine shown in FIG. 26. Further, the CPU 81 of the eleventh control apparatus executes an "air-fuel ratio disturbance occurrence determination routine" shown by a flowchart in FIG. 27 in place of FIG. 26.

Figure 27:
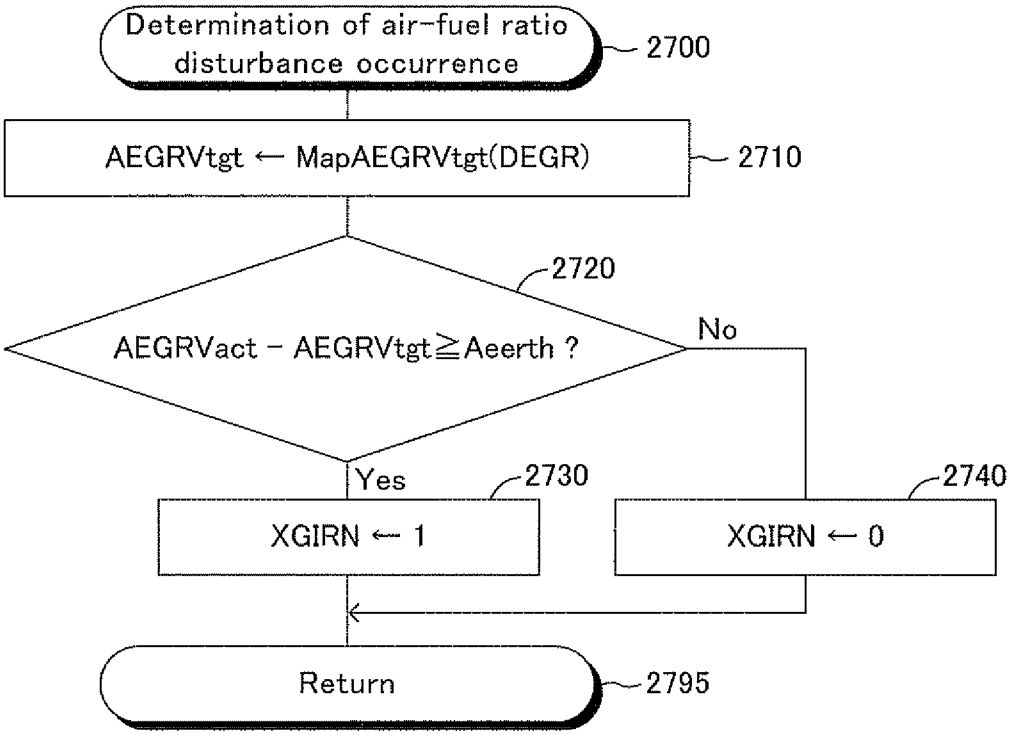
FIG. 27 is a flowchart showing a routine executed by a CPU of an air-fuel ratio control apparatus according to an eleventh embodiment of the present invention.

Accordingly, at an appropriate predetermined timing, the CPU 81 starts a process from step 2700 shown in FIG. 27 to proceed to step 2710 at which the CPU 81 obtains a target EGR valve opening degree AEGRtgt by applying the duty ratio DEGR determined at step 2520 shown in FIG. 25 to a table MapAEGRtgt. The target EGR valve opening degree AEGRtgt indicates a convergence EGR valve opening degree when the EGR valve 55 is controlled with the duty ratio DEGR.

Subsequently, the CPU 81 proceeds to step 2720 to determine whether or not a difference (AEGRVact−AEGRVtgt) between the "actual EGR valve opening degree AEGRVact detected by the EGR valve opening degree sensor 70 at the present time" and the "target EGR valve opening degree AEGRtgt" is equal to or larger than a predetermined EGR valve overshoot threshold Aeerth. In other words, the CPU 81 determines, at step 2720, whether or not a difference between the actual external EGR rate and the target external EGR rate is equal to or larger than a predetermined value.

When the difference (AEGRVact−AEGRVtgt) is equal to or larger than the predetermined EGR valve overshoot threshold Aeerth, the CPU 81 makes a "Yes" determination at step 2720 to proceed to step 2730. That is, since the external EGR rate (therefore, the EGR amount) is excessively large, the CPU 81 infers that the disturbance which varies the air-fuel ratio occurs. At step 2730, the CPU 81 sets the air-fuel ratio disturbance occurrence flag XGIRN to (at) "1". Thereafter, the CPU 81 proceeds to step 2795 to end the present routine tentatively.

In contrast, when the difference (AEGRVact−AEGRVtgt) is smaller than the predetermined EGR valve overshoot threshold Aeerth, the CPU 81 makes a "No" determination at step 2720 to proceed to step 2740. That is, since the external EGR rate (therefore, the EGR amount) is not excessively large, the CPU 81 infers that the disturbance which varies the air-fuel ratio does not occur. At step 2740, the CPU 81 sets the air-fuel ratio disturbance occurrence flag XGIRN to (at) “0”. Thereafter, the CPU 81 proceeds to step 2795 to end the present routine tentatively.

It should be noted that the CPU 81 of the eleventh control apparatus may be configured so as to determine, at step 2720 shown in FIG. 27, whether or not an absolute value |AEGRVact−AEGRVtgt| of the difference described above is equal to or larger than the predetermined EGR valve overshoot threshold Aeerth.

As described above, the eleventh control apparatus comprises:

the exhaust gas recirculation pipe (54);

the EGR valve (55);

external EGR control means (refer to the routine shown in FIG. 25) for providing the instruction signal (DEGR) to the EGR valve (55) so as to change an amount of an external EGR which is introduced into the intake passage through flowing in the exhaust gas recirculation pipe by changing the opening degree of the EGR valve in response to an operating state of the engine; and prohibiting expedited learning means (refer to the routine shown in FIG. 27) which is configured so as to obtain an actual opening degree (AEGRVact) of the EGR valve, and so as to infer that the disturbance which transiently varies the air-fuel ratio occurs when it is inferred that a difference (AEGRVact−AEGRVtgt) between the obtained actual opening degree (AEGRVact) of the EGR valve and an opening degree (AEGRVtgt) of the EGR valve determined based on the instruction signal (DEGR) provided to the EGR valve is equal to or larger than a predetermined EGR valve opening degree difference threshold (the predetermined EGR valve overshoot threshold Aeerth) (refer to the “Yes” determination at step 2720 shown in FIG. 27).

Accordingly, the eleventh control apparatus can prohibit the expedited learning control appropriately when the actual opening degree of the EGR valve is excessively large (or excessively small) with respect to the target opening degree of the EGR valve, and thereby, the external EGR amount becomes excessively large (or excessively small), which may cause the air-fuel ratio of the engine to transiently vary.

First Modification

Figure 28:
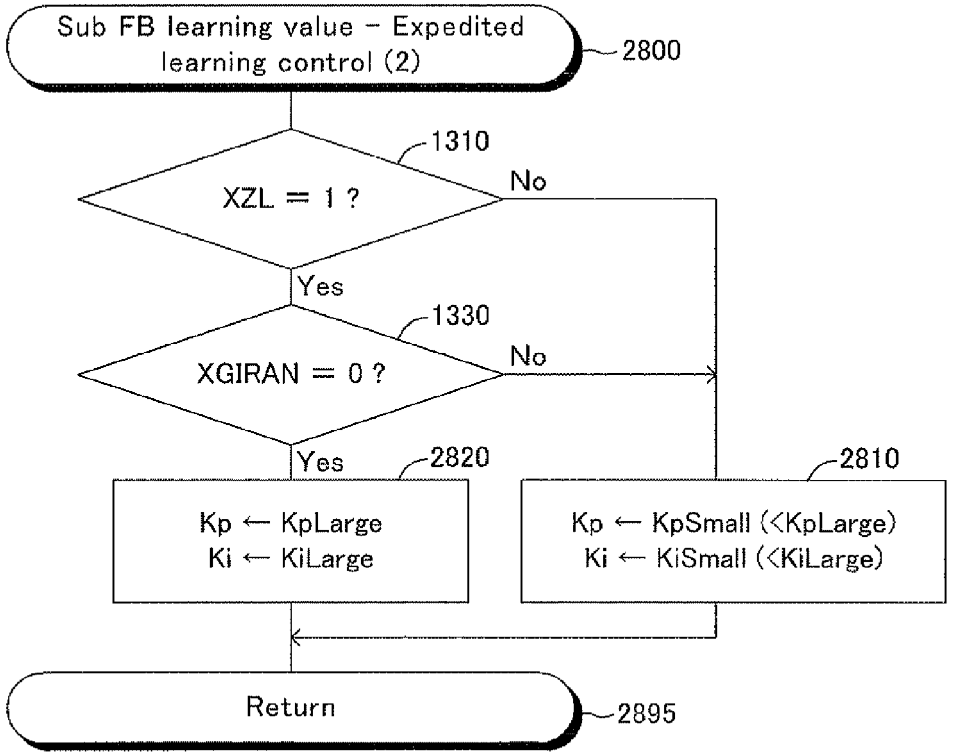
FIG. 28 is a flowchart showing a routine executed by a CPU of an air-fuel ratio control apparatus according to a first modification of the present invention.

A first modification of the air-fuel ratio control apparatus according to each of the embodiments of the present invention (hereinafter, referred to as a “first modified apparatus”) will next be described. The first modified apparatus executes an expedited learning control routine (second) of the sub FB learning value Vafsfbg shown in FIG. 28 every time a predetermined time period elapses, in place of the routine shown in FIG. 13 that the CPU 81 of each of the embodiments executes. It should be noted that each step shown in FIG. 28 which is for performing the same process as the corresponding step shown in FIG. 13 is given the same numeral as one that is given to the corresponding step shown in FIG. 13. A detail description for each of these steps will be omitted.

When the value of the expediting learning request flag XZL is equal to “0”, or when the value of the expediting learning request flag XZL is equal to “1” and the value of the air-fuel ratio disturbance occurrence flag XGIRN is equal to “1”, the CPU 81 proceeds step 2810. At step 2810, the CPU 81 sets the proportion gain Kp to (at) a normal value KpSmall, and sets the integration gain Ki to (at) a normal value KiSmall. The proportion gain Kp and the integration gain Ki are the gains used at step 1115 shown in FIG. 11 described above (refer to the formula (11)). Accordingly, in this case, both the proportion gain Kp and the integration gain Ki are set to the normal gains (gains used when the expedited learning control is not performed), and thus, the sub feedback amount Vafsfb varies relatively gradually (slowly). Consequently, the learning value Vafsfbg varies relatively gradually (slowly), and comes closer to (approach) the convergence value gradually (slowly). That is, the normal learning control is performed.

In contrast, when the value of the expediting learning request flag XZL is equal to “1” and the value of the air-fuel ratio disturbance occurrence flag XGIRN is equal to “0”, the CPU 81 proceeds step 2820. At step 2820, the CPU 81 sets the proportion gain Kp to (at) an expedition value KpLarge larger than the normal value KpSmall, and sets the integration gain Ki to (at) an expedition value KiLarge larger than the normal value KiSmall. Accordingly, the sub feedback amount Vafsfb varies relatively quickly. Consequently, the learning value Vafsfbg varies relatively quickly, and comes closer to (approach) the convergence value quickly. That is, the expedited learning control is performed.

It should be noted that, in the first modified apparatus, the process at step 1320 shown in FIG. 13 (i.e., the process to set the value p used at step 1140 shown in FIG. 11 to (at) the first value pSmall) may be added to the processes at step 2810, and the process at step 1340 shown in FIG. 13 (i.e., the process to set the value p used at step 1140 to (at) the second value pLarge) may be added to the processes at step 2820.

As described above, the first modified apparatus comprises:

the learning means (refer to the routine shown in FIG. 11, especially, step 1135-step 1155) which is configured so as to update the learning value (the sub FB learning value Vafsfbg) in such a manner that the learning value (the sub FB learning value Vafsfbg) gradually comes close to “either the first feedback amount (the sub feedback amount Vafsfb) or the steady-state component included in the first feedback amount”; and the expedited learning means (refer to the routine shown in FIG. 28) which is configured so as to instruct the first feedback amount updating means to increase a changing speed of the first feedback amount (the changing speed which becomes higher as the proportion gain Kp and the integration gain Ki become larger) in such a manner that the changing speed of the first feedback amount when it is inferred that the insufficient learning state is occurring is higher than the changing speed of the first feedback amount when it is inferred that the insufficient learning state is not occurring.

Second Modification

A second modification of the air-fuel ratio control apparatus according to each of the embodiments of the present invention (hereinafter, referred to as a “second modified apparatus” or a “determination apparatus”) will next be described. The second modified apparatus executes/performs an “air-fuel ratio imbalance among cylinders determination”.

Figure 29:
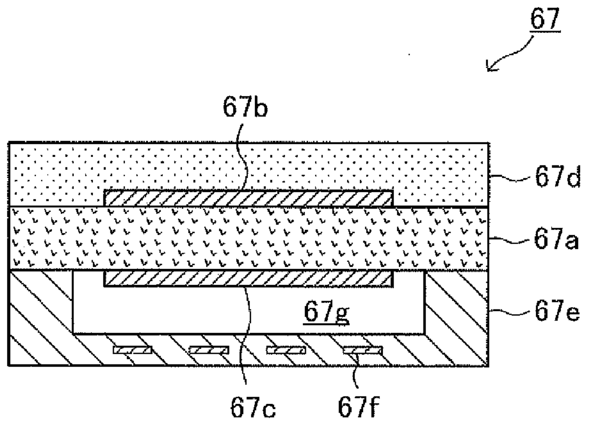
FIG. 29 is a schematic sectional view of the upstream air-fuel ratio sensor shown in FIG. 1.

Meanwhile, as shown in FIG. 29, the upstream air-fuel ratio sensor 67 described above includes a solid electrolyte layer 67*a*, an exhaust-gas-side electrode layer 67*b*, an atmosphere-side electrode layer 67*c*, a diffusion resistance layer 67*d*, a wall section 67*e*, and a heater 67*f*.

The solid electrolyte layer 67*a* is an oxide sintered body having oxygen ion conductivity. In the present example, the solid electrolyte layer 67*a* is “a stabilized zirconia element” in which CaO as a stabilizing agent is solid-solved in $ZrO_2$ (zirconia). The solid electrolyte layer 67*a* exerts well-known “oxygen cell characteristic” and “oxygen pumping characteristic”, when a temperature of the solid electrolyte layer 67*a* is equal to or higher than an activation temperature.

The exhaust-gas-side electrode layer 67*b* is made of a precious metal such as Platinum (Pt) which has a high catalytic activity. The exhaust-gas-side electrode layer 67*b* is formed on one of surfaces of the solid electrolyte layer 67*a*. The exhaust-gas-side electrode layer 67*b* is formed by chemical plating and the like in such a manner that it has an adequately high permeability (i.e., it is porous).

The atmosphere-side electrode layer 67*c* is made of a precious metal such as Platinum (Pt) which has a high catalytic activity. The atmosphere-side electrode layer 67*c* is formed on the other one of surfaces of the solid electrolyte layer 67*a* in such a manner that it faces (opposes) to the exhaust-gas-side electrode layer 67*b* to sandwich the solid electrolyte layer 67*a* therebetween. The atmosphere-side electrode layer 67*c* is formed by chemical plating and the like in such a manner that it has an adequately high permeability (i.e., it is porous).

The diffusion resistance layer (diffusion rate limiting layer) 67*d* is made of a porous ceramic (a heat resistant inorganic substance). The diffusion resistance layer 67*d* is formed so as to cover an outer surface of the exhaust-gas-side electrode layer 67*b* by, for example, plasma spraying and the like. A diffusion speed of hydrogen $H_2$ whose diameter is small in the diffusion resistance layer 67*d* is higher than a diffusion speed of "carbon hydride NC, carbon monoxide CO, or the like" whose diameter is relatively large in the diffusion resistance layer 67*d*. Accordingly, hydrogen $H_2$ reaches "exhaust-gas-side electrode layer 67*b*" more promptly than carbon hydride HC, carbon monoxide CO, owing to an existence of the diffusion resistance layer 67*d*. The upstream air-fuel ratio sensor 67 is disposed in such a manner that an outer surface of the diffusion resistance layer 67*d* is "exposed to the exhaust gas (the exhaust gas discharged from the engine 10 contacts with the outer surface of the diffusion resistance layer 67*d*).

The wall section 67*e* is made of a dense alumina ceramics through which gases can not pass. The wall section 67*e* is configured so as to form "an atmosphere chamber 67*g*" which is a space that accommodates the atmosphere-side electrode layer 67*c*. An air is introduced into the atmosphere chamber 67*g*.

The heater 67*f* is buried in the wall section 67*e*. When the heater 67*f* is energized, it generates heat to heat up the solid electrolyte layer 67*a*.

Figure 30:
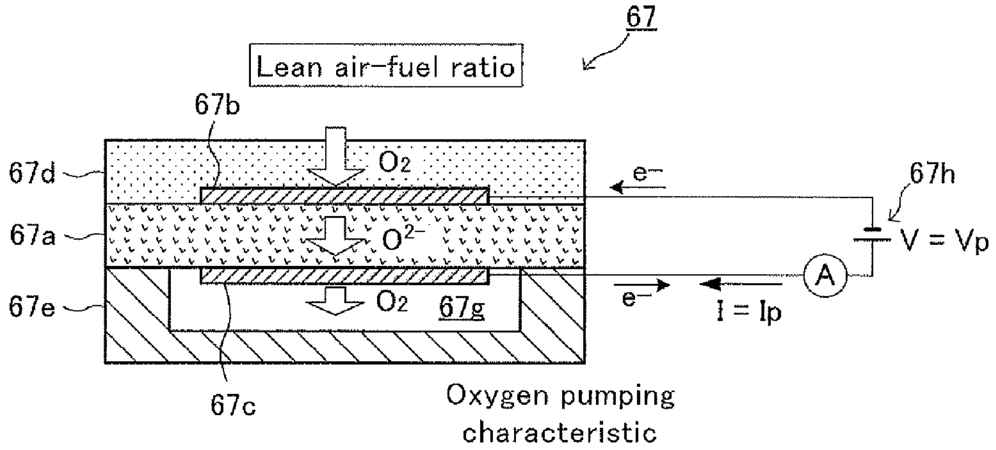
FIG. 30 is a figure for describing an operation of the upstream air-fuel ratio sensor, when an air-fuel ratio of an exhaust gas (gas to be detected) is in a lean side with respect to the stoichiometric air-fuel ratio.

As shown in FIG. 30, the upstream air-fuel ratio sensor 67 uses an electric power supply 67*h*. The electric power supply 67*h* applies an electric voltage V in such a manner that an electric potential of the atmosphere-side electrode layer 67*c* is higher than an electric potential of the exhaust-gas-side electrode layer 67*b*.

As shown in FIG. 30, when the air-fuel ratio of the exhaust gas is in the lean side with respect to the stoichiometric air-fuel ratio, the oxygen pumping characteristic is utilized so as to detect the air-fuel ratio. That is, when the air-fuel ratio of the exhaust gas is leaner than the stoichiometric air-fuel ratio, a large amount of oxygen molecules included in the exhaust gas reach the exhaust-gas-side electrode layer 67*b* after passing through the diffusion resistance layer 67*d*. The oxygen molecules receive electrons to change into oxygen ions. The oxygen ions pass through the solid electrolyte layer 67*a*, and release the electrons to change into oxygen molecules at the atmosphere-side electrode layer 67*c*. As a result, a current I flows from the positive electrode of the electric power supply 67*h* to the negative electrode of the electric power supply 67*h*, thorough the atmosphere-side electrode layer 67*c*, the solid electrolyte layer 67*a*, and the exhaust-gas-side electrode layer 67*b*.

Figure 31:
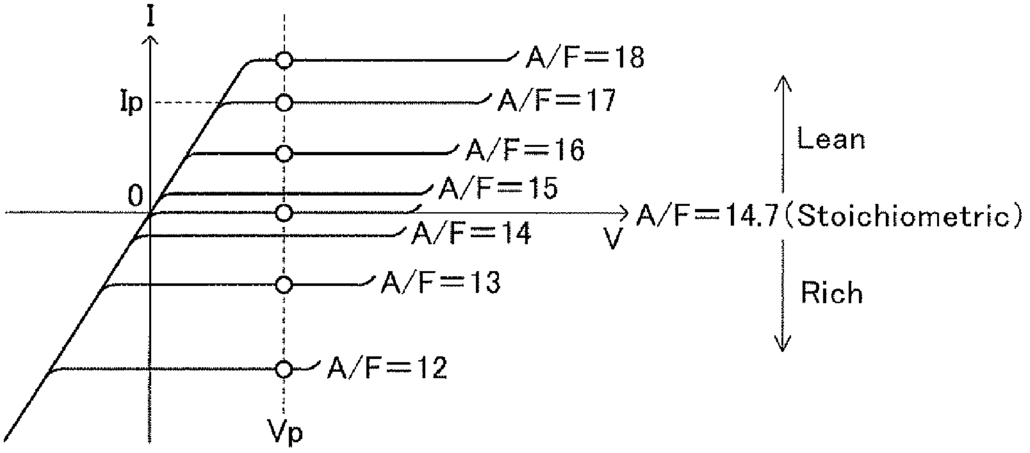
FIG. 31 is a graph showing a relationship between the air-fuel ratio of the exhaust gas and a limiting current value of the upstream air-fuel ratio sensor.

When the magnitude of the electric voltage V is set to be equal to or higher than a predetermined value Vp, the magnitude of the electrical current I varies according to an amount of "the oxygen molecules reaching the exhaust-gas-side electrode layer 67*b* after passing through the diffusion resistance layer 67*d* by the diffusion" out of the oxygen molecules included in the exhaust gas reaching the outer surface of the diffusion resistance layer 67*d*. That is, the magnitude of the electrical current I varies depending upon a concentration (partial pressure) of oxygen at the exhaust-gas-side electrode layer 67*b*. The concentration of oxygen at the exhaust-gas-side electrode layer 67*b* varies depending upon the concentration of oxygen of the exhaust gas reaching the outer surface of the diffusion resistance layer 67*d*. The current I, as shown in FIG. 31, does not vary when the voltage V is set at a value equal to or higher than the predetermined value Vp, and therefore, is referred to as a limiting current Ip. The upstream air-fuel ratio sensor 67 outputs the value corresponding to the air-fuel ratio based on the limiting current Ip.

Figure 32:
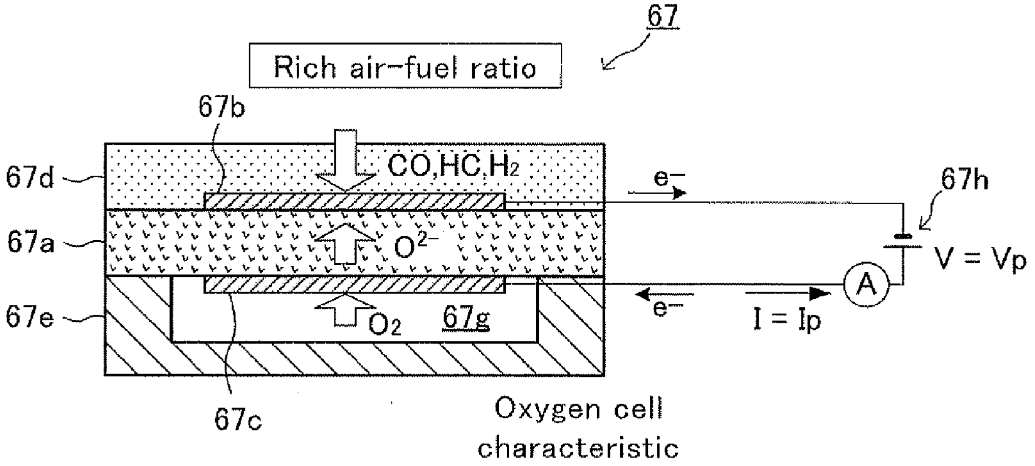
FIG. 32 is a figure for describing an operation of the upstream air-fuel ratio sensor, when the air-fuel ratio of the exhaust gas (gas to be detected) is in a rich side with respect to the stoichiometric air-fuel ratio.

On the other hand, as shown in FIG. 32, when the air-fuel ratio of the exhaust gas is in the rich side with respect to the stoichiometric air-fuel ratio, the oxygen cell characteristic described above is utilized so as to detect the air-fuel ratio. More specifically, when the air-fuel ratio of the exhaust gas is richer than the stoichiometric air-fuel ratio, a large amount of unburnt substances (HC, CO, and $H_2$ etc.) included in the exhaust gas reach the exhaust-gas-side electrode layer 67*b* through the diffusion resistance layer 67*d*. In this case, a difference (oxygen partial pressure difference) between the concentration of oxygen at the atmosphere-side electrode layer 67*c* and the concentration of oxygen at the exhaust-gas-side electrode layer 67*b* becomes large, and thus, the solid electrolyte layer 67*a* functions as an oxygen cell. The applied voltage V is set at a value lower than the elective motive force of the oxygen cell.

Accordingly, oxygen molecules existing in the atmosphere chamber 67*g* receive electrons at the atmosphere-side electrode layer 67*c* so as to change into oxygen ions. The oxygen ions pass through the solid electrolyte layer 67*a*, and move to the exhaust-gas-side electrode layer 67*b*. Then, they oxidize the unburnt substances at the exhaust-gas-side electrode layer 67*b* to release electrons. Consequently, a current I flows from the negative electrode of the electric power supply 67*h* to the positive electrode of the electric power supply 67*h*, thorough the exhaust-gas-side electrode layer 67*b*, the solid electrolyte layer 67*a*, and the atmosphere-side electrode layer 67*c*.

The magnitude of the electrical current I varies according to an amount of the oxygen ions reaching the exhaust-gas-side electrode layer 67*b* from the atmosphere-side electrode layer 67*c* through the solid electrolyte layer 67*a*. As described above, the oxygen ions are used to oxidize the unburnt substances at the exhaust-gas-side electrode layer 67*b*. Accordingly, the amount of the oxygen ions passing through the solid electrolyte layer 67*a* becomes larger, as an amount of the unburnt substances reaching the exhaust-gas-side electrode layer 67*b* through the diffusion resistance layer 67*d* by the diffusion becomes larger. In other words, as the air-fuel ratio is smaller (as the air-fuel ratio is richer, and thus, an amount of the unburnt substances becomes larger), the magnitude of the electrical current I becomes larger. Meanwhile, the amount of the unburnt substances reaching the exhaust-gas-side electrode layer 67*b* is limited owing to the existence of the diffusion resistance layer 67*d*, and therefore, the current I becomes a constant value Ip varying depending upon the air-fuel ratio. The upstream air-fuel ratio sensor 67 outputs the value corresponding to the air-fuel ratio based on the limiting current Ip. Accordingly the upstream air-fuel ratio sensor 67 outputs the output value Vabyfs shown in FIG. 3.

As described above, the downstream air-fuel ratio sensor 68 is a well-known oxygen-concentration sensor of a concentration cell type ($O_2$ sensor). The downstream air-fuel ratio sensor 68 has, for example, a configuration (structure) similar to the upstream air-fuel ratio sensor 67 shown in FIG. 29 (except the electric power supply 67*h*). Alternatively, the downstream air-fuel ratio sensor 68 may comprise a test-tube like solid electrolyte layer, an exhaust-gas-side electrode layer formed on an outer surface of the solid electrolyte layer, an atmosphere-side electrode layer formed on an inner surface of the solid electrolyte layer in such a manner that it is exposed in an atmosphere chamber (inside of the solid electrolyte layer) and faces (opposes) to the exhaust-gas-side electrode layer to sandwich the solid electrolyte layer therebetween, and a diffusion resistance layer which covers the exhaust-gas-side electrode layer and with which the exhaust gas contacts (or which is exposed in the exhaust gas).

(Principle of the Determination of an Air-Fuel Ratio Imbalance Among Cylinders)

Next will be described the principle of "the determination of an air-fuel ratio imbalance among cylinders", adopted by the determining apparatus. The determination of an air-fuel ratio imbalance among cylinders is determining whether or not the air-fuel ratio imbalance among cylinders becomes larger than a warning value, in other words, is determining whether or not a non-uniformity among individual cylinder air-fuel-ratios (which can not be permissible in view of the emission) (i.e., the air-fuel ratio imbalance among cylinders) is occurring.

The fuel of the engine 10 is a chemical compound of carbon and hydrogen. Accordingly, "carbon hydride HC, carbon monoxide CO, and hydrogen $H_2$, and so on" are generated as intermediate products, while the fuel is burning so as to change to water $H_2O$ and carbon dioxide $CO_2$.

Figure 33:
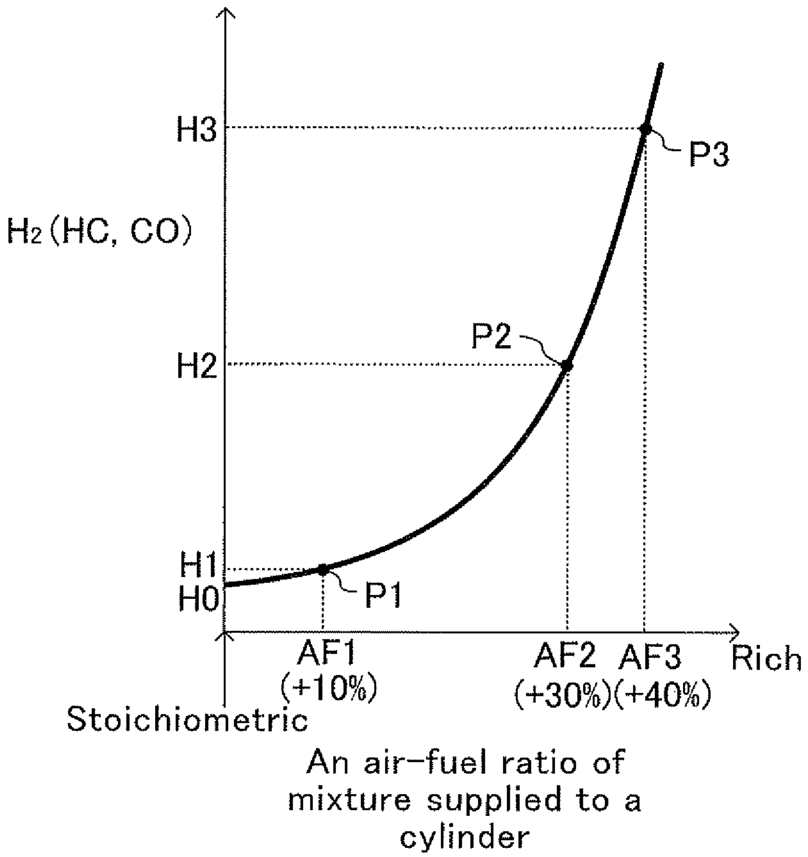
FIG. 33 is a graph showing a relationship between an air-fuel ratio of a mixture supplied to a cylinder and an amount of unburnt substances discharged from the cylinder.

A difference between an amount of oxygen required for a perfect combustion and an actual amount of oxygen becomes larger, as the air-fuel ratio of the mixture for the combustion becomes smaller in an air-fuel region smaller than the stoichiometric air-fuel ratio (i.e., as the air-fuel ratio becomes richer with respect to the stoichiometric air-fuel ratio). In other words, as the air-fuel ratio becomes richer, a shortage amount of oxygen during the combustion increases, and therefore, a concentration of oxygen lowers. Thus, a probability that intermediate products (unburnt substances) meet and bind with oxygen greatly decreases. Consequently, as shown in FIG. 33, an amount of the unburnt substances (HC, CO, and $H_2$) discharged from a cylinder drastically (e.g., in a quadratic function fashion) increases, as the air-fuel ratio of the mixture supplied to the cylinder becomes richer. It should be noted that points P1, P2, and P3 shown in FIG. 33 correspond to states in which an amount of fuel supplied to a certain cylinder becomes 10% (=AF1) excess, 30% (=AF2) excess, and 40% (=AF3) excess, respectively, with respect to an amount of fuel that causes an air-fuel ratio of the cylinder to coincide with the stoichiometric air-fuel ratio.

Further, hydrogen $N_2$ is a small molecule, compared with carbon hydride HC and carbon monoxide CO. Accordingly, hydrogen $H_2$ rapidly diffuses through the diffusion resistance layer 67*d* of the upstream air-fuel ratio sensor 67, compared to the other unburnt substances (NC, CO). Therefore, when a large amount of the unburnt substances including HC, CO, and $H_2$ are generated, a preferential diffusion of hydrogen $H_2$ considerably occurs in the diffusion resistance layer 67*d*. That is, hydrogen $H_2$ reaches the surface of an air-fuel detecting element (the exhaust-gas-side electrode layer 67*b* formed on the surface of the solid electrolyte layer 67*a*) in a larger mount compared with "the other unburnt substances (HC, CO)". As a result, a balance between a concentration of hydrogen $H_2$ and a concentration of the other unburnt substances (HC, CO) is lost. In other words, a fraction of hydrogen $H_2$ to all of the unburnt substances included in "the exhaust gas reaching the air-fuel ratio detecting element (the exhaust-gas-side electrode layer 67*b*) of the upstream air-fuel ratio sensor 67" becomes larger than a fraction of hydrogen $H_2$ to all of the unburnt substances included in "the exhaust gas discharged from the engine 10".

Meanwhile, the target upstream-side air-fuel ratio abyfr is set to (at) the stoichiometric air-fuel ratio. Further, the target downstream-side value Voxsref is set to (at) the value (0.5 V) corresponding to the stoichiometric air-fuel ratio.

Here, it is assumed that each air-fuel ratio of each of cylinders deviates toward a rich side without exception, while the air-fuel ratio imbalance among cylinders is not occurring. Such a state occurs, for example, when "a measured or estimated value of the intake air amount of the engine" which is a basis when calculating a fuel injection amount becomes larger than "a true intake air amount".

In this case, for example, it is assumed that the air-fuel ratio of each of the cylinders is AF2 shown in FIG. 33. When the air-fuel ratio of a certain cylinder is AF2, a larger amount of the unburnt substances (thus, hydrogen $H_2$) are included in the exhaust gas than when the air-fuel ratio of the certain cylinder is AF1 closer to the stoichiometric air-fuel ratio than AF2 (refer the point P1 and the point P2). Accordingly, "the preferential diffusion of hydrogen $H_2$" occurs in the diffusion resistance layer 67*d* of the upstream air-fuel ratio sensor 67.

However, in this case, a true average of the air-fuel ratio of the "mixture supplied to the engine 10 during a period in which each and every cylinder completes one combustion stroke (a period corresponding to 720° crank angle)" is also AF2. In addition, the air-fuel ratio conversion table Mapabyfs shown in FIG. 3 is made in consideration of the "preferential diffusion of hydrogen $H_2$". Therefore, the upstream-side air-fuel ratio abyfs represented by the actual output value Vabyfs of the upstream air-fuel ratio sensor 67 (i.e., the upstream-side air-fuel ratio abyfs obtained by applying the actual output value Vabyfs to the air-fuel ratio conversion table Mapabyfs) coincides with the "true average AF2 of the air-fuel ratio".

Accordingly, by the main feedback control, the air-fuel ratio of the mixture supplied to the entire engine 10 is corrected in such a manner that it coincides with the "stoichiometric air-fuel ratio which is the target upstream-side air-fuel ratio abyfr", and therefore, each of the air-fuel ratios of each of the cylinders also roughly coincides with the stoichiometric air-fuel ratio, since the air-fuel ratio imbalance among cylinders is not occurring. Consequently, the sub feedback amount Vafsfb and the sub FB learning value Vafsfbg do not become a value which corrects the air-fuel ratio by a great amount. That is, when the air-fuel ratio imbalance among cylinders is not occurring, the sub feedback amount Vafsfb and the sub FB learning value Vafsfbg do not become the value which corrects the air-fuel ratio by a great amount.

Another description will next be made regarding behaviors of various values when "the air-fuel ratio imbalance among cylinders" is occurring, with reference to behaviors of various values when "the air-fuel ratio imbalance among cylinders" is not occurring.

For example, it is assumed that an air-fuel ratio A0/F0 is equal to the stoichiometric air-fuel ratio (e.g., 14.5), when the intake air amount (weight) introduced into each of the cylinders of the engine 10 is A0, and the fuel amount (weight) supplied to each of the cylinders is F0.

Further, it is assumed that an amount of the fuel supplied (injected) to each of the cylinders becomes uniformly excessive in 10% due to an error in estimating the intake air amount, etc. That is, it is assumed that the fuel of 1.1·F0 is supplied to each of the cylinders. Here, a total amount of the intake air supplied to the engine 10 which is the four cylinder engine (i.e., an amount of an intake air supplied to the entire engine 10 during the period in which each and every cylinder completes one combustion stroke) is equal to 4·A0. A total amount of the fuel supplied to the engine 10 (i.e., an amount of fuel supplied to the entire engine 10 during the period in which each and every cylinder completes one combustion stroke) is equal to 4.4·F0(=1.1·F0+1.1·F0+1.1·F0+1.1·F0). Accordingly, a true average of the air-fuel ratio of the mixture supplied to the entire engine 10 is equal to 4·A0/(4.4·F0)=A0/(1.1·F0). At this time, the output value of the upstream air-fuel ratio sensor becomes equal to an output value corresponding to the air-fuel ratio A0/(1.1·F0).

Accordingly, the amount of the fuel supplied to each of the cylinders is decreased in 10% (the fuel of 1·F0 is supplied to each of the cylinders) by the main feedback control, and therefore, the air-fuel ratio of the mixture supplied to the entire engine 10 is caused to coincide with the stoichiometric air-fuel ratio A0/F0.

In contrast, it is assumed that only the air-fuel ratio of a specific cylinder greatly deviates to (become) the richer side. This state occurs, for example, when the fuel injection property (characteristic) of the fuel injector 39 provided for the specific cylinder becomes "the property (characteristic) that the fuel injector 39 injects the fuel in an amount which is considerable larger (more excessive) than the instructed fuel injection amount". This type of abnormality of the fuel injector 39 is also referred to as "rich deviation abnormality of the fuel injector".

Here, it is assumed that an amount of fuel supplied to one certain specific cylinder is excessive in 40% (i.e., 1.4·F0), and an amount of fuel supplied to each of the other three cylinders is a fuel amount required to cause the air-fuel ratio of the other three cylinders to coincide with the stoichiometric air-fuel ratio (i.e., 1·F0). Under this assumption, the air-fuel ratio of the specific cylinder is "AF3" shown in FIG. 33, and the air-fuel ratio of each of the other cylinders is the stoichiometric air-fuel ratio.

At this time, a total amount of the intake air supplied to the engine 10 which is the four cylinder engine (an amount of air supplied to the entire engine 10 during the period in which each and every cylinder completes one combustion stroke) is equal to 4·A0. A total amount of the fuel supplied to the entire engine 10 (an amount of fuel supplied to the entire engine 10 during the period in which each and every cylinder completes one combustion stroke) is equal to 4.4·F0(=1.4·F0+F0+F0+F0).

Accordingly, the true average of the air-fuel ratio of the mixture supplied to the entire engine 10 is equal to 4·A0/(4.4·F0)=A0/(1.1·F0). That is, the true average of the air-fuel ratio of the mixture supplied to the entire engine 10 is the same as the value obtained "when the amount of fuel supplied to each of the cylinders is uniformly excessive in 10%" as described above.

However, as described above, the amount of the unburnt substances (HC, CO, and $H_2$) drastically increases, as the air-fuel ratio of the mixture supplied to the cylinder becomes richer and richer. Accordingly, a total amount SH1 of hydrogen $H_2$ included in the exhaust gas in the case in which only the amount of fuel supplied to the specific cylinder becomes excessive in 40%" is equal to SH1=H3+H0+H0+H0=H3+3·H0, according to FIG. 33. In contrast, a total amount SH2 of hydrogen $H_2$ included in the exhaust gas in the case in which the amount of the fuel supplied to each of the cylinders is uniformly excessive in 10%" is equal to SH2=H1+H1+H1+H1=4·H1, according to FIG. 33. The amount H1 is slightly larger than the amount H0, however, both of the amount H1 and the amount H0 are considerably small. That is, the amount H1 and the amount H0, as compared to the amount H3, is substantially equal to each other. Consequently, the total hydrogen amount SH1 is considerably larger than the total hydrogen amount SH2 (SH1>>SH2).

As described above, even when the average of the air-fuel ratio of the mixture supplied to the entire engine 10 is the same, the total amount SH1 of hydrogen included in the exhaust gas when the air-fuel ratio imbalance among cylinders is occurring is considerably larger than the total amount SH2 of hydrogen included in the exhaust gas when the air-fuel ratio imbalance among cylinders is not occurring.

Accordingly, the air-fuel ratio represented by the output value Vabyfs of the upstream air-fuel ratio sensor when only the amount of fuel supplied to the specific cylinder is excessive in 40% becomes richer (smaller) than the "true average of the air-fuel ratio (A0/(1.1·F0)) of the mixture supplied to the entire engine 10", due to the "preferential diffusion of hydrogen $H_2$" in the diffusion resistance layer 67*d*. That is, even when the average of the air-fuel ratio of the exhaust gas is the same air-fuel ratio, the concentration of hydrogen $H_2$ at the exhaust-gas-side electrode layer 67*b* of the upstream air-fuel ratio sensor 67 when the air-fuel ratio imbalance among cylinders is occurring becomes higher than when the air-fuel ratio imbalance among cylinders is not occurring. Accordingly, the output value Vabyfs of the upstream air-fuel ratio sensor 67 becomes a value indicating an air-fuel ratio richer than the "true average of the air-fuel ratio".

Consequently, by the main feedback control, the true average of the air-fuel ratio of the mixture supplied to the entire engine 10 is caused to be leaner than the stoichiometric air-fuel ratio.

On the other hand, the exhaust gas which has passed through the upstream-side catalytic converter 53 reaches the downstream air-fuel ratio sensor 56. The hydrogen $H_2$ included in the exhaust gas is oxidized (purified) together with the other unburnt substances (HC, CO) in the upstream-side catalytic converter 53. Accordingly, the output value Voxs of the downstream air-fuel ratio sensor 56 becomes a value corresponding to the average of the true air-fuel ratio of the mixture supplied to the entire engine 10. Therefore, the air-fuel ratio correction (control) amount (the sub feedback amount) calculated according to the sub feedback control becomes a value which compensates for the excessive correction of the air-fuel ratio to the lean side by the main feedback control. The sub feedback amount etc. causes the true average of the air-fuel amount of the engine 10 to coincide with the stoichiometric air-fuel ratio.

As described above, the air-fuel ratio correction (control) amount (the sub feedback amount) calculated according to the sub feedback control becomes the value to compensate for the "excessive correction of the air-fuel ratio to the lean side" caused by the rich deviation abnormality of the fuel injector 39 (the air-fuel ratio imbalance among cylinders). In addition, a degree of the excessive correction of the air-fuel ratio to the lean side increases, as the fuel injector 39 which is in the rich deviation abnormality state injects the fuel in larger amount with respect to the"instructed injection amount" (i.e., the air-fuel ratio of the specific cylinder becomes richer).

Therefore, in a "system in which the air-fuel ratio of the engine is corrected to the richer side" as the sub feedback amount is a positive value and the magnitude of the sub feedback amount becomes larger, a "value varying depending upon the sub feedback amount (in practice, for example, the learning value of the sub feedback amount, the learning value obtained by bringing in the steady-state component of the sub feedback amount)" is a value representing the degree of the air-fuel ratio imbalance among cylinders.

In view of the above, the present apparatus obtains, as the parameter for imbalance determination, a value (in the present example, "the sub FB learning value" which is the learning value of the sub feedback amount) varying depending upon the sub feedback amount. That is, the parameter for imbalance determination is a "value which becomes larger, as a difference becomes larger between an amount of hydrogen included in the exhaust gas before passing through the upstream-side catalytic converter 53 and an amount of hydrogen included in the exhaust gas after passing through the upstream-side catalytic converter 53". Thereafter, the apparatus determines that the air-fuel ratio imbalance among cylinders is occurring, when the parameter for imbalance determination becomes equal to or larger than an "abnormality determining threshold" (i.e., when the value which increases and decreases according to increase and decrease of the sub FB learning value becomes a value which corrects the air-fuel ratio of the engine to the richer side in an amount equal to or larger than the abnormality determining threshold").

Figure 34:
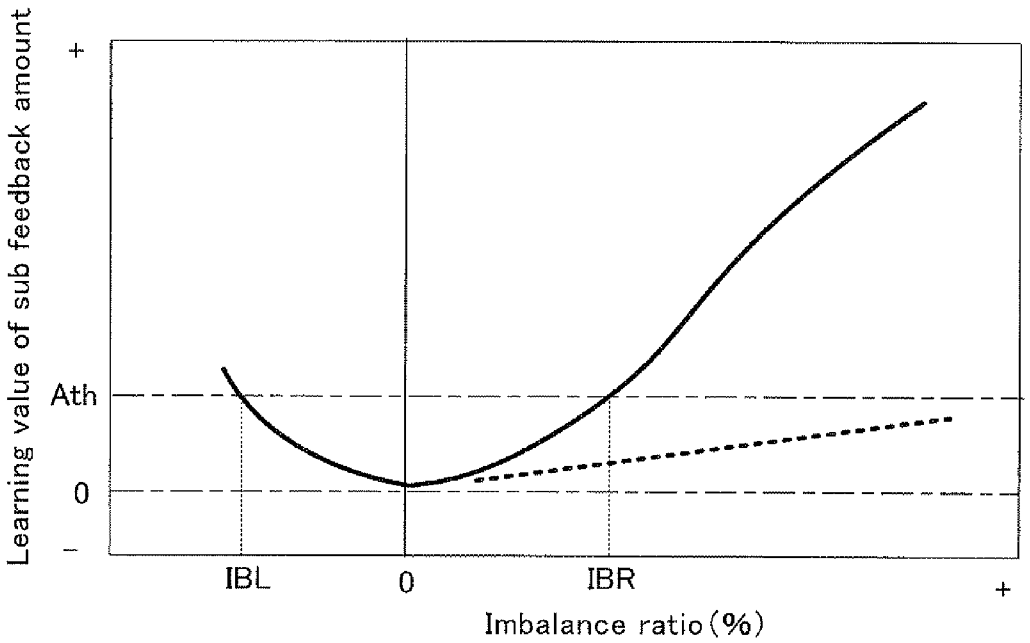
FIG. 34 is a graph showing a relationship between a ratio of an air-fuel ratio imbalance among cylinders and a sub feedback amount.

A solid line in FIG. 34 shows the sub FB learning value, when an air-fuel ratio of a certain cylinder deviates to the richer side and to the leaner side from the stoichiometric air-fuel ratio, due to the air-fuel ratio imbalance among cylinders. An abscissa axis of the graph shown in FIG. 34 is an "imbalance ratio". The imbalance ratio is defined as a ratio (Y/X) of a difference Y(=X−af) between "the stoichiometric air-fuel ratio X and the air-fuel ratio af of the cylinder deviating to the richer side" to the "stoichiometric air-fuel ratio X". As described above, an affect due to the preferential diffusion of hydrogen $H_2$ drastically becomes greater, as the imbalance ratio becomes larger. Accordingly, as shown by the solid line in FIG. 34, the sub FB learning value (and therefore, the parameter for imbalance determination) increases in a quadratic function fashion, as the imbalance ratio increases.

It should be noted that, as shown by the solid line in FIG. 34, the sub FB learning value increases as an absolute value of the imbalance ratio increases, when the imbalance ratio is a negative value. That is, for example, in a case in which the air-fuel ratio imbalance among cylinders occurs when an air-fuel ratio of only one specific cylinder deviates to the leaner side, the sub FB learning value as the parameter for imbalance determination (the value according to the sub feedback learning value) increases. This state occurs, for example, when the fuel injection property (characteristic) of the fuel injector 39 provided for the specific cylinder becomes "the property (characteristic) that the fuel injector 39 injects the fuel of an amount which is considerable smaller than the instructed fuel injection amount". This type of abnormality of the fuel injector 39 is also referred to as "lean deviation abnormality of the fuel injector".

The reason why the sub FB learning value increases when the air-fuel ratio imbalance among cylinders occurs in which the air-fuel ratio of the single specific cylinder greatly deviates to the leaner side will next be described. In the description below, it is assumed that the intake air amount (weight) introduced into each of the cylinders of the engine 10 is A0. Further, it is assumed that the air-fuel ratio A0/F0 coincides with the stoichiometric air-fuel ratio, when the fuel amount (weight) supplied to each of the cylinders is F0.

In addition, it is assumed that the amount of fuel supplied to one certain specific cylinder (the first cylinder, for convenience) is small in 40% (i.e., 0.6·F0), and an amount of fuel supplied to each of the other three cylinders (the second, the third, and the fourth cylinder) is a fuel amount required to cause the air-fuel ratio of the other three cylinders to coincide with the stoichiometric air-fuel ratio (i.e., F0). It should be noted it is assumed that a misfiring does not occur.

In this case, by the main feedback control, it is further assumed that the amount of the fuel supplied to each of the first to fourth cylinder is increased in the same amount (10%) to each other. At this time, the amount of the fuel supplied to the first cylinder is equal to 0.7·F0, and the amount of the fuel supplied to each of the second to fourth cylinder is equal to 1.1·F0.

Under this assumption, a total amount of the intake air supplied to the engine 10 which is the four cylinder engine (an amount of air supplied to the entire engine 10 during the period in which each and every cylinder completes one combustion stroke) is equal to 4·A0. A total amount of the fuel supplied to the engine 10 (an amount of fuel supplied to the engine 10 during the period in which each and every cylinder completes one combustion stroke) is equal to 4.0·F0 (=0.7·F0+1.1·F0+1.1·F0+1.1·F0), as a result of the main feedback control. Consequently, the true average of the air-fuel ratio of the mixture supplied to the entire engine 10 is equal to 4·A0/(4·F0)=A0/F0, that is the stoichiometric air-fuel ratio.

However, a "total amount SH3 of hydrogen $H_2$ included in the exhaust gas" in this case is equal to SH3=H4+H1+H1+H1=H4+3·H1. It should be noted that H4 is an amount of hydrogen generated when the air-fuel ratio is equal to A0/(0.7·F0), which is smaller than H1 and H0, and is roughly equal to H0. Accordingly, the total amount SH3 is at most equal to (H0+3·H1).

In contrast, a "total amount SH4 of hydrogen $H_2$ included in the exhaust gas" when "the air-fuel ratio imbalance among cylinders is not occurring and the true average of the air-fuel ratio of the mixture supplied to the entire engine 10" is equal to the stoichiometric air-fuel ratio is SH4=H0+H0+H0+H0=4·H0. As described above, H1 is slightly larger than H0. Accordingly, the total amount SH3 (=H0+3·H1) is larger than the total amount SH4 (=4·H0).

Consequently, when the air-fuel ratio imbalance among cylinders is occurring due to the "lean deviation abnormality of the fuel injector", the output value Vabyfs of the upstream air-fuel ratio sensor 67 is affected by the preferential diffusion of hydrogen, even when the true average of the air-fuel ratio of the mixture supplied to the entire engine 10 is shifted to the stoichiometric air-fuel ratio by the main feedback control. That is, the upstream-side air-fuel ratio abyfs obtained by applying the output value Vabyfs to the air-fuel ratio conversion table Mapabyfs becomes "richer (smaller)" than the stoichiometric air-fuel ratio which is the target upstream-side air-fuel ratio abyfr. As a result, the main feedback control is further performed, and the true average of the air-fuel ratio of the mixture supplied to the entire engine 10 is adjusted (corrected) to the leaner side with respect to the stoichiometric air-fuel ratio.

Accordingly, the air-fuel ratio correction (control) amount calculated according to the sub feedback control becomes larger so as to compensate for the "excessive correction of the air-fuel ratio to the lean side owing to the main feedback control" due to the lean deviation abnormality of the fuel injector 39 (the air-fuel ratio imbalance among cylinders). Therefore, "the parameter for imbalance determination (for example, the sub FB learning value)" obtained based on the "air-fuel ratio correction (control) amount calculated according to the sub feedback control" increases as the magnitude of the imbalance ratio increases, when the imbalance ratio is a negative value.

Accordingly, the present apparatus determines that the air-fuel ratio imbalance among cylinders is occurring, when the parameter for imbalance determination (for example, the value which increases and decreases according to increase and decrease of the sub FB learning value) becomes equal to or larger than the "abnormality determining threshold Ath", not only in the case in which the air-fuel ratio of the specific cylinder deviates to the "rich side", but also in the case in which the air-fuel ratio of the specific cylinder deviates to the "lean side".

It should be noted that a dotted line in FIG. 34 indicates the sub FB learning value, when the each of the air-fuel ratios of each of the cylinders deviates uniformly to the richer side from the stoichiometric air-fuel ratio, and the main feedback control is terminated. In this case, the abscissa axis is adjusted so as to become the same deviation as "the deviation of the air-fuel ratio of the engine when the air-fuel ratio imbalance among cylinders is occurring". That is, for example, when the "air-fuel ratio imbalance among cylinders" is occurring in which only the air-fuel ratio of the first cylinder deviates by 20%, the imbalance ratio is 20%. In contrast, the actual imbalance ratio is 0%, when each of the air-fuel ratios of each of the cylinders uniformly deviates by 5% (20%/four cylinders), however, the imbalance ratio in this case is treated as 20% in FIG. 34. From a comparison between the solid line in FIG. 34 and the dotted line in FIG. 34, it can be understood that "it is possible to determine that "the air-fuel ratio imbalance is occurring, when the sub FB learning value becomes equal to or larger than the abnormality determining threshold Ath". It should be noted that the sub FB learning value does not increase as shown by the dotted line in FIG. 34 in practice when the air-fuel ratio imbalance among cylinders is not occurring, since the main feedback control is performed.

An actual operation of the present apparatus will next be described.

<Determination of the Air-Fuel Ratio Imbalance Among Cylinders>

Processes for performing/executing the determination of the air-fuel ratio imbalance among cylinders will next be described. The CPU 81 repeatedly executes a "routine for the determination of the air-fuel ratio imbalance among cylinders" shown in FIG. 35, every time a predetermined time period elapses. Accordingly, at a predetermined timing, the CPU 81 starts the process from step 3500 to proceed to step 3505 at which CPU determines whether or not a "precondition (a determination performing condition) of an abnormality determination (determination of the air-fuel ratio imbalance among cylinders)" is satisfied. In other words, when the precondition is not satisfied, a "prohibiting condition of the determination" is satisfied. When the "prohibiting condition of the determination" is satisfied, a determination of the "air-fuel ratio imbalance among cylinders" described below utilizing the "parameter for imbalance determination calculated based on the sub FB learning value Vafsfbg" is not performed.

The precondition of the abnormality determination (the determination of the air-fuel ratio imbalance among cylinders) may be a condition 1 described below, for example.

(Condition 1)

A purifying ability to oxidize hydrogen of the upstream-side catalytic converter 53 is neither equal to nor smaller than a first predetermined ability. That is, the purifying ability to oxidize hydrogen of the upstream-side catalytic converter 53 is larger than a first predetermined ability. In other words, this condition is a condition that " the upstream-side catalytic converter 53 is in the state in which the upstream-side catalytic converter 53 can purify hydrogen flowed into the upstream-side catalytic converter 53 in an amount larger than a predetermined amount (that is, in a state to be able to purify hydrogen)".

The reason why the condition 1 is provided is as follows.

When the purifying ability to oxidize hydrogen of the catalytic converter 53 is equal to or smaller than the first predetermined ability, the hydrogen can not be purified sufficiently in the catalytic converter 53, and therefore, the hydrogen may flow out to the position downstream of the upstream-side catalytic converter 53. Consequently, the output value Voxs of the downstream air-fuel ratio sensor 68 may be affected by the preferential diffusion of hydrogen, or an air-fuel ratio of the gas at the position downstream of the upstream-side catalytic converter 53 may not coincide with the "true average of the air-fuel ratio of the mixture supplied to the entire engine 10". Accordingly, it is likely that the output value Voxs of the downstream air-fuel ratio sensor 68 does not correspond to "the true average of the air-fuel ratio which is excessively corrected by the air-fuel ratio feedback control using the output value Vabyfs of the upstream air-fuel ratio sensor 67". Therefore, if the air-fuel ratio imbalance determination among cylinders is carried out under such a state, it is likely that the determination is erroneous.

For example, the condition 1 may be a condition satisfied when an oxygen storage amount of the upstream-side catalytic converter 53 is neither equal to nor smaller than a first oxygen storage amount threshold. In this case, it is possible to determine that the purifying ability to oxidize hydrogen of the upstream-side catalytic converter 53 is larger than the first predetermined ability.

It is assumed that the precondition of the abnormality determination described above is satisfied. In this case, the CPU 81 makes a "Yes" determination at step 3505 to proceed to step 3510 to determine "whether or not the sub feedback control condition described above is satisfied". When the sub feedback control condition is satisfied, the CPU 81 executes processes steps from step 3515. The processes steps from step 3515 are a portion for the abnormality determination (the determination of the air-fuel ratio imbalance among cylinders). It can therefore be said that the sub feedback control condition constitutes a part of "the precondition of the abnormality determination". Further, the sub feedback control condition is satisfied, when the main feedback control condition is satisfied. It can therefore be said that the main feedback control condition also constitutes a part of "the precondition of the abnormality determination".

The description continues assuming that the sub feedback control condition is satisfied. In this case, the CPU 81 executes appropriate processes from steps 3515 to 3560 described below.

Step 3515: The CPU 81 determines whether or not the present time is "immediately after a timing (immediate after a timing of sub FB learning value update) at which the sub FB learning value Vafsfbg was changed (updated)". When the present time is the time immediately after the timing of sub FB learning value update, the CPU 81 proceeds to step 3520. When the present time is not the time immediately after the timing of sub FB learning value update, the CPU 81 proceeds to step 3595 to end the present routine tentatively.

Step 3520: The CPU 81 increments a value of a learning value cumulative counter Cexe by "1".

Step 3525: The CPU 81 reads (fetches) the sub FB learning value Vafsfbg calculated by the routine shown in FIG. 11.

Step 3530: The CPU 81 updates a cumulative value Svafsfbg of the sub FB learning value Vafsfbg. That is, the CPU 81 adds the "sub FB learning value Vafsfbg read at step 3525" to a "present (current) cumulative value Svafsfbg" in order to obtain a new cumulative value Svafsfbg.

The cumulative value Svafsfbg is set to (at) "0" in the unillustrated initialization routine which is executed when the ignition key switch is changed from the off-position to the on-position. Further, the cumulative value Svafsfbg is set to (at) "0" by a process of step 3560 described later. The process of the step 3560 is executed when the abnormality determination (the determination of the air-fuel ratio imbalance among cylinders, steps 3545-3555) is carried out. Accordingly, the cumulative value Svafsfbg is an integrated value of the sub FB learning value Vafsfbg in a period in which "the precondition of an abnormality determination is satisfied" after "the start of the engine or the last execution of the abnormality determination", and in which "the sub feedback control condition is satisfied".

Step 3535: The CPU 81 determines whether or not the value of the learning value cumulative counter Cexe is equal to or larger than a counter threshold Cth. When the value of the learning value cumulative counter Cexe is smaller than the counter threshold Cth, the CPU 81 makes a "No" determination at step 3535 to directly proceed to step 3595 to end the present routine tentatively. In contrast, when the value of the learning value cumulative counter Cexe is equal to or larger than the counter threshold Cth, the CPU 81 makes a "Yes" determination at step 3535 to proceed to step 3540.

Step 3540: The CPU 81 obtains a sub FB learning value average Avesfbg by dividing the "cumulative value Svafsfbg of the sub FB learning value Vafsfbg" by the "learning value cumulative counter Cexe". As described above, the sub FB learning value average Avesfbg is the parameter for imbalance determination which increases as the difference between the amount of hydrogen included in the exhaust gas which has not passed through the upstream-side catalytic converter 53 and the amount of hydrogen included in the exhaust gas which has passed through the upstream-side catalytic converter 53 increases.

Step 3545: The CPU 81 determines whether or not the sub FB learning value average Avesfbg is equal to or larger than an abnormality determining threshold Ath. As described above, when the air-fuel ratio non-uniformity (imbalance) among cylinders becomes excessively large, and the "air-fuel ratio imbalance among cylinder" is therefore occurring, the sub feedback amount Vafsfb changes to the value to correct the air-fuel ratio of the mixture supplied to the engine 10 to the richer side in a great amount, and accordingly, the sub FB learning value average Avesfbg which is the average value of the sub FB learning value Vafsfbg also changes to the "value to correct the air-fuel ratio of the mixture supplied to the engine 10 to the richer side in a great amount (a value equal to or larger than the threshold value Ath)".

Accordingly, when the sub FB learning value average Avesfbg is equal to or larger than the abnormality determining threshold value Ath, the CPU 81 makes a "Yes" determination at step 3545 to proceed to step 3550 at which the CPU 81 sets a value of an abnormality occurring flag XIJO to (at) "1". That is, when the value of the abnormality occurring flag XIJO is "1", it is indicated that the air-fuel ratio imbalance among cylinders is occurring. It should be noted that the value of the abnormality occurring flag XIJO is stored in the backup RAM 84. When the value of the abnormality occurring flag XIJO is set to (at) "1", the CPU may turn on an unillustrated warning light.

On the other hand, when the sub FB learning value average Avesfbg is smaller than the abnormality determining threshold value Ath, the CPU 81 makes a "No" determination at step 3545 to proceed to step 3555. At step 3555, the CPU 81 sets the value of the abnormality occurring flag XIJO to (at) "0" in order to indicate that the air-fuel ratio imbalance among cylinders is not occurring.

Step 3560: The CPU 81 proceeds to step 3560 from either step 3550 or step 3555 to set (reset) the value of the learning value cumulative counter Cexe to (at) "0" and set (reset) the cumulative value Svafsfbg of the sub FB learning value to (at) "0".

It should be noted that, when the CPU 81 executes the process of step 3505 and the precondition of the abnormal determination is not satisfied, the CPU 81 directly proceeds to step 3595 to end the present routine tentatively. Further, when the CPU 81 executes the process of step 3505 and the precondition of the abnormal determination is not satisfied, the CPU 81 may proceed to step 3595 through step 3560 to end the present routine tentatively. Furthermore, when the CPU 81 executes the process of step 3510 and the sub feedback control condition is not satisfied, the CPU 81 directly proceeds to step 3595 to end the present routine tentatively.

Figure 35:
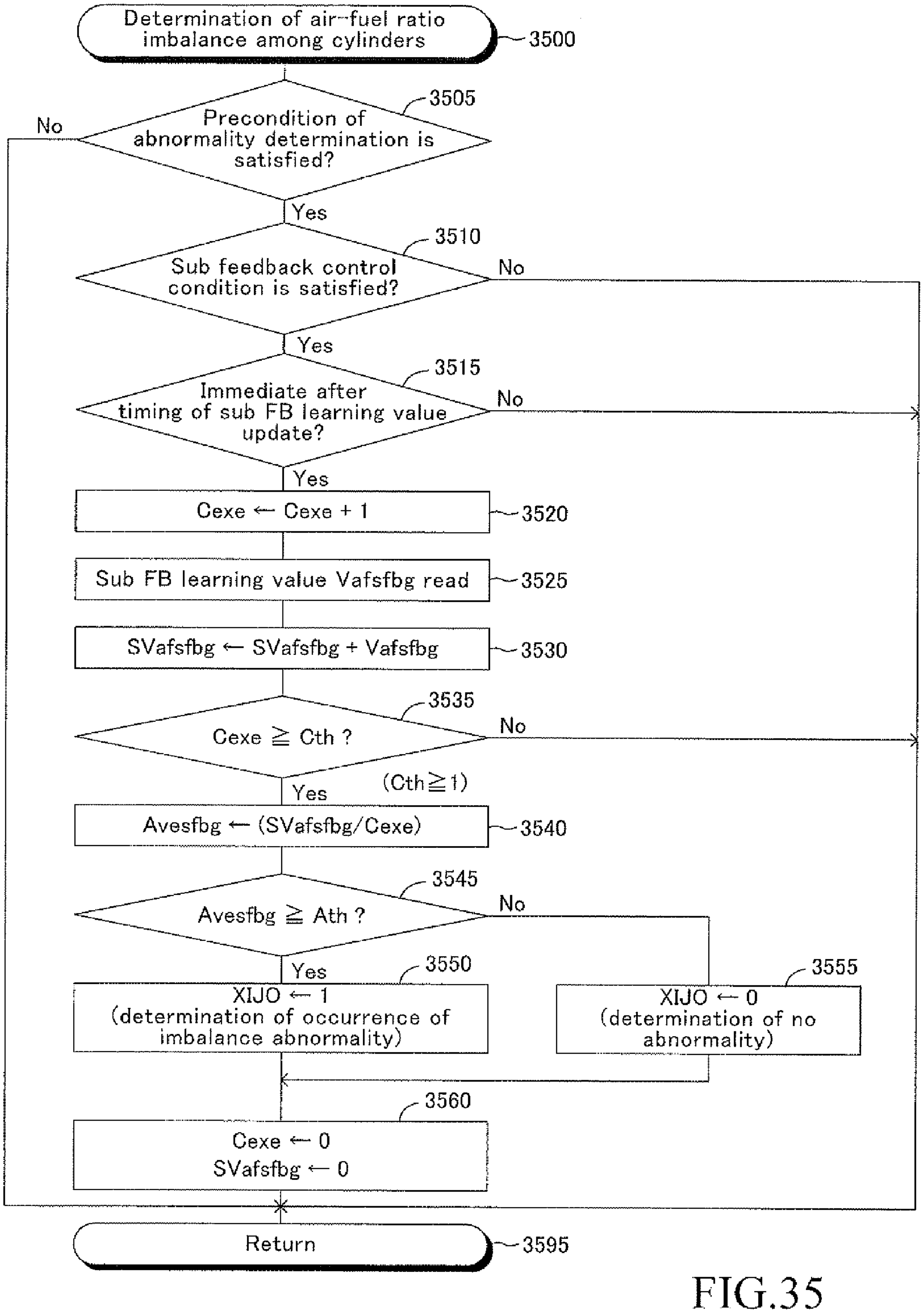
FIG. 35 is a flowchart showing a routine executed by a CPU of an air-fuel ratio control apparatus according to a second modification of the present invention.

As described above, the determining apparatus (the second modified apparatus) comprises:

parameter for imbalance determination obtaining means for obtaining, based on the learning value (the sub FB learning value Vafsfbg), a parameter for imbalance determination (the sub FB learning value average Avesfbg) which increases as a difference between an amount of hydrogen included in the exhaust gas which has not passed through the catalytic converter 53 and an amount of hydrogen included in the exhaust gas which has passed through the catalytic converter 53 becomes larger (step 3520-step 3540 shown in FIG. 35, especially); and air-fuel ratio imbalance among cylinders determining means for determining that a non-uniformity is occurring among individual cylinder air-fuel ratios of mixtures, each being supplied to each of the at least two or more of the cylinders, when the obtained parameter for imbalance determination (the sub FB learning value average Avesfbg) is equal to or larger than an abnormality determination threshold (Ath) (especially, step 3545-step 3555 shown in FIG. 35).

Further, the parameter for imbalance determination obtaining means is configured so as to obtain the parameter for imbalance determination (the sub FB learning value average Avesfbg) in such a manner that the parameter for imbalance determination increases as the learning value (the sub FB learning value Vesfbg) increases.

Accordingly, a practical "air-fuel ratio imbalance among cylinders determining apparatus" which can determine that the air-fuel ratio imbalance among cylinders is occurring can be provided.

As described above, each of the apparatuses according to the embodiments of the present invention prohibits the expedited learning control of the sub FB learning value Vafsfbg, when the "state in which the air-fuel ratio of the engine is disturbed/varied temporarily/transiently" occurs while the expedited learning control is being performed. Accordingly, it can be avoided that the sub FB learning value Vafsfbg deviates from its appropriate value. Consequently, each of the apparatuses can shorten the "period in which the emission becomes worse due to the deviation of the sub FB learning value from the appropriate value".

The present invention is not limited to the embodiments described above, but various modifications may be adopted without departing from the scope of the invention. Examples (hereinafter referred to as "the present apparatus") of the modifications of the embodiments according to the present invention will next be described.

The present apparatus may comprise, as the means for varying the internal EGR amount, either one of the variable intake timing control unit 33 and the variable exhaust timing control unit 36 only.

The present apparatus may store into the backup RAM 84, as the sub FB learning value Vafsfbg, the "value SDVoxs based on the integrated value of the error amount of output DVoxs" obtained when the sub feedback amount Vafsfb is calculated. In this case, the sub FB learning value may be updated according to a formula (25) described below, for example. In the formula (25), k3 is a constant larger than 0 and smaller than 1, and Vafsfbgnew is an updated sub FB learning value.

$$Vafsfbgnew=k3\cdot Vafsfbg+(1-k3)\cdot SDVoxs \tag{25}$$

In this case, the value Ki·Vafsfbg may be used as the sub feedback amount Vafsfb, in a period before the sub feedback control is started, or in a period in which the sub feedback control is terminated. In this case, Vafsfb in the formula (1) is set to (at) "0". Further, the sub FB learning value Vafsfbg may be adopted as an initial value of the integrated value SDVoxs of the error amount of output when the sub feedback is started.

The present apparatus may store into the backup RAM 84, the sub FB learning value Vafsfbg which is updated according to the formula (13) described above, and may set Vafsfb in the formula (1) at "0". In this case, the sub FB learning value may be used as the sub feedback amount Vafsfb, in a period before the sub feedback control is started (or in a period in which the sub feedback control is terminated).

The present apparatus may be configured so as to update the sub FB learning value Vafsfbg immediately after a timing at which the output value Voxs of the downstream air-fuel ratio sensor 68 crosses (pass over) the stoichiometric air-fuel ratio corresponding value Vst (0.5 V), (i.e., rich-lean reverse timing). In this case, for example, the present apparatus may be configured so as to determine whether or not the number of times of update of the sub FB learning value Vafsfbg after the start of the engine is equal to or smaller than a predetermined number, and so as to infer that the "insufficient learning state" is occurring when the number of times of update of the sub FB learning value Vafsfbg after the start of the engine is equal to or smaller than the predetermined number.

The purge control valve 49 or the EGR valve 55 of the present apparatus may be a switching-valve type whose opening degree is adjusted based on a signal with duty ratio, a valve whose opening degree is adjusted by a stepper motor, or the like.

The present apparatus can be applied to, for example, a V-type engine. In this case, the V-type engine may comprise, a right bank upstream-side catalytic converter disposed at a position downstream of an exhaust-gas-aggregated-portion of cylinders belonging to a right bank (a catalyst disposed in the exhaust passage of the engine and at a position downstream of the exhaust-gas-aggregated-portion into which the exhaust gases merge, the exhaust gases discharged from chambers of at least two or more of the cylinders among a plurality of the cylinders); and a left bank upstream-side catalytic converter disposed at a position downstream of an exhaust-gas-aggregated-portion of cylinders belonging to a left bank (a catalyst disposed in the exhaust passage of the engine and at a position downstream of the exhaust-gas-aggregated-portion into which the exhaust gases merge, the exhaust gases discharged from chambers of two or more of the cylinders among the rest of the at least two or more of the cylinders of the plurality of the cylinders). Further, the V-type engine may comprise an upstream air-fuel ratio sensor for the right bank and a downstream air-fuel ratio sensor for the right bank disposed upstream and downstream of the right bank upstream-side catalyst, respectively, and may comprise upstream side air-fuel ratio sensor for the left bank and a downstream side air-fuel ratio sensor for the left bank disposed upstream and downstream of the left bank upstream-side catalyst, respectively. In this case, a main feedback control for the right bank and a sub feedback for the right bank are performed, and a main feedback control for the left bank and a sub feedback control for the left bank are performed independently from the main and sub feedback controls for the right bank.

"Prohibiting the expedited learning control" in the present specification and the claims may encompass updating/changing the learning value Vafsfbg at an updating/changing speed smaller than the updating/changing speed during the expedited learning control (e.g., an updating/changing speed between the speed during the expedited leaning control and the speed during the normal learning control), when it is inferred that the disturbance which varies/changes the air-fuel ratio of the engine transiently is likely to occur. To achieve such an operation, for example, the value p described above may be set to (at) a value between pLarge and pSmall. Alternatively, to achieve such an operation, the proportion gain Kp may be set to (at) a value between the expedition value KpLarge and the normal value Kpsmall, and the integration gain Ki may be set to (at) a value between the expedition value KiLarge and the normal value Kismall.

The invention claimed is:

1. An air-fuel ratio control apparatus applied to a multi-cylinder internal combustion engine having a plurality of cylinders, comprising:

a catalytic converter disposed in an exhaust passage of said engine and at a position downstream of an exhaust gas aggregated portion into which exhaust gases discharged from combustion chambers of at least two or more of a plurality of said cylinders merge;

fuel injectors, each injecting a fuel to be contained in a mixture supplied to each of said combustion chambers of said two or more of said cylinders;

a downstream air-fuel ratio sensor, which is disposed in the exhaust passage and at a position downstream of the catalytic converter, and which outputs an output value according to an air-fuel ratio of a gas passing through said position at which said downstream air-fuel ratio sensor is disposed;

first feedback amount updating means for updating, every time a predetermined first update timing arrives, a first feedback amount to have said output value of said downstream air-fuel ratio sensor coincide with a value corresponding to a target downstream-side air-fuel ratio, based on said output value of said downstream air-fuel ratio sensor and said value corresponding to the target downstream-side air-fuel ratio;

learning means for updating, every time a predetermined second update timing arrives, a learning value of said first feedback amount in such a manner that said learning value brings in a steady-state component of said first feedback amount, based on said first feedback amount;

air-fuel ratio control means for controlling an air-fuel ratio of an exhaust gas flowing into said catalytic converter by controlling an amount of said fuel injected from said fuel injectors, based on at least one of said first feedback amount and said learning value;

expedited learning means for inferring whether or not an insufficient learning state is occurring in which a second error which is a difference between said learning value and a value on which said learning value is supposed to converge is equal to or larger than a predetermined value, and for performing an expedited learning control to increase a changing speed of said learning value when it is inferred that said insufficient learning state is occurring as compared to when it is inferred that said insufficient learning state is not occurring; and prohibiting expedited learning means for inferring whether or not a disturbance which transiently varies said air-fuel ratio of said mixture supplied to said combustion chambers of said at least two or more of said cylinders occurs, and for prohibiting said expedited learning control when it is inferred that said disturbance occurs; and wherein, said air-fuel ratio control means includes:

an upstream air-fuel ratio sensor, which is disposed at said aggregated exhaust gas portion or between said aggregated exhaust gas portion and said catalytic converter in said exhaust passage, which outputs an output value according to an air-fuel ratio of a gas passing through a position at which said upstream air-fuel ratio sensor is disposed, and which includes a diffusion resistance layer with which said exhaust gas which has not passed through said catalytic converter contacts and an air-fuel ratio detecting element which outputs said output value;

base fuel injection amount determining means for determining a base fuel injection amount to have said air-fuel ratio of said mixture supplied to said combustion chambers of said at least two or more of said cylinders coincide with a target upstream-side air-fuel ratio, based on an intake air amount of said engine and said target upstream-side air-fuel ratio;

second feedback amount updating means for updating, every time a predetermined third update timing arrives, a second feedback amount to correct said base fuel injection amount, based on said output value of said upstream air-fuel ratio sensor, said first feedback amount, and said learning value, in such a manner that said air-fuel ratio of said mixture supplied to said combustion chambers of said at least two or more of said cylinders coincides with said target upstream-side air-fuel ratio; and fuel injection instruction means for instructing said fuel injectors to inject said fuel of a fuel injection amount obtained by correcting said base fuel injection amount by said second feedback amount;

said air-fuel ratio control apparatus comprises:

parameter for imbalance determination obtaining means for obtaining, based on said learning value, a parameter for imbalance determination which increases as a difference between an amount of hydrogen included in said exhaust gas which has not passed through said catalytic converter and an amount of hydrogen included in said exhaust gas which has passed through said catalytic converter becomes larger; and air-fuel ratio imbalance among cylinders determining means for determining that a non-uniformity is occurring among individual cylinder air-fuel ratios of mixtures, each supplied to each of said at least two or more of said cylinders, when said obtained parameter for imbalance determination is equal to or larger than an abnormality determination threshold.

2. The air-fuel ratio control apparatus of the internal combustion engine according to claim 1, wherein, said learning means is configured so as to update said learning value in such a manner that said learning value gradually comes close to either said first feedback amount or said steady-state component included in said first feedback amount; and said expedited learning means is configured so as to instruct said learning means to increase an approaching speed of said learning value toward said first feedback amount or said steady-state component included in said first feedback amount in such a manner said approaching speed when it is inferred that said insufficient learning state is occurring is higher than said approaching speed when it is inferred that said insufficient learning state is not occurring.

3. The air-fuel ratio control apparatus of the internal combustion engine according to claim 1, wherein, said learning means is configured so as to update said learning value in such a manner that said learning value gradually comes close to either said first feedback amount or said steady-state component included in said first feedback amount; and said expedited learning means is configured so as to instruct said first feedback amount updating means to increase a changing speed of said first feedback amount in such a manner that said changing speed of said first feedback amount when it is inferred that said insufficient learning state is occurring is higher than said changing speed of said first feedback amount when it is inferred that said insufficient learning state is not occurring.

4. The air-fuel ratio control apparatus of the internal combustion engine according to claim 1, further comprising;

a fuel tank for storing fuel to be supplied to said fuel injectors;

a purge passage section connecting between said fuel tank and an intake passage of said engine to form a passage allowing an evaporated fuel gas generated in said fuel tank to be introduced into said intake passage;

a purge control valve, which is disposed in said purge passage section, and is configured in such a manner that its opening degree is changed in response to an instruction signal; and purge control means for providing to said purge control valve, said instruction signal to change said opening degree of said purge control valve according to an operating state of said engine; and wherein, said second feedback amount updating means is configured so as to update, as an evaporated fuel gas concentration learning value, a value relating to a concentration of said evaporated fuel gas, based on at least said output value of said upstream air-fuel ratio sensor when said purge control valve is opened at a predetermined opening degree other than zero, and so as to update said second feedback amount further based on said evaporated fuel gas concentration learning value; and said prohibiting expedited learning means is configured so as to infer that said disturbance which transiently varies said air-fuel ratio occurs, when the number of updating times of said evaporated fuel gas concentration learning value after a start of said engine is smaller than a predetermined threshold of the number of updating times.

5. The air-fuel ratio control apparatus of the internal combustion engine according to claim 1, further comprising;

a fuel tank for storing fuel to be supplied to said fuel injectors;

a purge passage section connecting between said fuel tank and an intake passage of said engine to form a passage allowing an evaporated fuel gas generated in said fuel tank to be introduced into said intake passage;

a purge control valve, which is disposed in said purge passage section, and is configured in such a manner that its opening degree is changed in response to an instruction signal; and purge control means for providing to said purge control valve, said instruction signal to change said opening degree of said purge control valve according to an operating state of said engine; and wherein, said prohibiting expedited learning means is configured so as to obtain a value according to said concentration of said evaporated fuel gas, and so as to infer that said disturbance which transiently varies said air-fuel ratio occurs when it is inferred based on said obtained value that said concentration of said evaporated fuel gas is higher than a predetermined concentration threshold.

6. The air-fuel ratio control apparatus of the internal combustion engine according to claim 1, further comprising;

a fuel tank for storing fuel to be supplied to said fuel injectors;

a purge passage section connecting between said fuel tank and an intake passage of said engine to form a passage allowing an evaporated fuel gas generated in said fuel tank to be introduced into said intake passage;

a purge control valve, which is disposed in said purge passage section, and is configured in such a manner that its opening degree is changed in response to an instruction signal; and purge control means for providing to said purge control valve, said instruction signal to change said opening degree of said purge control valve according to an operating state of said engine; and wherein, said prohibiting expedited learning means is configured so as to obtain a value according to said concentration of said evaporated fuel gas, and so as to infer that said disturbance which transiently varies said air-fuel ratio occurs when it is inferred based on said obtained value that a changing speed of said concentration of said evaporated fuel gas is higher than a predetermined threshold of concentration changing speed.

7. The air-fuel ratio control apparatus of the internal combustion engine according to claim 1, further comprising;

internal EGR amount control means for controlling an internal EGR amount according to an operating state of said engine, said internal EGR amount being an amount of a cylinder residual gas, which is a burnt gas in each of said combustion chambers of said at least two or more of said cylinders, and which exists in each of said combustion chambers of said cylinders at a start timing of a compression stroke of each of said cylinders; and wherein, said prohibiting expedited learning means is configured so as to infer that said disturbance which transiently varies said air-fuel ratio occurs when it is inferred that a changing speed of said internal EGR amount is equal to or higher than a predetermined internal EGR amount changing speed threshold.

8. The air-fuel ratio control apparatus of the internal combustion engine according to claim 1, further comprising;

internal EGR amount changing means for changing, in response to an instruction signal, a control parameter for varying internal EGR amount which is an amount of a cylinder residual gas, which is a burnt gas in each of said combustion chambers of said at least two or more of said cylinders, and which exists in each of said combustion chambers of said cylinders at a start timing of a compression stroke of each of said cylinders;

control parameter target value obtaining means for obtaining a target value of said control parameter for varying said internal EGR amount, according to an operating state of said engine; and internal EGR amount control means for providing, to said internal EGR amount changing means, said instruction signal to have an actual value of said control parameter coincide with said target value of said control parameter; and wherein, said prohibiting expedited learning means is configured so as to obtain said actual value of said control parameter for varying said internal EGR amount, and so as to infer that said disturbance which transiently varies said air-fuel ratio occurs when it is inferred that a difference between said obtained actual value of said control parameter and said target value of said control parameter is equal to or larger than a predetermined control parameter difference threshold.

9. The air-fuel ratio control apparatus of the internal combustion engine according to claim 1, further comprising;

valve overlap period changing means for changing, based on an operating state of said engine, a valve overlap period in which both an intake valve and an exhaust valve of each of said at least two or more of said cylinders are opened; and wherein, said prohibiting expedited learning means is configured so as to infer that said disturbance which transiently varies said air-fuel ratio occurs when it is inferred that a changing speed of a valve overlap amount which is a length of said valve overlap period is equal to or higher than a predetermined valve overlap amount changing speed threshold.

10. The air-fuel ratio control apparatus of the internal combustion engine according to claim 1, further comprising;

valve overlap period changing means for changing a valve overlap period in which both an intake valve and an exhaust valve of each of said at least two or more of said cylinders are opened in such a manner that said valve overlap period coincides with a target overlap period determined based on an operating state of said engine; and wherein, said prohibiting expedited learning means is configured so as to obtain an actual value of a valve overlap amount which is a length of said valve overlap period, and so as to infer that said disturbance which transiently varies said air-fuel ratio occurs when it is determined that a valve overlap amount difference between said obtained actual value of said valve overlap amount and a target overlap amount which is a length of said target overlap period is equal to or larger than a predetermined valve overlap amount difference threshold.

11. The air-fuel ratio control apparatus of the internal combustion engine according to claim 1, further comprising;

intake valve opening timing control means for changing, based on an operating state of said engine, an opening timing of an intake valve of each of said at least two or more of said cylinders; and wherein, said prohibiting expedited learning means is configured so as to infer that said disturbance which transiently varies said air-fuel ratio occurs when it is inferred that a changing speed of said opening timing of said intake valve is equal to or higher than a predetermined intake valve opening timing changing speed threshold.

12. The air-fuel ratio control apparatus of the internal combustion engine according to claim 1, further comprising;

intake valve opening timing control means for changing an opening timing of an intake valve of each of said at least two or more of said cylinders in such a manner that said opening timing of said intake valve coincides with a target opening timing of said intake valve determined based on an operating state of said engine; and wherein, said prohibiting expedited learning means is configured so as to obtain an actual opening timing of said intake valve, and so as to infer that said disturbance which transiently varies said air-fuel ratio occurs when it is inferred that a difference between said obtained actual opening timing of said intake valve and said target opening timing of said intake valve is equal to or larger than a predetermined intake valve opening timing difference threshold.

13. The air-fuel ratio control apparatus of the internal combustion engine according to claim 1, further comprising;

exhaust valve closing timing control means for changing, based on an operating state of said engine, a closing timing of an exhaust valve of each of said at least two or more of said cylinders; and wherein, said prohibiting expedited learning means is configured so as to infer that said disturbance which transiently varies said air-fuel ratio occurs when it is inferred that a changing speed of said closing timing of said exhaust valve is equal to or higher than a predetermined exhaust valve closing timing changing speed threshold.

14. The air-fuel ratio control apparatus of the internal combustion engine according to claim 1, further comprising;

exhaust valve closing timing control means for changing a closing timing of an exhaust valve of each of said at least two or more of said cylinders in such a manner that said closing timing of said exhaust valve coincides with a target closing timing of said exhaust valve determined based on an operating state of said engine; and wherein, said prohibiting expedited learning means is configured so as to obtain an actual closing timing of said exhaust valve, and so as to infer that said disturbance which transiently varies said air-fuel ratio occurs when it is inferred that a difference between said obtained actual closing timing of said exhaust valve and said target closing timing of said exhaust valve is equal to or larger than a predetermined exhaust valve closing timing difference threshold.

15. The air-fuel ratio control apparatus of the internal combustion engine according to claim 1, further comprising;

an exhaust gas recirculation pipe connecting between a portion upstream of said catalytic converter in said exhaust passage of said engine and an intake passage of said engine;

an EGR valve, which is disposed in said exhaust gas recirculation pipe, and which is configured in such a manner that its opening degree is changed in response to an instruction signal; and external EGR amount control means for providing said instruction signal to said EGR valve so as to change an amount of an external EGR which is introduced into said intake passage through flowing in said exhaust gas recirculation pipe by changing said opening degree of said EGR valve according to an operating state of said engine; and wherein, said prohibiting expedited learning means is configured so as to infer that said disturbance which transiently varies said air-fuel ratio occurs when it is inferred that a changing speed of said external EGR amount is equal to or higher than a predetermined external EGR amount changing speed threshold.

16. The air-fuel ratio control apparatus of the internal combustion engine according to claim 1, further comprising;

an exhaust gas recirculation pipe connecting between a portion upstream of said catalytic converter in said exhaust passage of said engine and an intake passage of said engine;

an EGR valve, which is disposed in said exhaust gas recirculation pipe, and which is configured in such a manner that its opening degree is changed in response to an instruction signal; and external EGR control means for providing said instruction signal to said EGR valve so as to change an amount of an external EGR which is introduced into said intake passage through flowing in said exhaust gas recirculation pipe by changing said opening degree of said EGR valve according to an operating state of said engine; and wherein, said prohibiting expedited learning means is configured so as to obtain an actual opening degree of said EGR valve, and so as to infer that said disturbance which transiently varies said air-fuel ratio occurs when it is inferred that a difference between said obtained actual opening degree of said EGR valve and an opening degree of said EGR valve determined based on said instruction signal provided to said EGR valve is equal to or larger than a predetermined EGR valve opening degree difference threshold.

17. The air-fuel ratio control apparatus of the internal combustion engine according to claim 1, wherein, said expedited learning means is configured so as to infer that said insufficient learning state is occurring when a changing speed of said learning value is equal to or larger than a predetermined learning value changing speed threshold.

18. The air-fuel ratio control apparatus of the internal combustion engine according to claim 1, wherein, said parameter for imbalance determination obtaining means is configured so as to obtain said parameter for imbalance determination in such a manner that said parameter for imbalance determination increases as said learning value increases.

* * * * *